US008849088B2

(12) United States Patent
Sasaki et al.

(10) Patent No.: US 8,849,088 B2
(45) Date of Patent: Sep. 30, 2014

(54) PLAYBACK DEVICE, RECORDING DEVICE, PLAYBACK METHOD, AND RECORDING METHOD

(75) Inventors: Taiji Sasaki, Osaka (JP); Hiroshi Yahata, Osaka (JP); Kazuhiro Mochinaga, Hyogo (JP); Wataru Ikeda, Osaka (JP)

(73) Assignee: Panasonic Corporation, Osaka (JP)

(*) Notice: Subject to any disclaimer, the term of this patent is extended or adjusted under 35 U.S.C. 154(b) by 726 days.

(21) Appl. No.: 12/370,029

(22) Filed: Feb. 12, 2009

(65) Prior Publication Data

US 2009/0208189 A1 Aug. 20, 2009

Related U.S. Application Data

(60) Provisional application No. 61/029,054, filed on Feb. 15, 2008.

(51) Int. Cl.

| | |
|---|---|
| ***H04N 5/00*** | (2011.01) |
| ***H04N 9/87*** | (2006.01) |
| ***G11B 27/34*** | (2006.01) |
| ***G11B 27/10*** | (2006.01) |
| ***G11B 27/32*** | (2006.01) |
| *G11B 20/00* | (2006.01) |
| *H04N 5/765* | (2006.01) |
| *H04N 5/783* | (2006.01) |
| *H04N 5/85* | (2006.01) |
| *H04N 9/806* | (2006.01) |
| *H04N 9/82* | (2006.01) |
| *G06F 17/30* | (2006.01) |
| *H04N 21/462* | (2011.01) |
| *H04N 5/775* | (2006.01) |
| *H04N 9/804* | (2006.01) |

(52) U.S. Cl.

CPC ........ *H04N 9/8715* (2013.01); *G11B 20/00869* (2013.01); *G11B 27/34* (2013.01); *H04N 5/765* (2013.01); *G11B 27/10* (2013.01); *H04N 5/783* (2013.01); *H04N 5/85* (2013.01); *H04N 9/8063* (2013.01); *G11B 2220/213* (2013.01); *G11B 2220/2541* (2013.01); *H04N 9/8205* (2013.01); *G06F 17/30017* (2013.01); *H04N 21/4622* (2013.01); *H04N 9/8227* (2013.01); *G11B 27/329* (2013.01); *H04N 5/775* (2013.01); *H04N 9/8042* (2013.01); *H04N 9/8047* (2013.01)

USPC ............................ 386/200; 386/248; 386/287

(58) Field of Classification Search

CPC .................... G11B 20/00869; H04N 21/4307; H04N 21/4622; G06F 17/30017

USPC ......... 386/229, 242, 243, 248, 262, 281, 285, 386/293, 296, 337

See application file for complete search history.

(56) References Cited

U.S. PATENT DOCUMENTS

| | | | | |
|---|---|---|---|---|
| 7,639,923 | B2 * | 12/2009 | Ikeda et al. | .................. 386/335 |
| 2004/0105661 | A1 | 6/2004 | Seo et al. | |

(Continued)

FOREIGN PATENT DOCUMENTS

| | | |
|---|---|---|
| EP | 1 758 119 | 2/2007 |
| JP | 2006-109494 | 4/2006 |
| JP | 2006-244655 | 9/2006 |
| JP | 2007-74608 | 3/2007 |
| RU | 2004 126 162 | 3/2006 |
| RU | 2 315 370 | 1/2008 |
| WO | 2005/124779 | 12/2005 |
| WO | 2006/019259 | 2/2006 |
| WO | 2006/073260 | 7/2006 |

OTHER PUBLICATIONS

International Search Report issued May 19, 2009 in the corresponding PCT application.

Decision to Grant Patent for Invention dated Jan. 29, 2014 issued in corresponding Russian Application No. RU2009138027, including partial English translation.

Extended European Search Report issued Apr. 9, 2014 in corresponding European Application No. 09710717.1.

*Primary Examiner* — Michael Simitoski
*Assistant Examiner* — Gary Lavelle
(74) *Attorney, Agent, or Firm* — Wenderoth, Lind & Ponack, L.L.P.

(57) ABSTRACT

A playback device for playing back a playlist by determining, as a current sub-playitem, a sub-playitem that is optimum for the current sub-playitem each time a current playitem changes. The playback device continues a playback of a playitem when a clip file being referred to by the current sub-playitem has been downloaded and is in an Enable state in the local storage; and stops, by issuing a DataStarved event, the playback of the playitem when the clip file being referred to by the current sub-playitem is in a missing state or an invalid state in a recording medium.

11 Claims, 56 Drawing Sheets

(56) References Cited

U.S. PATENT DOCUMENTS

| | | | | |
|---|---|---|---|---|
| 2004/0109677 | A1 | 6/2004 | Seo et al. | |
| 2005/0169604 | A1 | 8/2005 | Kim et al. | |
| 2006/0078301 | A1* | 4/2006 | Ikeda et al. | 386/95 |
| 2006/0098936 | A1 | 5/2006 | Ikeda et al. | |
| 2007/0047912 | A1 | 3/2007 | Hattori et al. | |
| 2007/0058933 | A1* | 3/2007 | Kobayashi et al. | 386/95 |
| 2007/0077040 | A1* | 4/2007 | Nozomu | 386/126 |
| 2007/0189727 | A1 | 8/2007 | Hamada et al. | |
| 2008/0008450 | A1 | 1/2008 | Ikeda et al. | |
| 2008/0063386 | A1* | 3/2008 | Oshima et al. | 386/125 |
| 2008/0232781 | A1* | 9/2008 | Ohizumi et al. | 386/124 |
| 2009/0208187 | A1 | 8/2009 | Kim et al. | |

* cited by examiner

STREAM NUMBER TABLE

| STREAM NUMBER | PATH INFO | STREAM ID |
|---|---|---|
| 1 | MAIN PATH | PRIMARY VIDEO |
| 2 | SUB-PATH ID=0 | PG#1 |
| 3 | SUB-PATH ID=1 | PG#2 |

FIG.6

PLAYER VARIABLES (SYSTEM PARAMETERS) STORED IN PSR SET

| | | | | | |
|---|---|---|---|---|---|
| 0 | Language Code | 11 | Player audio mixing mode for Karaoke | 22 | Secondary Audio Stream number |
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language coded ext. for STST | 30 | reserved |
| 9 | Navigation timer | 20 | Player region code | 31 | reserved |
| 10 | Current playback time | 21 | Secondary Video Stream number | 32 | reserved |

FIG. 35A

PSR14:Secondary Video Stream Number

| b31 | b30 | b29 | b28 | b27 | b26 | b25 | b24 |
|---|---|---|---|---|---|---|---|
| disp_V_flag | | | | | | | |

| b23 | b22 | b21 | b20 | b19 | b18 | b17 | b16 |
|---|---|---|---|---|---|---|---|
| reserved | | | | | | | |

| b15 | b14 | b13 | b12 | b11 | b10 | b9 | b8 |
|---|---|---|---|---|---|---|---|
| Secondary video stream number | | | | | | | |

| b7 | b6 | b5 | b4 | b3 | b2 | b1 | b0 |
|---|---|---|---|---|---|---|---|
| | | | | | | | |

disp_V_flag … 0b:Presentation of Secondary video is disable
1b:Presentation of Secondary video is enable Secondary video stream number … 0:Reserved
1 to 32:Secondary video stream number
0xFF:Secondary video stream is not selected or no Secondary video stream
Others:reserved

FIG. 35B

PSR29:Player Capability for Video

The PSR29 register represents the Video capability of the Player. Navigation commands and BD-J application cannot directly change the value contained in PSR29.

| b31 | b30 | b29 | b28 | b27 | b26 | b25 | b24 |
|---|---|---|---|---|---|---|---|
| reserved | | | | | | | |

| b23 | b22 | b21 | b20 | b19 | b18 | b17 | b16 |
|---|---|---|---|---|---|---|---|
| reserved | | | | | | | |

| b15 | b14 | b13 | b12 | b11 | b10 | b9 | b8 |
|---|---|---|---|---|---|---|---|
| reserved | | | | | | | |

| b7 | b6 | b5 | b4 | b3 | b2 | b1 | b0 |
|---|---|---|---|---|---|---|---|
| reserved | | | | | | 50&25Hz Video Capabili-ty | HD Secondary Video Capabili-ty |

HD Secondary Video Capability … 0b:HD Secondary Video incapable
1b:HD Secondary Video capable 50&25Hz Video Capability … 0b:50Hz and 25Hz Video incapable
1b:50Hz and 25Hz Video capable

FOR VIEWING PLANAR IMAGE

FOR VIEWING WITH LEFT EYE

FOR VIEWING WITH RIGHT EYE

FIG. 43A

PSR1:Primary Audio Stream Number

| b31 | b30 | b29 | b28 | b27 | b26 | b25 | b24 |
|---|---|---|---|---|---|---|---|
| reserved | | | | | | | |
| **b23** | **b22** | **b21** | **b20** | **b19** | **b18** | **b17** | **b16** |
| reserved | | | | | | | |
| **b15** | **b14** | **b13** | **b12** | **b11** | **b10** | **b9** | **b8** |
| reserved | | | | | | | |
| **b7** | **b6** | **b5** | **b4** | **b3** | **b2** | **b1** | **b0** |
| Primary audio stream number | | | | | | | |

Primary audio stream number … 0:Reserved
1 to 32:Primary audio stream number
0xFF:Primary audio stream is not selected or no Primary audio stream

FIG. 43B

PSR14:Secondary Audio Stream Number

| b31 | b30 | b29 | b28 | b27 | b26 | b25 | b24 |
|---|---|---|---|---|---|---|---|
| disp_V_flag | | | | | | | |
| **b23** | **b22** | **b21** | **b20** | **b19** | **b18** | **b17** | **b16** |
| reserved | | | | | | | |
| **b15** | **b14** | **b13** | **b12** | **b11** | **b10** | **b9** | **b8** |
| Secondary video stream number | | | | | | | |
| **b7** | **b6** | **b5** | **b4** | **b3** | **b2** | **b1** | **b0** |
| Secondary audio stream number | | | | | | | |

Secondary audio stream number … 0:Reserved
1 to 32:Secondary audio stream number
0xFF:Secondary audio stream is not selected or no Secondary audio stream
Others:reserved

FIG. 48A

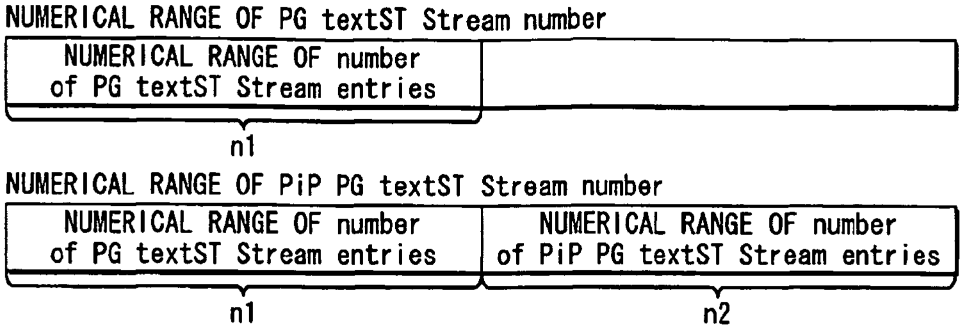

FIG. 48B

| b31 | b30 | b29 | b28 | b27 | b26 | b25 | b24 |
|---|---|---|---|---|---|---|---|
| disp_s_flag | PiP_PG_textST_valid_flag | | | | PiP PG TextST stream number (b11-b8) | | |
| **b23** | **b22** | **b21** | **b20** | **b19** | **b18** | **b17** | **b16** |
| PiP PG TextST stream number (b7-b0) | | | | | | | |
| **b15** | **b14** | **b13** | **b12** | **b11** | **b10** | **b9** | **b8** |
| reserved | | | | PG TextST stream number (b11-b8) | | | |
| **b7** | **b6** | **b5** | **b4** | **b3** | **b2** | **b1** | **b0** |
| PG TextST stream number (b7-b0) | | | | | | | |

disp_s_flag ··· 0b:Display of both "PG textST stream" and "PiP PG textST stream" is disable
1b:Display of both "PG textST stream" and "PiP PG textST stream" is enable PiP_PG_textST_valid_flag ··· 0b:The PG TextST stream number defined in PSR2 shall be used when a Secondary video stream is displayed
1b:The PiP PG TextST stream number defined in PSR2 shall be used when a Secondary video stream is displayed PG TextST stream number ··· 0:Reserved
1 to 255:PG TextST stream number
0x0FFF:PG TextST stream number is not selected or no PG TextST stream PiP PG TextST stream number ··· 0:Reserved
1 to 255:PiP PG TextST stream number
0x0FFF:PiP PG TextST stream number is not selected or no PiP PG TextST stream

| LOCAL STORAGE PATH | VIRTUAL PACKAGE PATH | PROGRESSIVE ATTRIBUTE |
|---|---|---|
| /1/1/CCC. MPL | /BDMV/PLAYLIST/CCC. MPLS | |
| /1/1/VVV. M2T | /BDMV/STREAM/VVV. M2TS | |
| /1/1/VVV. CLP | /BDMV/CLIPINF/VVV. CLPI | |
| /1/1/SSS. M2T | /BDMV/STREAM/SSS. M2TS | ○ |
| /1/1/SSS. CLP | /BDMV/CLIPINF/SSS. CLPI | |

PLAYBACK DEVICE, RECORDING DEVICE, PLAYBACK METHOD, AND RECORDING METHOD

This application claims benefit of Provisional application 61/029,054, filed Feb. 15, 2008.

BACKGROUND OF THE INVENTION (1) Field of the Invention

The present invention relates to a technical field of a playlist playback technology.

(2) Description of the Related Art

The playlist is information defining a logical playback path. In various application formats for storing contents, the playlist is used as a unit of playback. In general, the playlist is composed of playitems and sub-playitems. The playitem is a logical playback section that is defined by specifying a pair of an in point and an out point in a time axis of a video stream that constitutes a main video image.

The sub-playitem is a logical playback section that is defined by specifying a pair of an in point and an out point in a time axis of a sub-stream. Here, the sub-stream is any of an audio stream, video stream, and subtitle stream that is not multiplexed with a video stream, but is played back together with the video stream.

When a virtual package is constructed from a combination of contents recorded on a ROM disc and another recording medium, it is possible to define, with use of the sub-playitem, a playback section of a sub-stream that is downloaded via a network. Here, it is possible to use the playitem in the playlist to define a playback section of an AV stream recorded on a ROM disc, and to use the sub-playitem in the playlist to define a playback section of a sub-stream to be downloaded. With such usage, the playlist achieves a new combination of subtitle, audio and moving image which is not achieved by optical discs.

As one example, Patent Document 1 identified below discloses a technology for generating a virtual package.

[Patent Document 1]

Japanese Patent Application Publication No. 2006-109494

SUMMARY OF THE INVENTION

The Problems the Invention is Going to Solve

Meanwhile, reading from the ROM disc may be performed at a bit rate of 54 Mbps. However, in many cases of ordinary user homes, a bit rate guaranteed for a streaming playback is the best effort, and as high a level of bit rate as in a streaming playback reading from ROM disc cannot be always guaranteed.

Here, a case will be studied where a playlist including many sub-playitems is to be played back under a circumstance where the bit rate for streaming playback is restricted.

Suppose, for example, that, in a specific scene of a main-feature video image, a playitem is associated with 10 sub-playitems, and the sub-playitems support 10 languages being options. It is also presumed here that each clip file referred to by each sub-playitem has 10 MB of data size. Then, to start a playback of one playitem, files of 100 MB=10 (languages)×10 (MB) should be downloaded, as well as AV clips referred to by the playitem of the main-feature video image. In such a case, when an application in charge of downloading clip files first downloads the clip files of a total of 100 MB referred to by the sub-playitems, and then downloads the clip files referred to by the playitem, the supply of the clip files referred to by the playitem may be delayed under the circumstance where the bit rate is restricted, resulting in a delayed progress of playback.

One might think that this could be avoided by first downloading the clip files referred to by the main path and then downloading the clip files referred to by the sub-playitems. However, in that case, when the user selects, as a playback target, elementary streams in the clip files referred to by the sub-playitems, the elementary streams of the playback target cannot be supplied to the decoder, and the playback may proceed while any of the subtitle, audio, and video image is missing.

As described above, when there are a lot of clip files to be downloaded due to the presence of many sub-playitems, it is impossible to instruct the application which clip files should be downloaded first with priority. When this happens under the circumstance where the bit rate is restricted, an interruption to the playback may become prominent or the playback may proceed while any of the subtitle, audio, and video image is missing.

In addition, since the user is not conscious of the way the playback is performed, namely whether the playback is performed by reading streams from the ROM disc or by receiving supply of streams from a network, when the playback is not performed completely, the user may consider it a defect of the playback device and may complain about it to the customer service of the maker of the device. Typically, the procedure of downloading the clip files referred to by the sub-playitems is made by an application program created by a producer of a movie, not by a program embedded in the playback device. It is therefore not desirable for the maker to receive a complaint when an application program created by a producer of a movie happens to give priority to downloading the clip files referred to by the sub-playitems.

An object of the present invention is therefore to provide a playback device that can instruct an application on which clip files should be downloaded first with priority when there are a lot of clip files to be downloaded due to the presence of many sub-playitems.

Means to Solve the Problems

The above-described object is fulfilled by a playback device for playing back a playlist, wherein the playlist includes a plurality of playitems and a plurality of sub-playitems, each playitem is information defining a playback section in a clip file that includes a main stream, each sub-playitem is information defining a playback section in a clip file that includes a sub-stream, and the clip files defined and referred to by the sub-playitems are transferred, the playback device comprising: a playback unit operable to play back the playitems; a specifying unit operable to specify a current playitem; a determining unit operable to determine a current sub-playitem each time the current playitem is specified; and a sub-stream register operable to indicate the current sub-stream that is to be played back in synchronization with the current playitem, the current sub-playitem defining a playback section of the sub-stream indicated by the sub-stream register, wherein the playback unit continues playback of the playitem when a clip file being referred to by the current sub-playitem exists in an accessible recording medium, and stops playback of the playitem when the clip file is in a missing state or an unrecognizable state in the accessible recording medium.

Effects of the Invention

With the above-described structure, the playback device stops playback when a clip file, which is being referred to by the current sub-playitem information and includes the current sub-stream, does not exist in the recording medium.

In other words, the playback device continues playback when a clip file, which is being referred to by the current sub-playitem information and includes the current sub-stream, exists in the recording medium. Therefore, clip files that should be downloaded first with priority are (i) the clip file including the main stream and (ii) the clip file that is being referred to by the current sub-playitem information and includes the current sub-stream.

When an application downloads these clip files first with priority, before downloading clip files that are referred to by other sub-playitems, it is possible to continue playback of a playitem including many sub-playitems although the bit rate will become lower than that with the ROM disc.

With this structure, it is possible to instruct an application on which clip files should be downloaded first with priority when there are many clip files to be downloaded due to the presence of many sub-playitems since it is possible to continue the playback as far as the clip files include a clip file that is being referred to by the current sub-playitem information and includes the current sub-stream. Accordingly, even if there are a lot of sub-playitems and the bit rate is restricted, it is possible to continue the playback as far as the application performs downloading following the rule: "while a playitem is played back, download a clip file that is being referred to by a sub-playitem that is to be the next current sub-playitem".

In this way, this structure can instruct which clip files should be downloaded first with priority, thus eliminating an occurrence that the playback proceeds while any of the subtitle, audio, and moving image is missing. This minimizes an interruption of the progress of a playback which happens due to a delay in the supply of streams.

More specifically, when downloading should follow the above-stated rule, a bit rate B that is required for downloading the clip files is calculated is calculated as follows.

Bit-rate $B$=((data size of clip file constituting next playitem)+(data size of clip file constituting next sub-playitem))/playback time of current playitem In the above equation, the "next playitem" means a playitem that should be played back next to the current one, and the "next sub-playitem" means a sub-playitem that should be played back next to the current one.

With the bit rate required for the downloading being calculated as indicated above, it is possible to minimize an interruption of the progress of a playback even if the bit rate is restricted.

Also, when the clip file to be referred to by the current sub-playitem is in an unrecognizable state, the progress of the playback is stopped. This prevents the user from becoming conscious of whether the streams are supplied from the ROM disc or supplied through downloading. It eliminates the need for verifying how the playback will be without a playback of a sub-playitem, and lightens the load at the authoring.

The playback device of the present invention can continue a playback of a playlist without waiting for AV clips to be downloaded, since the playback device can perform the playback by downloading minimum clip files required for the playback.

BRIEF DESCRIPTION OF THE DRAWINGS

These and the other objects, advantages and features of the invention will become apparent from the following description thereof taken in conjunction with the accompanying drawings which illustrate a specific embodiment of the invention.

The drawings show as follow.

FIG. 6 is a list of the system parameters (SPRM).

FIG. 35A shows one example of the bit assignment in the PSR-14.

FIG. 35B shows one example of the bit assignment in the PSR29.

FIG. 43A shows one example of the bit assignment in the PSR1.

FIG. 43B shows one example of the bit assignment in the PSR14.

FIG. 48A shows one example of the numerical range of the stream numbers that the current PGtextST stream may have.

FIG. 48B shows one example of the bit assignment in the PSR2.

DESCRIPTION OF CHARACTERS

| | |
|---|---|
| 100 | BD-ROM |
| 102 | WWW server |
| 103 | local storage |
| 104 | television |

DESCRIPTION OF THE PREFERRED EMBODIMENTS

The following describes embodiments of the playback device and recording device which are provided with the means for solving the above-described problem, with reference to the drawings.

Embodiment 1

Figure 1:
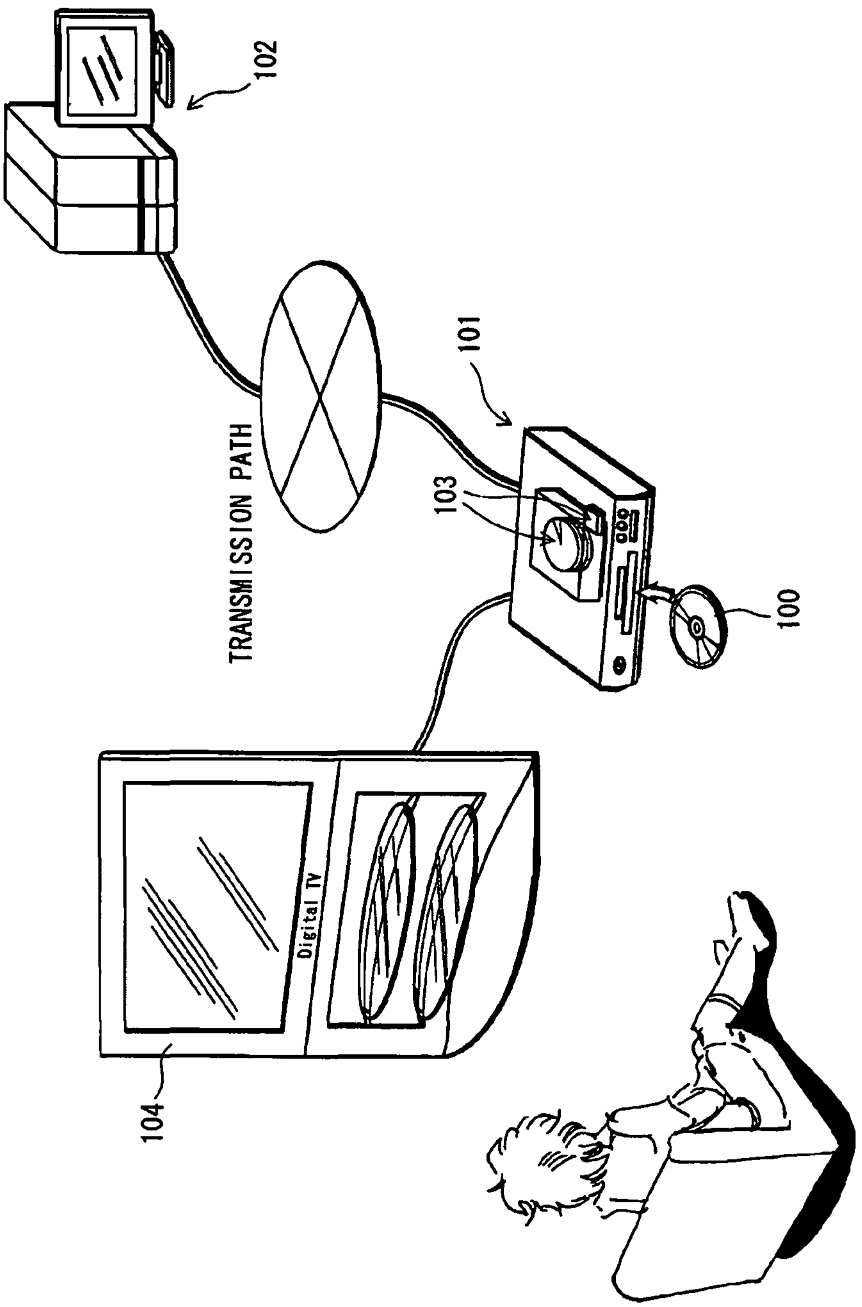
FIG. 1 shows one example of an implementation of a usage act of a playback device 101.

The following describes an embodiment of the playback device and recording device. Firstly, of the implementation acts of the playback device, a usage act is described. FIG. 1 shows an implementation of a usage act of a playback device 101. As shown in FIG. 1, the playback device 101 is used by the user together with a recording medium 100 that is one example of the first recording medium, a WWW server 102, a local storage 103, and a television 104.

The BD-ROM 100 is a recording medium on which a movie work is recorded.

The playback device 101 constitutes a home theater together with the television 103 and plays back the BD-ROM 100. The playback device 101 has a function to download the data into the recording medium, thus having a function of a recording device, as well.

The WWW server 102 is a server device that manages an official site of the movie distributor, and distributes a set of files (update kit) to the user via the Internet or the like, where the set of files achieves a partial replacement or addition of the movie work recorded on the BD-ROM 100.

The local storage 103 is attached to the playback device to be used as a storage for storing the content distributed from the WWW server 102 of the movie distributor. With this structure, a content that was downloaded into the local storage 103 via the net can be combined with a content recorded on the BD-ROM 100, and thus the content recorded on the BD-ROM 100 can be expanded/updated.

The television 104 provides an interactive operation environment to the user by displaying the playback images of the movie work and displaying the menu or the like.

Up to now, the use form of the playback device has been described. The following describes the playlist, which is a target of playback of the playback device.

Figure 2:
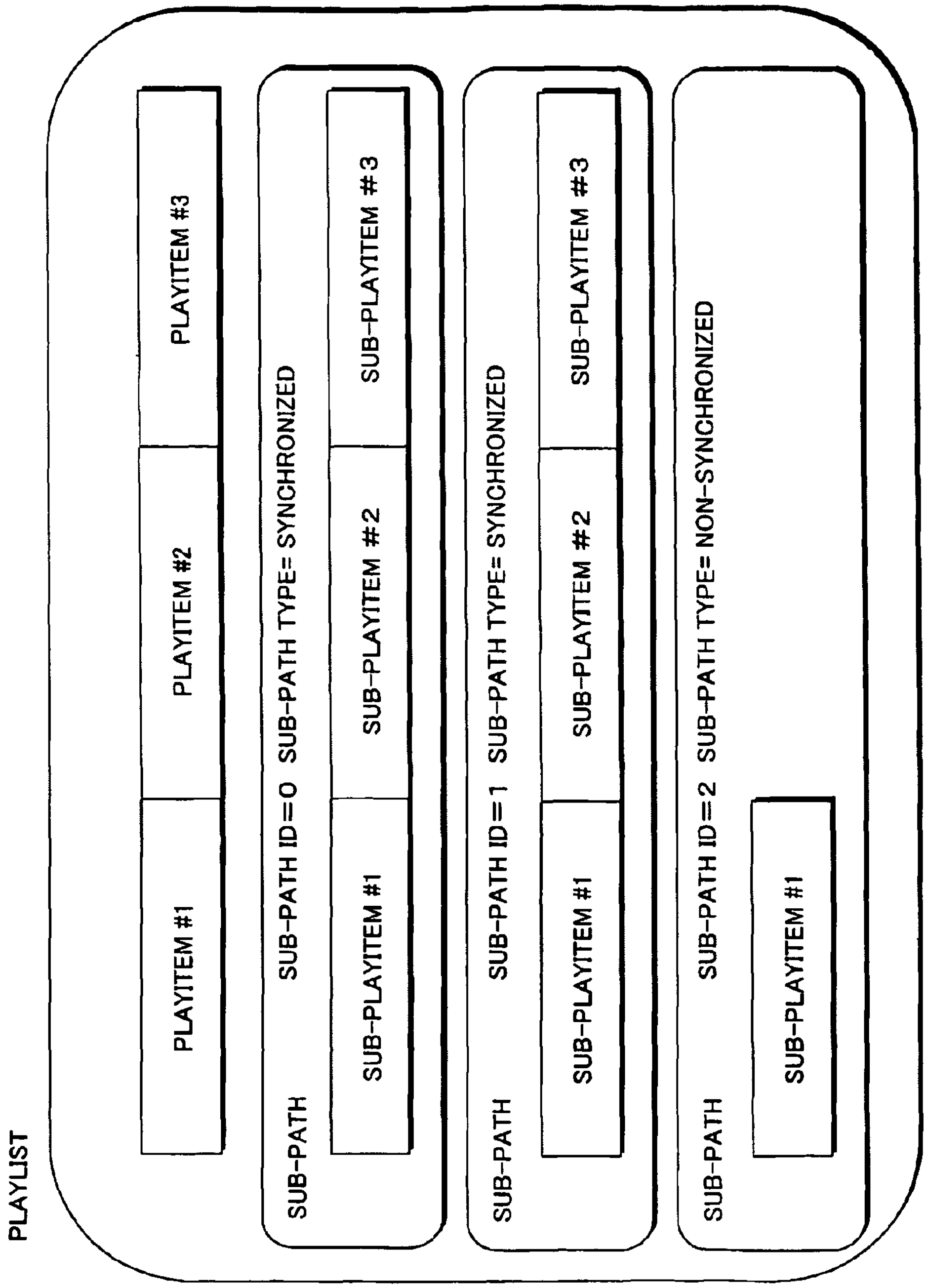
FIG. 2 shows one example of a playlist.

FIG. 2 shows a playlist, where a playlist is composed of a "main path" and one or more "sub-paths".

The "main path" is composed of one or more playitems.

The "sub-paths" are a series of playback paths played back together with a main path, and are assigned with IDs (sub-path IDs) in order of being registered in the playlist. The sub-path IDs are used to identify the sub-paths. The sub-paths include. "synchronized type" and "non-synchronized type", where the "synchronized type" sub-paths are played back in synchronization with a main path, and "non-synchronized type" sub-paths are played back not in synchronization with a main path. The type of each sub-path is written in the sub-path. A sub-playitem is composed of one or more pieces of sub-playitem information. In the case that the sub-path type is the synchronized type, the playback start time and the playback end time of the sub-playitem are expressed using the same time axis as the main path. In the case that the sub-path type is non-synchronized type, the playback start time and the playback end time of the sub-playitem are expressed using a different time axis as the main path.

Also, the "playitem" includes a stream number table. The stream number table is information that indicates stream numbers of elementary streams that are permitted to be played back in the playitem. Detailed explanation of the playlist information, playitem information, sub-playitem information, and stream number table will be given in other embodiments later.

In the following description of operation, a certain playlist is used as one example.

Figure 3:
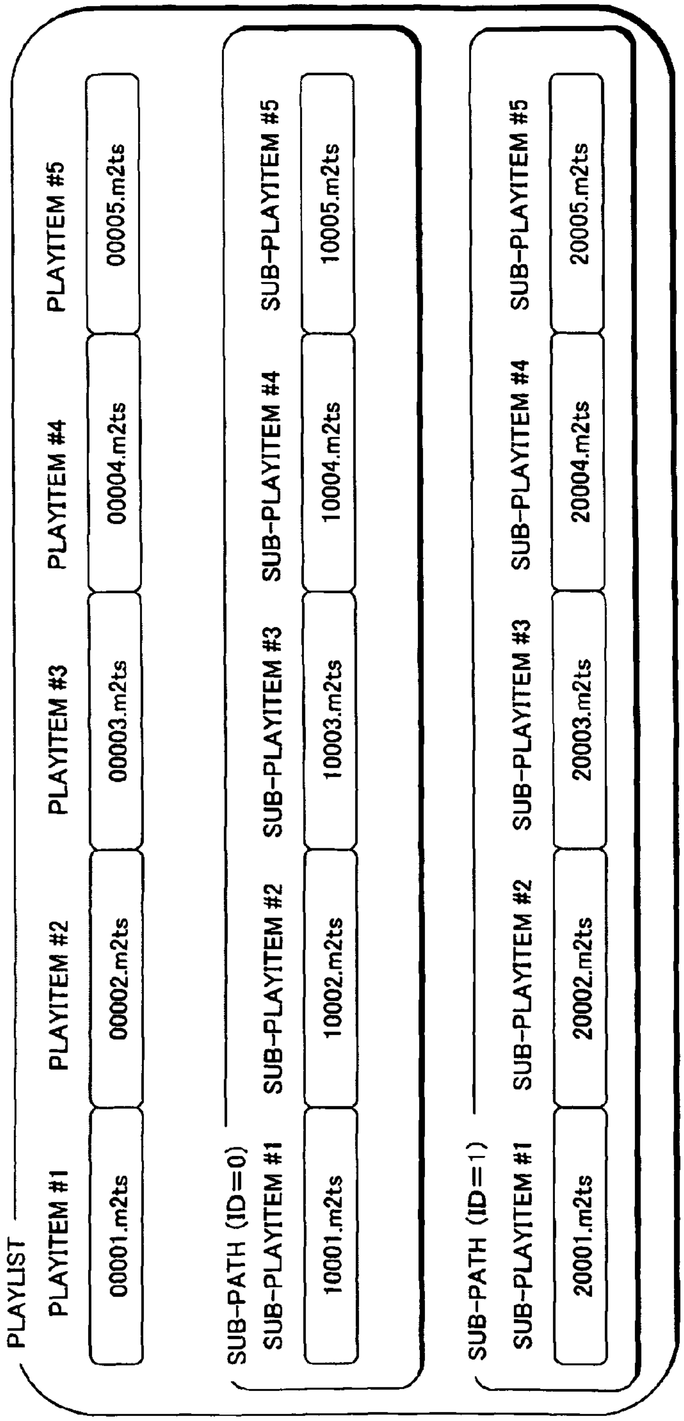
FIG. 3 shows a playlist used as one example in the explanation of the operation.

FIG. 3 shows the certain playlist used as one example in the explanation of the operation.

The playlist is composed of a main path and two sub-paths (sub-path (ID=0), sub-path (ID=1)). The main path includes five playitems #1, #2, #3, #4, and #5. The sub-path with ID=0 includes five sub-playitems #1, #2, #3, #4, and #5, and the sub-path with ID=1 includes five sub-playitems #1, #2, #3, #4, and #5.

Both of the sub-paths are the synchronized-type, and refer to AV clips on which a presentation graphics stream is multiplexed. The presentation graphics stream multiplexed on the AV clips referred to by one of the sub-paths is subtitle data of one language. The AV clips used from the playlist are all contents contained in the update kit stored in the local storage, and have a progressive attribute. The progressive attribute is an attribute of an AV clip that indicates that said AV clip does not need to be stored in the local storage preliminarily before the playlist is played back, only if the sub-play items referring to the AV clip have been stored in the local storage immediately before the sub-play items become the current sub-playitem information.

The five playitems. #1, #2, #3, #4, and #5 respectively refer to 00001.m2ts, 00002.m2ts, 00003.m2ts, 00004.m2ts, and 00005.m2ts.

The five sub-playitems #1, #2, #3, #4, and #5 of sub-path ID=0 respectively refer to 10001.m2ts, 10002.m2ts, 10003.m2ts, 10004.m2ts, and 10005.m2ts.

The five sub-playitems #1, #2, #3, #4, and #5 of sub-path ID=1 respectively refer to 20001.m2ts, 20002.m2ts, 20003.m2ts, 20004.m2ts, and 20005.m2ts.

The playitems in the main path have the same stream number table such as the one shown on the upper-right corner of FIG. 3. This stream number table has three entries that have been respectively assigned with stream numbers "1", "2", and "3". The three entries respectively permit playback of (i) a primary video stream that is referred to by the playitem information of the main path, (ii) a presentation graphics stream (PG#1) that is encompassed by an AV clip that is referred to by the sub-playitem (sub-path ID=0), and (iii) a presentation graphics stream (PG#2) that is encompassed by an AV clip that is referred to by the sub-playitem (sub-path ID=1).

When the current subtitle stream number is "2", the corresponding stream entry is PG#1 indicated by sub-path ID=0, and thus PG#1 indicated by sub-path ID=0 is played back in synchronization with the playback of the playitem.

Figure 4:
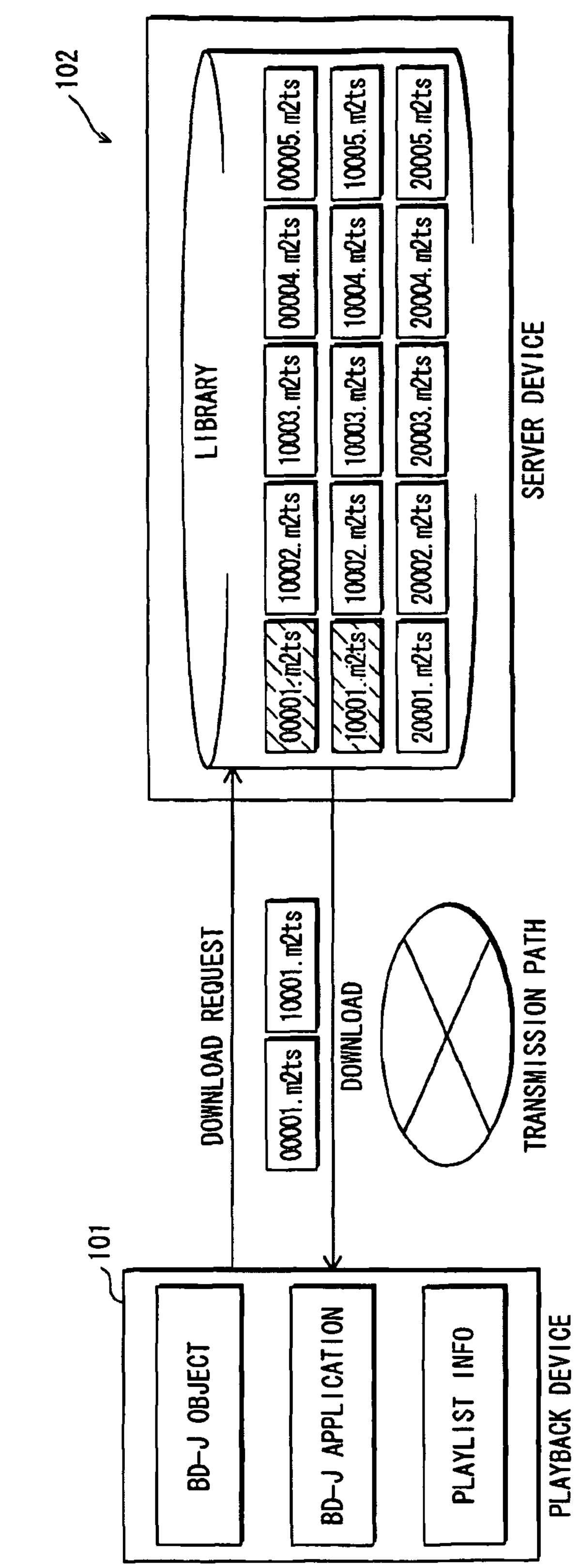
FIG. 4 shows how the playlist shown in FIG. 3 is played back.

FIG. 4 shows how the playlist shown in FIG. 3 is played back. The right-hand side of FIG. 4 shows the WWW server 102, and the left-hand side shows the playback device 101. The middle part of FIG. 4 shows a transmission path which is, for example, the Internet or an intranet. The 00001.m2ts, 00002.m2ts, 00003.m2ts, 00004.m2ts, and 00005.m2ts shown in FIG. 3 exist in the local storage 103. As shown in FIG. 4, of the AV clips shown in the FIG. 4, 00001.m2ts and 10001.m2ts are transmitted from the WWW server 102 to the playback device 101 in response to a download request transmitted to the WWW server 102.

In the database of the server device, the AV clips are stored and managed in files whose file names are none of 00001.m2ts, 00002.m2ts, 00003.m2ts, 00004.m2ts, and 00005.m2ts. This is because files that may constitute a virtual package may be accessed by aliases by manifest files.

The following describes structural elements of the playback device 101 for performing a playback of a playlist, a download request, and a download. The structural elements for performing these processes include the BD-J application and BD-J object. The following describes these structural elements.

<BD-J Application>

The "BD-J application" is a Java™ application which is activated by an application signaling that specifies the Title as the life cycle, the application signaling being performed by the platform unit that has been fully implemented with Java 2 Micro_Edition (J2ME) Personal Basis Profile (PBP 1.0) and Globally Excecutable MHP specification (GEM 1.0.2) for package media targets. The BD-J application starts a playback of a playlist by instructing a Java™ virtual machine to generate a JMF (Java Media Frame work) player instance for playing back the playlist information. The JMF player instance is data that is actually generated in the heap memory of the virtual machine based on a JMF player class.

The JMF A "BD://00001.mpls"; is a method that instructs the Java™ virtual machine to generate a player instance for playing back a playlist of a file 00001.mpls. Here, the "A.play" is a method that instructs the JMF player instance to play back. The JMF player instance is generated based on a JMF library.

After the JMF instance is generated, the WWW server 102 is requested to download an AV clip that is necessary for playing back the playlist. For performing the download, it is possible to establish a connection for obtaining the AV clip in the WWW server 102 by using the openConnection method in the Java software library called "java.net". An example of such a connection is "new java.net.URL(http://xxx.com/vp_data/00001.m2ts.openConnection( )", where "http://xxx.com/vp_data/00001.m2ts" indicates the URL of the file on the server.

Before the above-mentioned playback of the playlist and download of the AV clip, the BD-J application receives a user operation via a GUI framework. The GUI framework used by the BD-J application includes a HAVi framework defined in GEM 1.0.2, and includes a remote control navigation mechanism defined in GEM 1.0.2.

With this structure, the Java™ application can achieve a screen display which is a combination of a display of a moving image and a display of a button, a text, and/or an online display (content of BBS) based on the HAVi framework, enabling the above-mentioned playback of the playlist and download of the AV clip to be achieved with use of a remote control. A set of files constituting the BD-J application is converted into a Java™ archive file that is in compliance with the specification described in http://Java™sun.com/j2se/1.4.2/docs/guide/jar/jar.html. The Java™ archive file is a file in the ZIP format specialized for Java™, and the contents of the file can be confirmed with use of commercial ZIP decompression program.

<BDJ Object>

The BDJ object is data that includes an application management table (ApplicationManagementTable( )), and causes the platform unit to perform the application signaling for switching titles during a playback of a BD-ROM. More specifically, the ApplicationManagementTable( ) includes "application_id" and "application_control_code", where the application_id indicates a BD-J application to be executed, and the application_control_code indicates a control to be performed when the BD-J application is activated. The application_control_code defines the first execution state of the application after a title is selected. Also, the application_control_code_can define AUTOSTART or PRESENT, where with AUTOSTART, the BD-J application is loaded into the virtual machine and is started automatically, and with PRESENT, the BD-J application is loaded into the virtual machine, but is not started automatically.

The following describes the internal structure of the playback device.

Figure 5:
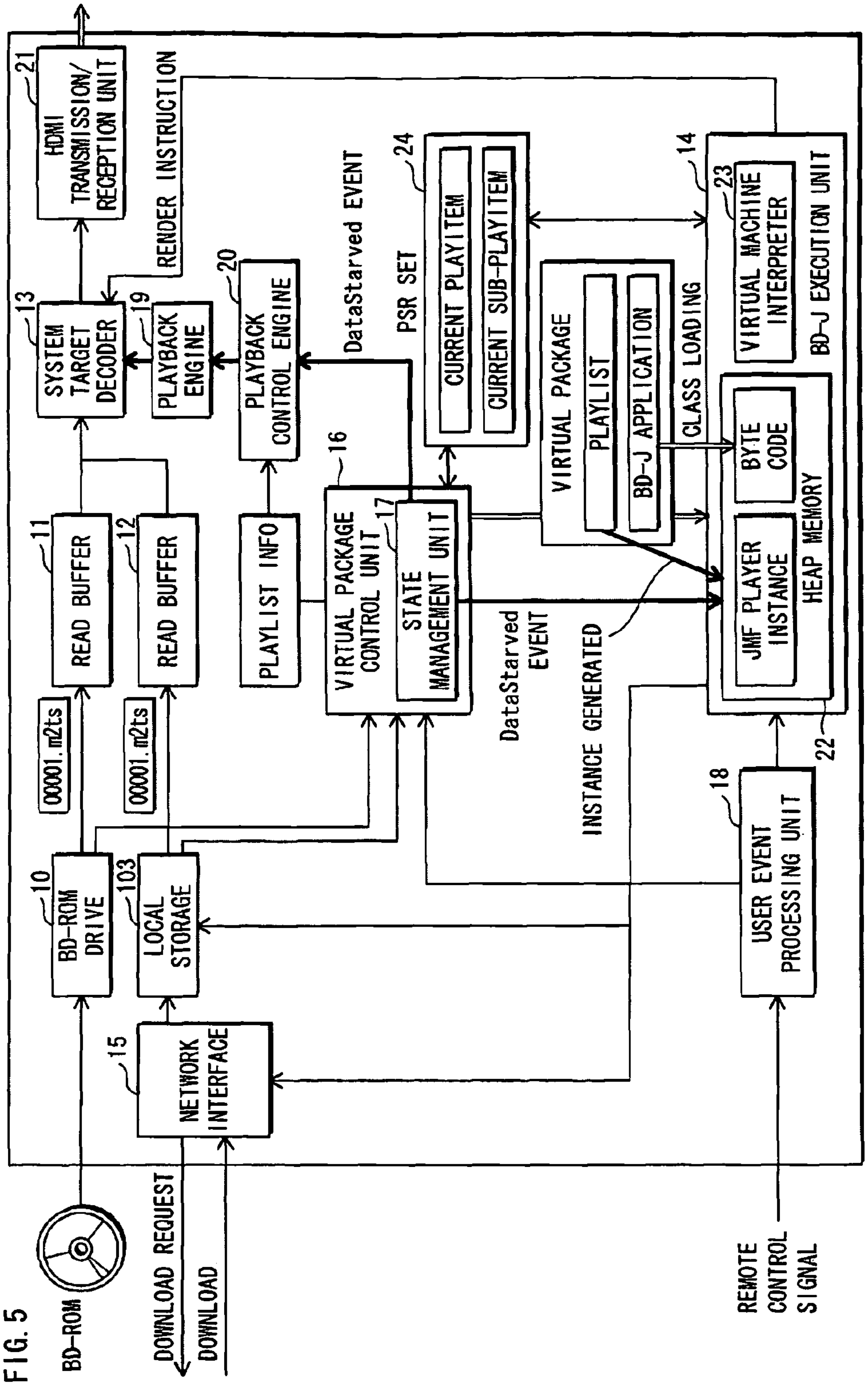
FIG. 5 shows an example of the structure of a playback device 101.

FIG. 5 shows an example of the structure of a playback device 101. The playback device 101 is composed of a BD-ROM drive 10, a read buffer 11, a read buffer 12, a system target decoder 13, a BD-J execution unit 14, a network interface 15, a virtual package control unit 16, a state management unit 17, a user event processing unit 18, a playback engine 19, a playback control engine 20, an HDMI transmission/reception unit 21, a heap memory 22, a virtual machine interpreter 23, and a PSR set 24. A description is now given of each of these components.

<BD-ROM Drive 10>

The BD-ROM drive 10 reads data from a BD-ROM disc, and stores the data in the read buffer 11.

<Read Buffer 11>

The read buffer 11 is a buffer constituted from a memory or the like that temporarily stores data read out from the local storage.

<System Target Decoder 13>

The system target decoder 13 performs a demultiplexing process onto source packets read out into the read buffer 11 or the read buffer 12, and performs a process of decoding and playing back the streams. The system target decoder 13 also performs a process of decoding and playing back graphics data such as JPEG and PNG for display of a menu or the like by the BD-J execution unit 14. Details of the system target decoder 13 are given later.

<BD-J Execution Unit 14>

The BD-J execution unit 14 is a program processing engine that executes the BD-J application transferred from the virtual package control unit 16. The BD-J execution unit 14 performs operations in accordance with the program of the BD-J application, and performs control as follows. (1) The BD-J execution unit 14 performs playlist playback with respect to the virtual package control unit 16. (2) The BD-J application unit 14 stores the update kit from a WWW server such as the Internet to local storage. (3) The BD-J application unit 14 instructs that the virtual package is constructed by combining the BD-ROM and the update kit. (4) The BD-J application unit 14 sets the values of the player variables. (5) The BD-J application unit 14 transfers PNG and/or JPEG for graphics for a menu or a game to the system target decoder, to display a screen. These operations can be performed flexibly in accordance with the makeup of the programs. What kind of control is performed is determined according to programming procedure of the BD-J application in the authoring procedure.

<Network Interface 15>

The network interface 15 achieves a communication function in the playback device. Upon receiving a URL specified from the BD-J application, the network interface 15 establishes a TCP connection, FTP connection or the like with the web site of the URL, enabling the Java™ application to download information from the web site.

<Virtual Package Control Unit 16>

The virtual package control unit 16 controls the BD-ROM drive 10 and the local storage 103 to construct a virtual package, and has the function of controlling playback by the player. The virtual package is a virtual BD-ROM package constructed by combining BD-ROM contents in the memory, based on contents recorded on a BD-ROM disc, the difference data stored in the local storage 103, and the merge management information stored in the local storage 103. The constructed virtual package has the same format as the data structure of the BD-ROM. The virtual package may be constructed when a disc is inserted in the playback device 1600 or when a virtual package construction instruction is executed by the BD-J execution unit 14. After the virtual package is constructed, the virtual package control unit 16 controls the playback process of the AV clip via the playlist information, in accordance with a playback instruction from the BD-J execution unit or a notification by the user event processing unit. Furthermore, the virtual package control unit 16 also performs setting and referencing of the player variable, and performs playback operations.

<State Management Unit 17>

The state management unit 17 manages the state (any of Missing state, Enable state, and Disable state) which each AV clip stored in the BD-ROM or the local storage is in, and performs a control on whether or not to stop the playback of a playlist.

The Missing state is a state in which an AV clip referred to by the playitem information or the sub-playitem information is not stored in any of the BD-ROM or the local storage.

The Enable state is a state in which the AV clip can be played back by the virtual package control unit 16, and is controlled by the API of the BD-J application. When an AV clip is set to the Enable state by the API, the AV clip comes to have the read-only attribute, and becomes playable by the virtual package control unit 16.

The Disable state is a reversed state of the Enable state, and in which the AV clip cannot be played back by the virtual package control unit 16. An AV clip is in the Disable state when the AV clip has not at all been set to the Enable state by the BD-J application. When the BD-J application is to delete or overwrite an AV clip in the Enable state, the AV clip should be changed to the Disable state once by the API.

AV clips that are in the Missing state or the Disable state are generically called "Unavailable clips".

The control on whether or not to stop the playback of a playlist is specifically a control where, when the current sub-playitem information changes, it is judged whether the AV clip referred to by the current sub-playitem information is an Unavailable clip, and when the AV clip is an Unavailable clip, a DataStarved event is notified to the JMF player instance and the playback control engine so that the JMF player instance and the playback control engine are transferred from the playback state to the stop state.

<User Event Processing Unit 18>

The user event processing unit 18, in response to a user operation input via a remote control, requests the BD-J execution unit 14 or the virtual package control unit 16 to execute a process. For example, when a button on the remote control is pressed, the user event processing unit 18 requests the BD-J execution unit 14 to execute a command indicated by the button. For example, when a Forward/Backward play button on the remote control is pressed, the user event processing unit 18 requests the virtual package control unit 16 to execute a Forward/Backward process onto the AV clip of the playlist that is currently played back.

<Playback Engine 19>

The playback engine 19 executes AV playback functions. The AV playback functions in the playback device are a group of traditional functions succeeded from CD and DVD players. The AV playback functions include: Play, Stop, Pause On, Pause Off, Still Off, Forward Play (with specification of the speed), Backward Play (with specification of the speed), Audio Change, SubTitle Change, and Angle Change. To realize the AV playback functions, the playback engine 19 controls the system target decoder to decode a portion of the AVClip that corresponds to a desired time.

<Playback Control Engine 20>

The playback control engine 20 performs playback control functions for the playlist. The playback control functions for the playlist specifically mean that, among the AV playback functions performed by the playback engine 19, the Play and Stop functions are performed in accordance with the current playlist information and the clip information.

<HDMI Transmission/Reception Unit 21>

The HDMI transmission/reception unit 21, via an HDMI (High Definition Multimedia Interface), receives, from a device connected to the HDMI, information concerning the device, and sends non-compressed digital video to the device connected to the HDMI, together with LPCM and compressed audio data, where the non-compressed digital video is obtained by decoding by the system target decoder.

<Heap Memory 22>

The heap memory 22 is a stack memory reserved for the BD-J execution unit 14, and stores the JMF player instance generated by the BD-J application, and a byte code generated by performing a class loading onto the BD-J application. These are stored in a thread manner and are supplied for the execution by the virtual machine interpreter 23 in the First-In-First-Out manner.

<Virtual Machine Interpreter 23>

The virtual machine interpreter 23 converts the byte code stored in the heap memory 22 into a native code that can be executed by the CPU, and causes the CPU to execute the native code.

<PSR Set 24>

The PSR set 24 is composed of a player setting register storing player variables, and a player state register. The player variables fall into system parameters (SPRM) showing the state of the player, and general parameters (GPRM) for general use.

FIG. 6 is a list of the system parameters (SPRM).

SPRM (0) :Language Code
SPRM (1) :Primary audio stream number
SPRM (2) :Subtitle stream number
SPRM (3) :Angle number
SPRM (4) :Title number
SPRM (5) :Chapter number
SPRM (6) :Program number
SPRM (7) :Cell number
SPRM (8) :Selected key name
SPRM (9) :Navigation timer
SPRM (10) :Playback time information
SPRM (11) :Player audio mixing mode for Karaoke
SPRM (12) :Country code for parental management
SPRM (13) :Parental level
SPRM (14) :Player setting value (video)
SPRM (15) :Player setting value (audio)
SPRM (16) :Language code for audio stream
SPRM (17) :Language code for audio stream (extension)
SPRM (18) :Language code for subtitle stream
SPRM (19) :Language code for subtitle stream (extension)
SPRM (20) :Player region code
SPRM (21) :Secondary video stream number
SPRM (22) :Secondary audio stream number
SPRM (23) :Player state
SPRM (24) :Reserved
SPRM (25) :Reserved
SPRM (26) :Reserved
SPRM (27) :Reserved
SPRM (28) :Reserved
SPRM (29) :Reserved
SPRM (30) :Reserved
SPRM (31) :Reserved The SPRM (10) is updated every time picture data belonging to an AV clip is displayed. In other words, if the playback device causes a new piece of picture data to be displayed, the SPRM (10) is updated to show the display time (PTS) of the new picture. The current playback point can be known by referring to the SPRM (10).

The language code for the audio stream of the SPRM (16) and the language code for the subtitle stream of the SPRM (18) are items that can be set in the OSD of the player or the like, and show default language codes of the player. For example, it is possible to include on the BD-ROM disc a BD-J application having the following function. Namely, if the language code for audio stream is English, when a playlist is played back, a stream entry having the same language code is searched for in the stream selection table of the playitem, and the corresponding audio stream is selected and played back. These SPRMs are respectively stored into registers each of which has a capacity of 32 bits. The numbers in the parentheses are used to identify the SPRMs, basically indicating register numbers of the corresponding registers (note that SPRM (21) and SPRM (22) do not indicate register numbers of the corresponding registers).

<Streaming-Like Playback Function>

Figure 7:
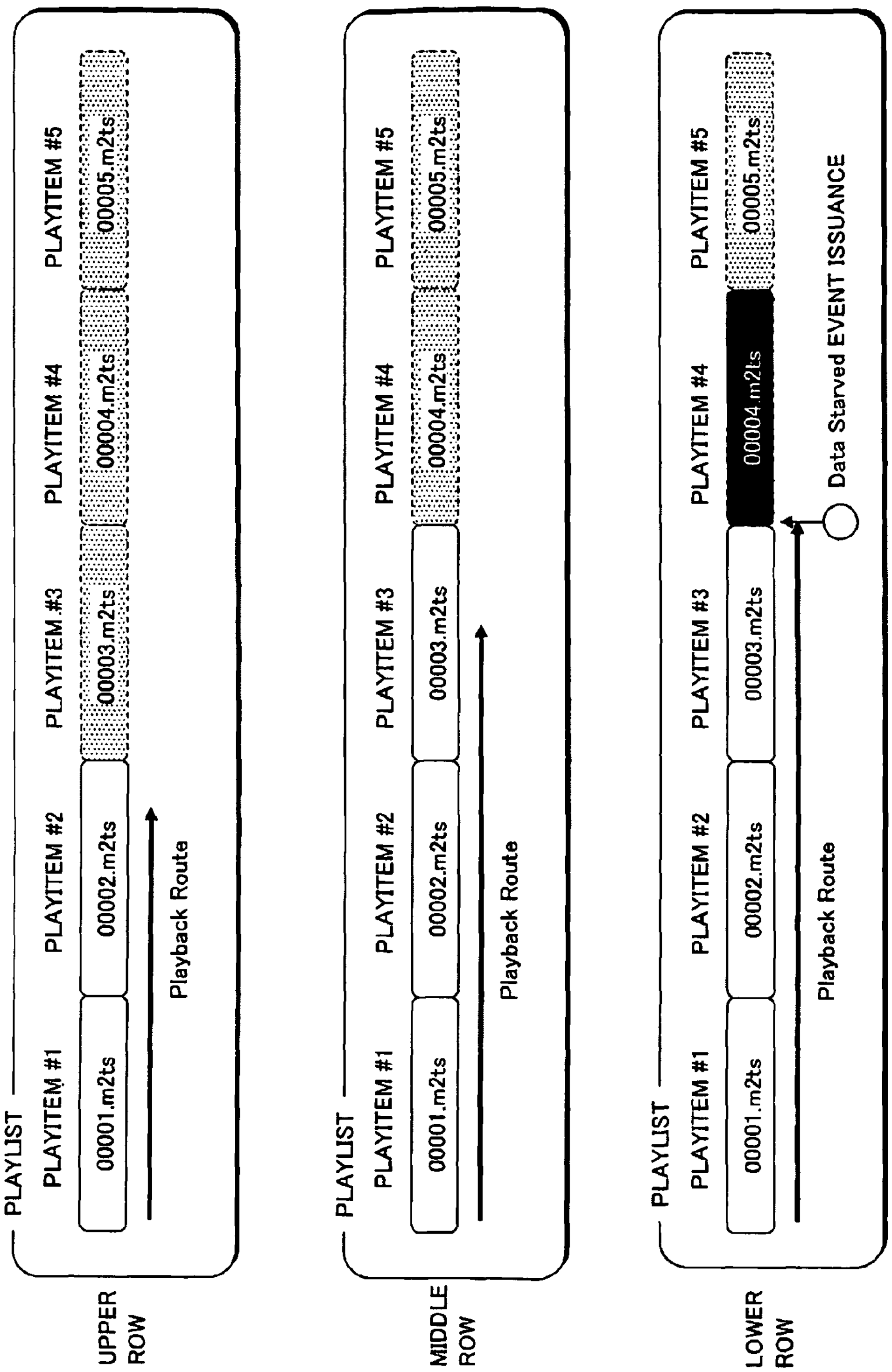
FIG. 7 illustrates the streaming-like playback function.

Referring now to FIG. 1, a description is given of playback transitioning by the virtual package control unit 16 in the streaming-like playback function using the virtual package. FIG. 7 illustrates the streaming-like playback function.

The streaming-like playback function is to perform the playback operation and the download operation in parallel with each other so that an AV clip that is referred to by playitem information or sub-playitem information and that is assigned with the progressive attribute is stored into the local storage immediately before the playitem information or the sub-playitem information playitem becomes the current playitem information or the current sub-playitem information.

The upper row of FIG. 7 shows a playlist. Five playitems in the playlist refer to 0001.m2ts, 0002.m2ts, 00003.m2ts, 00004.m2ts, and 00005.m2ts, respectively. These are all contents stored in the local storage, and have a progressive attribute. Of these, downloading of 00001.m2ts and 00002.mt2s is already complete, and are set to an Enable state by the BD-J application. Each of 00003.m2ts, 00004.m2ts and 00005.m2ts has either not been downloaded, or has been downloaded but is in a Disable state. As shown in the upper row of FIG. 7, when the package control unit 16 plays back a playlist in order from the top playitem, the payback device plays back the playitems #1 and #2 normally because these playitems refer to AV clips that are in the Enable state.

The middle row of FIG. 7 shows the playback position having further advanced from the upper row in FIG. 7. The middle row shows that downloading of 00003.m2ts is complete and 00003.m2ts is put in the Enable state before the playback position moves to the playitem #3. Therefore, the playback proceeds to the playitem #3.

The lower row of FIG. 7 shows the playback position having further advanced from the middle row in FIG. 7. The lower row shows that 00004.m2ts, which is to be referred to, has not been downloaded or is in the Disable state. In this case, the DataStarved event is output. Upon receiving the DataStarved event, the BD-J application recovers by performing control to complete downloading of 00004.m2ts, set 00004.m2ts to the Enable state, and start playback from the point at which the DataStarved event was received.

As described above, in the streaming-like playback, the progress of playback is not interrupted as far as the AV clip of the playitem which is in the next playback position is downloaded and set to the Enable state preliminarily.

Figure 8:
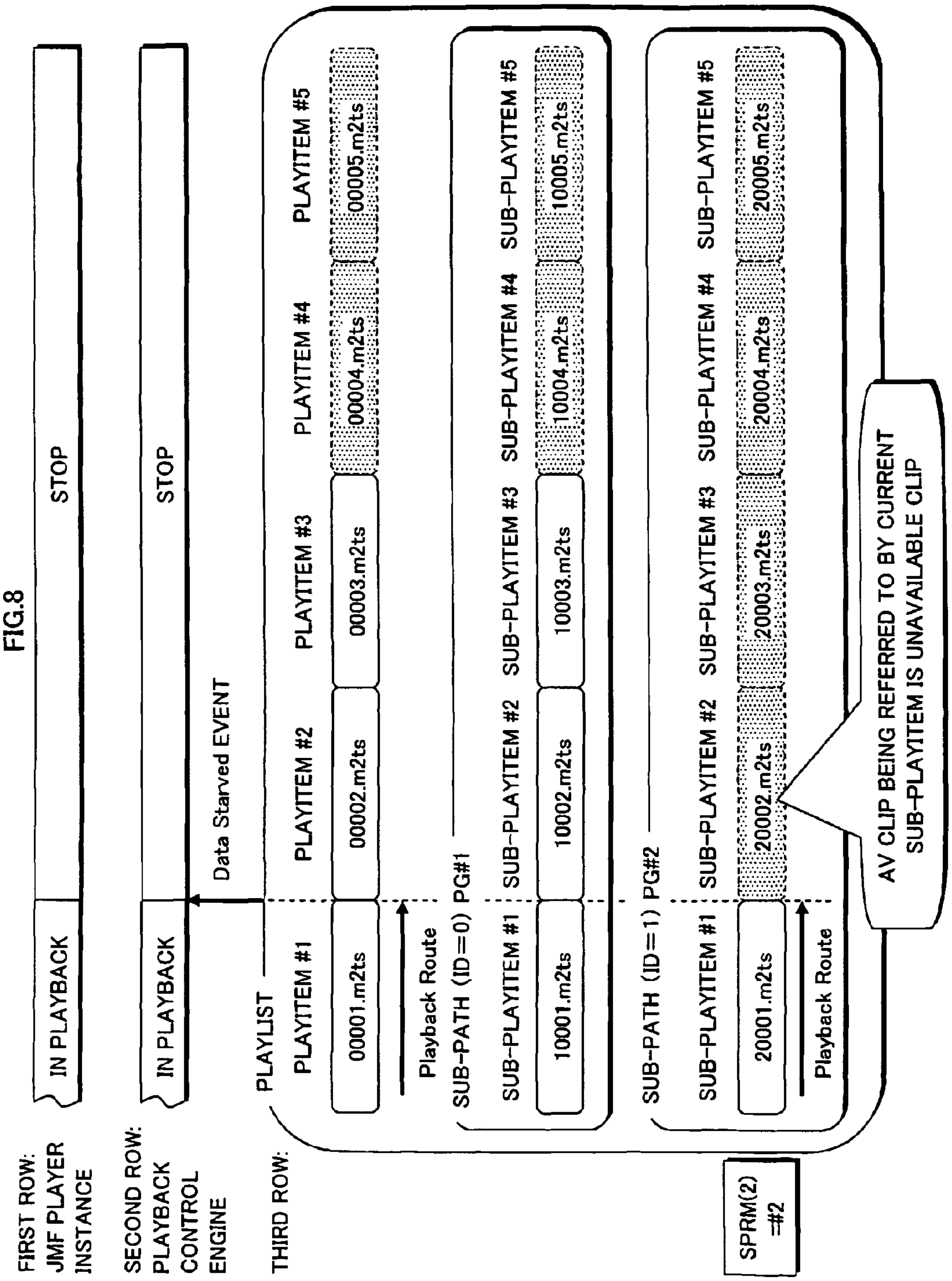
FIG. 8 shows an example of how the streaming-like playback proceeds with use of sub-playitems.

FIG. 8 shows an example of how the streaming-like playback proceeds with use of sub-playitems.

The third row of FIG. 8 shows the playlist of FIG. 3 with addition of arrows that indicate positions to which the playback has proceeded.

The first row of FIG. 8 shows the state of the JMF player instance. The second row shows the state of the playback control engine. The third row shows the subject playlist. As shown in the first row, the JMF player instance in the playback state enters into the stop state when the DataStarved event is output. The DataStarved event is an event that indicates that there is no data to be played back. Upon receiving the DataStarved event, the JMF player instance and the playback control engine transit to the stop state. Because it has a function to stop the operation of the JMF player instance and the playback control engine, the DataStarved event is also called "playback stop event".

As shown in the second row, the playback control engine in the playback state, together with the JMF player instance, enters into the stop state when the DataStarved event is output. It would be understood from this that the JMF player instance and the playback control engine transit to the stop state triggered by the DataStarved event.

In the example shown in FIG. 8, sub-playitem #1 belonging to sub-path (ID=0) is the current sub-playitem information. Therefore, the playback proceeds to playitem #1 and sub-playitem #1. At the stage of the next playitem playitem #2, 20002.m2ts, which is referred to by sub-play item #2 corresponding to playitem 29. #2, is an Unavailable clip. Thus, the DataStarved event should be output to stop the playback when the current sub-playitem becomes sub-playitem #2.

Figure 9:
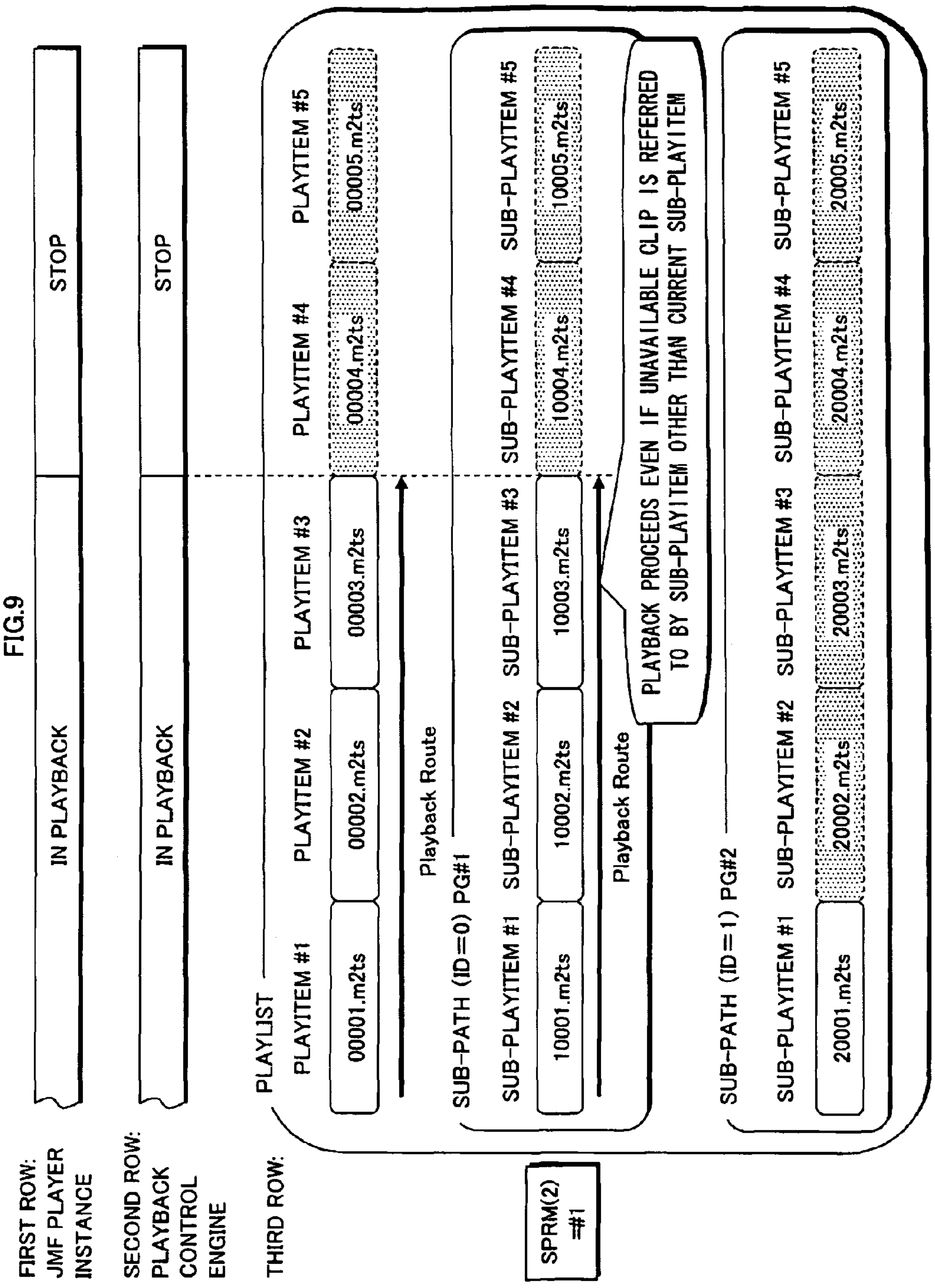
FIG. 9 shows a state where the playback position is reaching playitem #2.

FIG. 9 shows a state where the playback position is reaching playitem #2. In the example shown in FIG. 9, sub-playitem #2, which belongs to sub-path (ID=0) and corresponds to playitem #2 in which the playback position exists, refers to an AV clip in the Unavailable state. However, at this point in time, sub-playitem #2 belonging to sub-path (ID=1) has either not been downloaded or is referring to an AV clip in the Disable state. The SPRM(2) indicates sub-playitem #2 belonging to sub-path (ID=0). Therefore, even if an AV clip to be referred to by sub-playitem #2 belonging to sub-path (ID=1) is not in the Enable state, the virtual package control unit 16 can continue the playback.

As described above, in the example shown in FIG. 9, even if 20002.m2ts is an Unavailable clip, the progress of the playback is not interrupted. Thus the playback proceeds to playitem #3. At the stage of the next playitem playitem #4, 10004.m2ts, which is referred to by sub-playitem #4 corresponding to playitem #4, is an unavailable clip. Thus, the playback stops when the current playitem information becomes playitem #4.

The following can be said from the above description. That is to say, when it is intended to download all AV clips referred to by sub-playitems of all sub-paths (ID=0, ID=1) which correspond to the playback section of playitem #2, the AV clips to be downloaded are 10001.m2ts, 10002.m2ts, 10003.m2ts, 10004.m2ts, 10005.m2ts, 20001.m2ts, 20002.m2ts, 20003.m2ts, 20004.m2ts, and 20005.m2ts. This indicates that the virtual package control unit 16 should wait for as many AV clips as sub-paths to be downloaded. In this case, as the number of sub-paths increases, the user must wait for a longer time during a playback of the playlist.

On the other hand, in the above-described operation with respect to sub-playitems, when all AV clips including the streams specified by the Primary audio stream number SPRM (1), the subtitle stream number SPRM (2), the Secondary video stream number SPRM (21), and the Secondary audio stream number SPRM (22) are in the Enable state, the playback can be continued without waiting until the AV clips of sub-playitems of other sub-paths are in the Enable state. With this structure, the user can continue playback of the playlist without waiting for the downloading of unnecessary AV clips.

Figure 10:
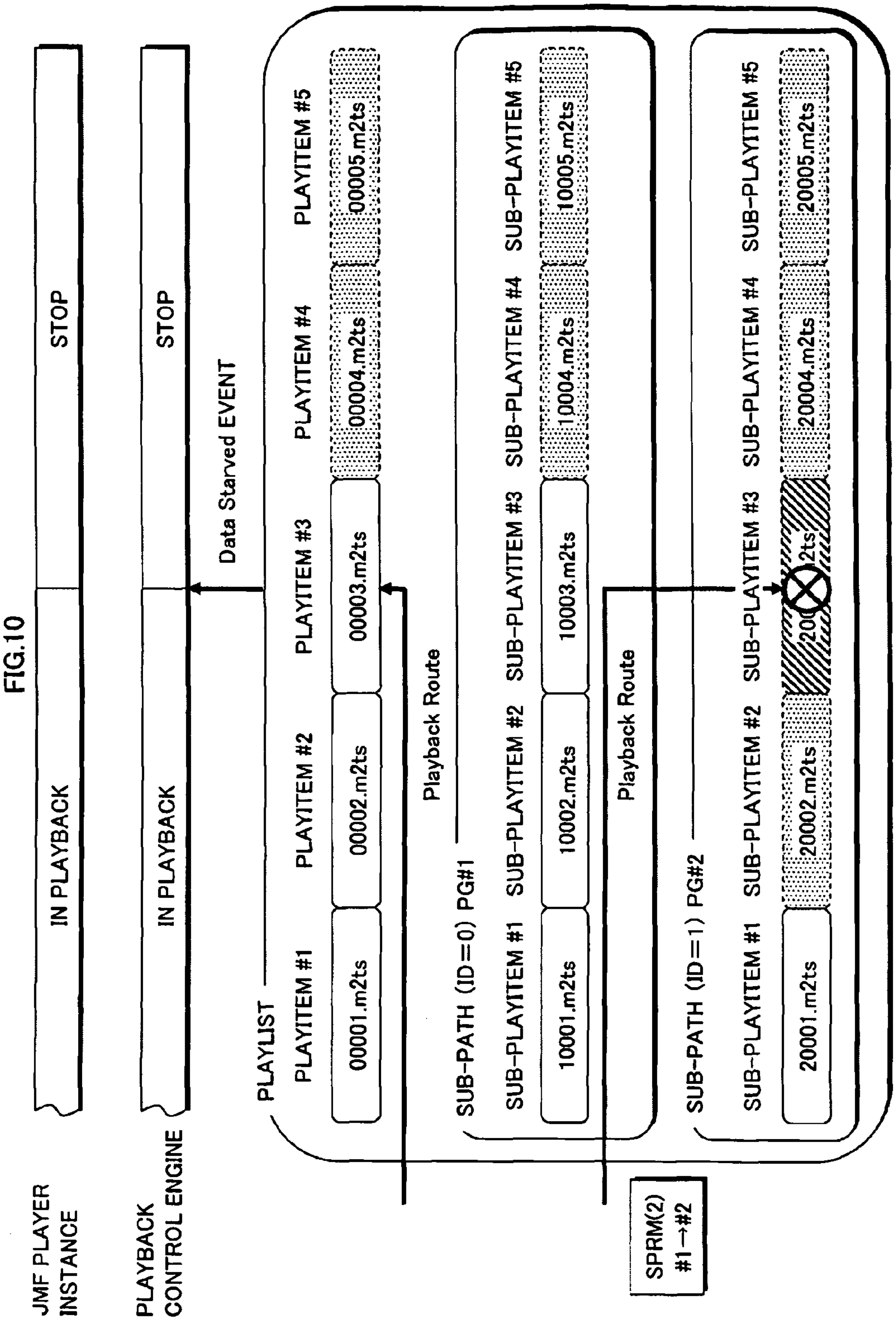
FIG. 10 shows a state where, after the user requested a subtitle change, the current playback position has moved from sub-playitem #3 that is referring to 10003.m2ts of sub-path (ID=0), to sub-playitem #3 that is referring to 20003.m2ts of sub-path (ID=1).

FIG. 10 shows a state where, after the user requested a subtitle change, the current playback position has moved from sub-playitem #3 that is referring to 10003.m2ts of sub-path (ID=0), to sub-playitem #3 that is referring to 20003.m2ts of sub-path (ID=1).

When SPRM(2) is changed to 3 by a user operation or the like, the subtitle to be played back is sub-playitem #3 of sub-path (ID=1). The 20003.m2ts referred to by sub-playitem #3 is an Unavailable clip. Therefore, the DataStarved event is output at the same time as this change occurs. In this way, when a subtitle change is requested and it is found that an AV clip including a subtitle stream of the change destination subtitle is either not yet downloaded or is in the Disable state, the virtual package control unit 16 stops the playback and notifies the BD-J application of the DataStarved event.

Figure 11:
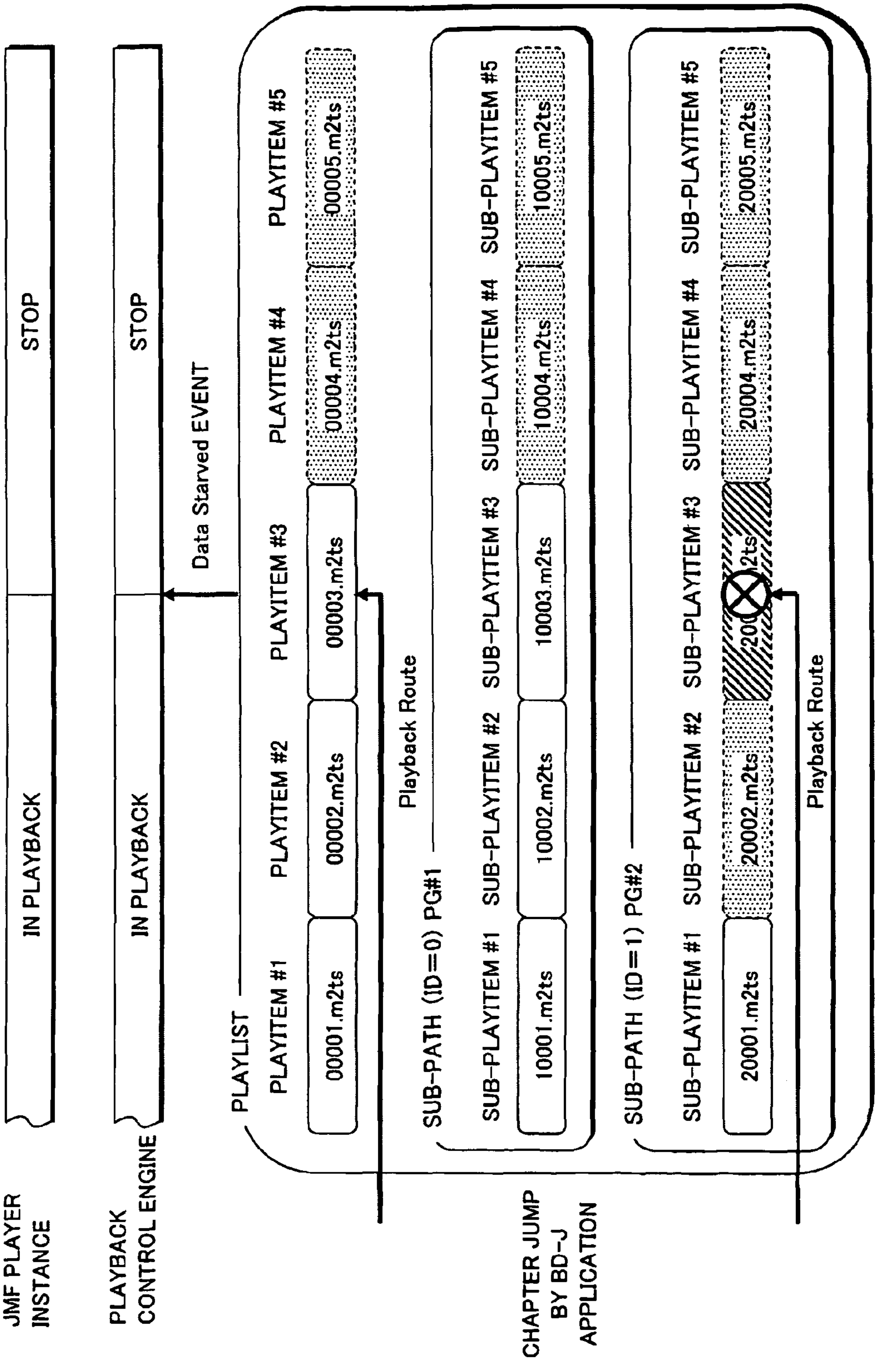
FIG. 11 shows a state where, after a chapter jump occurred, playitem #3 is the current playitem, and sub-playitem #3 is the current sub-playitem information.

FIG. 11 shows a state where, after a chapter jump occurred, playitem #3 is the current playitem, and sub-playitem #3 is the current sub-playitem information. The 20003.m2ts referred to by sub-playitem #3 is an Unavailable clip. Therefore, the DataStarved event is output to stop the playback.

The playback stops when the sub-playitem referring to an Unavailable clip becomes the current sub-playitem information. In view of this, it is possible to continue the playback by downloading by priority a clip file that is being referred to by the next playitem and by the next sub-playitem and that includes the current stream being the playback target.

As described above, in a jump playback such as the chapter jump, the virtual package control unit 16 notifies the DataStarved event to the BD-J application when an AV clip, which is either not yet downloaded or is in the Disable state, is to be referred to by a sub-playitem that corresponds to any of the Primary audio stream number SPRM (1), the subtitle stream number SPRM (2), the Secondary video stream number SPRM (21), and the Secondary audio stream number SPRM (22). By defining the playback operations of the virtual package control unit 16 in this way, playback can continue with minimum downloading of AV clips.

Figure 12:
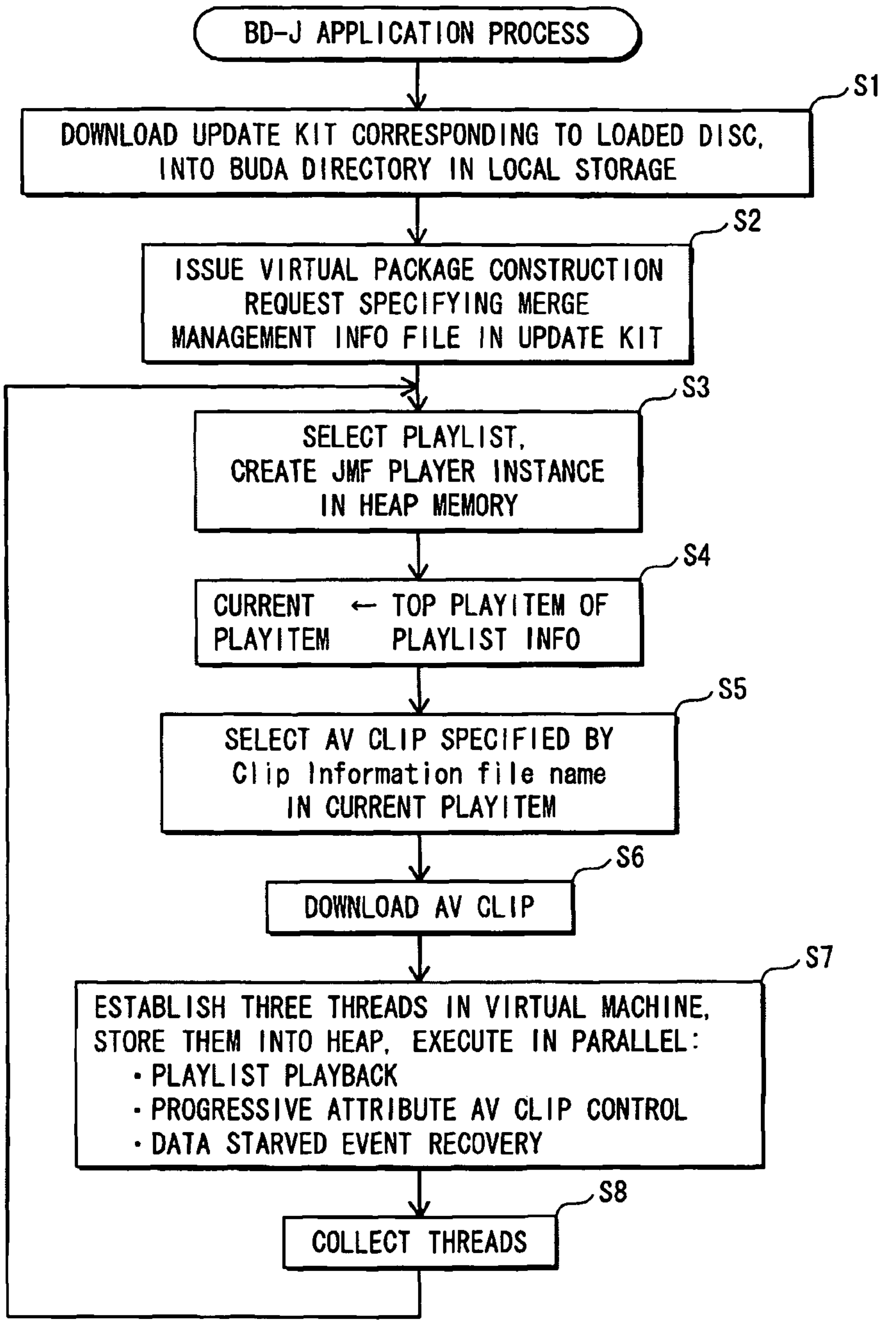
FIG. 12 is a flowchart showing the procedure of the process performed by the BD-J application.

FIG. 12 is a flowchart showing the procedure of the process performed by the BD-J application.

In step S1, and update kit corresponding to a loaded BD-ROM is downloaded into the BUDA (Binding Unit Data Area) directory in the local storage. In step S2, a virtual package construction request specifying the Missing state in the update kit is issued.

Following this step, a loop of steps S3 through S8 is executed. In this loop, a playlist is selected and a JMF player instance is created (step S3), a top playitem of the playlist information is set as the current playitem (step S4), an AV clip specified by Clip_information_file_name in the current playitem is selected (step S5), the AV clip is downloaded (step S6), and the following three threads are established in the virtual machine and the processes are executed in parallel with each other (step S7):

(1) playlist playback;

(2) progressive attribute AV clip control; and (3) DataStarved event recovery process.

After these three processes are completed, the three threads are ended, and the control returns to step S3.

Figure 13:
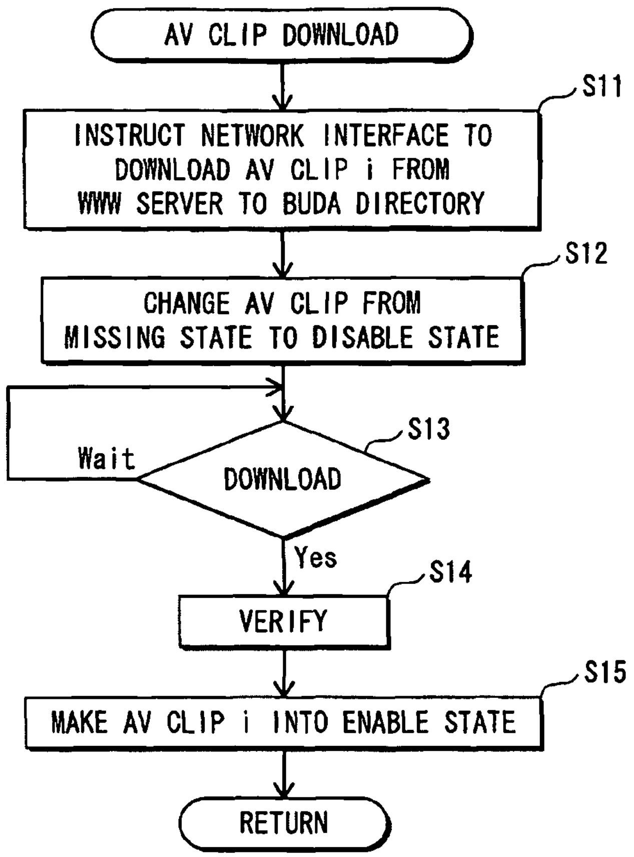
FIG. 13 is a flowchart showing the procedure of the process of downloading AV clips.

FIG. 13 is a flowchart showing the procedure of the process of downloading AV clips.

In step S11, a network interface is instructed to download an AV clip i from a server device on the WWW to the BUDA directory. In step S12, the AV clip is changed from the Missing state to the Disable state. In step S13, a completion of the download is waited. When the download is completed, verification is performed in step S14. When the verification ends normally, the AV clip is made into the Enable state in step S15.

Figure 14:
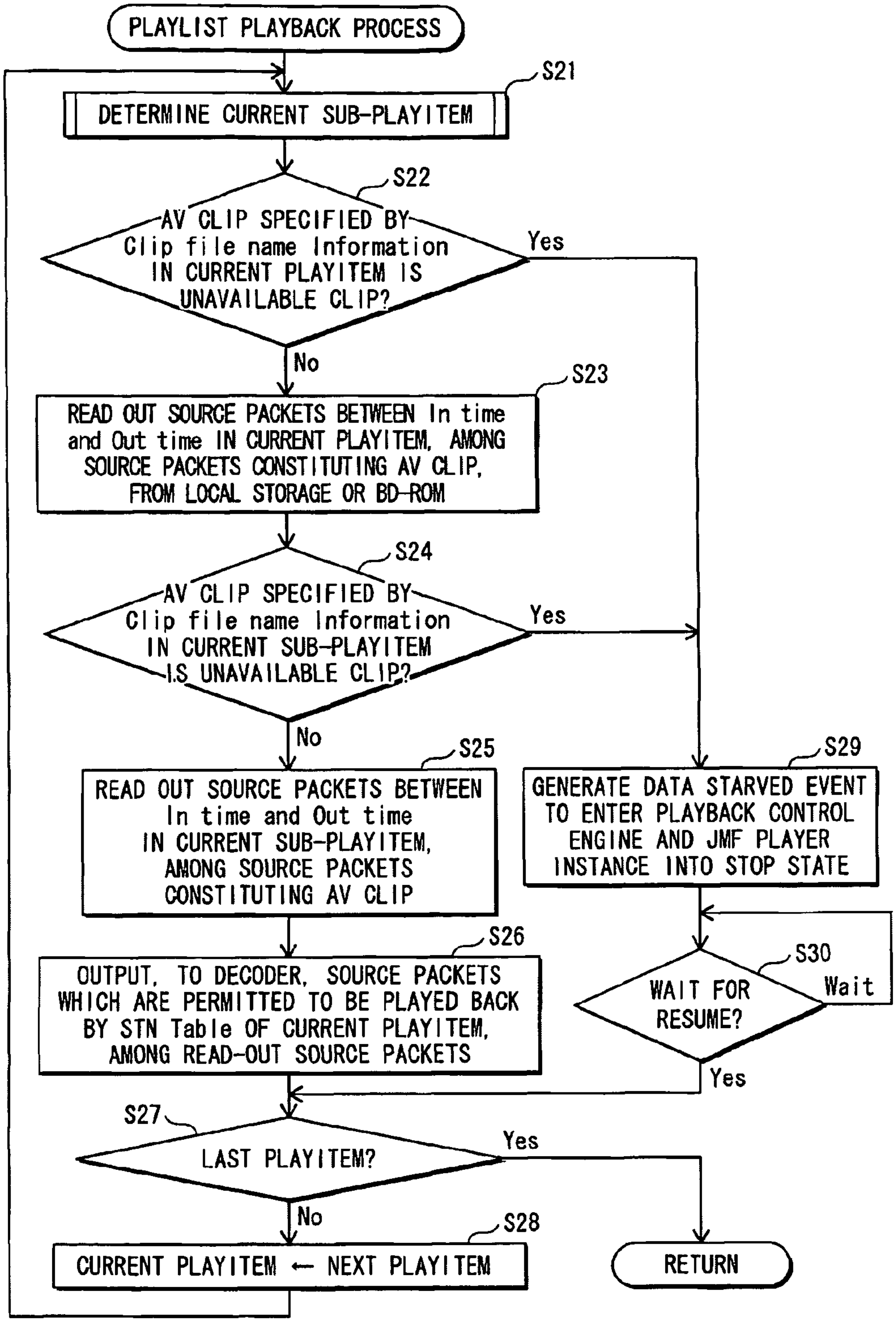
FIG. 14 is a flowchart showing the procedure of the playlist playback process.

FIG. 14 is a flowchart showing the procedure of the playlist playback process. In step S21, the current sub-playitem information is determined, and the control moves to a loop of steps S22 through S24. The loop of steps S22 through S24 is performed as follows. It is judged whether or not the AV clip specified by Clip_information_file_name in the current playitem is an Unavailable clip (step S22). When it is judged that the AV clip is not an Unavailable clip, source packets between In_Time and Out_Time in the current playitem are read out from the BD-ROM, among the source packets constituting the AV clip (step S23). It is judged whether or not the AV clip specified by Clip_information_file_name in the current sub-playitem information is an Unavailable clip (step S24). When it is judged that the AV clip is not an Unavailable clip, source packets between In_Time and Out_Time in the current playitem are read out from the local storage, among the source packets constituting the AV clip (step S25). Among the read-out source packets, source packets which are permitted to be played back by the STN_table of the current playitem are output to the decoder (step S26). It is judged whether or not the current playitem is the last playitem (step S27). The current playitem is changed (step S28). These steps are performed in each round of the loop. The loop is ended when it is judged that there is no more playitem in the playlist (Yes in step S27).

When it is judged that the AV clip specified by Clip_information_file_name in the current playitem or in the current sub-playitem information is an Unavailable clip, a DataStarved event is generated to enter the playback control engine and the JMF player instance into the Stop state (step S29), and then resuming is waited for (step S30).

Figure 15:
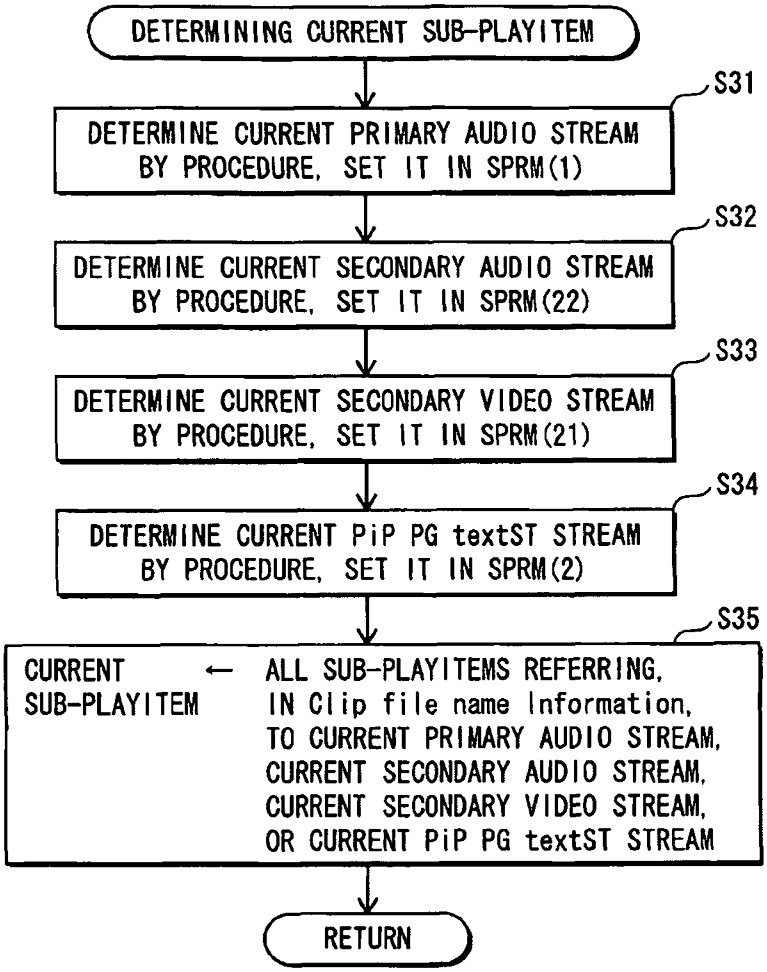
FIG. 15 is a flowchart showing the procedure of determining the current sub-playitem.

FIG. 15 is a flowchart showing the procedure of determining the current sub-playitem. In step S31, the procedure determines the current primary audio stream and sets it in SPRM (1). In step S32, the procedure determines the current secondary audio stream and sets it in SPRM(14). In step S33, the procedure determines the current secondary video stream and sets it in SPRM(21). In step S34, the procedure determines the current PG text subtitle stream and sets it in SPRM (2).

Following this, all the sub-playitems referring, in Clip_Information_file_name, to the current primary audio stream, the current secondary audio stream, the current primary video stream, or the current PG text subtitle stream, are set in the current sub-playitem.

Figure 16:
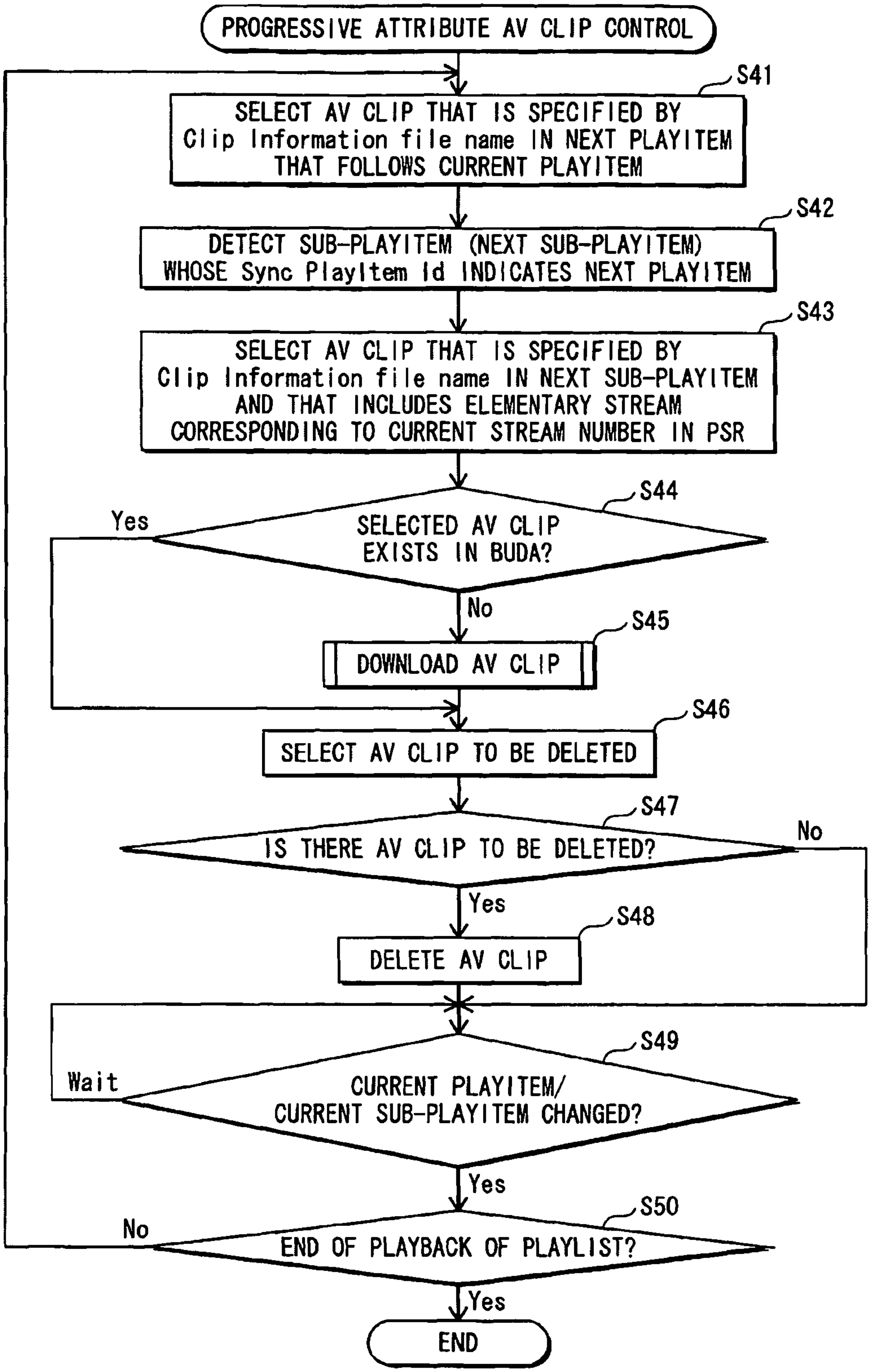
FIG. 16 is a flowchart showing the procedure of the progressive attribute AV clip control.

FIG. 16 is a flowchart showing the procedure of the progressive attribute AV clip control.

In step S41, an AV clip that is specified by Clip_Information_file_name in the playitem (next playitem) that is next to the current playitem is selected. In step S41, a sub-playitem (next sub-playitem) whose Sync_PlayItem_Id indicates the next playitem is detected. In step S43, an AV clip that is specified by Clip_Information_file_name in the next sub-playitem and that includes an elementary stream corresponding to the current stream number in PSR is selected.

In step S44, it is judged whether or not the selected AC clip exists in the local storage. When it is judged that the selected AC clip does not exist in the local storage, the selected AC clip is downloaded in step S45. Then, in step S46, an AV clip to be deleted is selected, and it is judged whether or not there is an AC clip to be deleted. When it is judged that there is an AC clip to be deleted, the AC clip is deleted in step S48. In step S49, a change of the current playitem or the current sub-playitem is waited for. When it is judged that the current playitem or the current sub-playitem has changed, it is judged whether or not the playback of the playlist has ended (step S50). When it is judged that the playback has not ended, the control moves to step S41.

Figure 17:
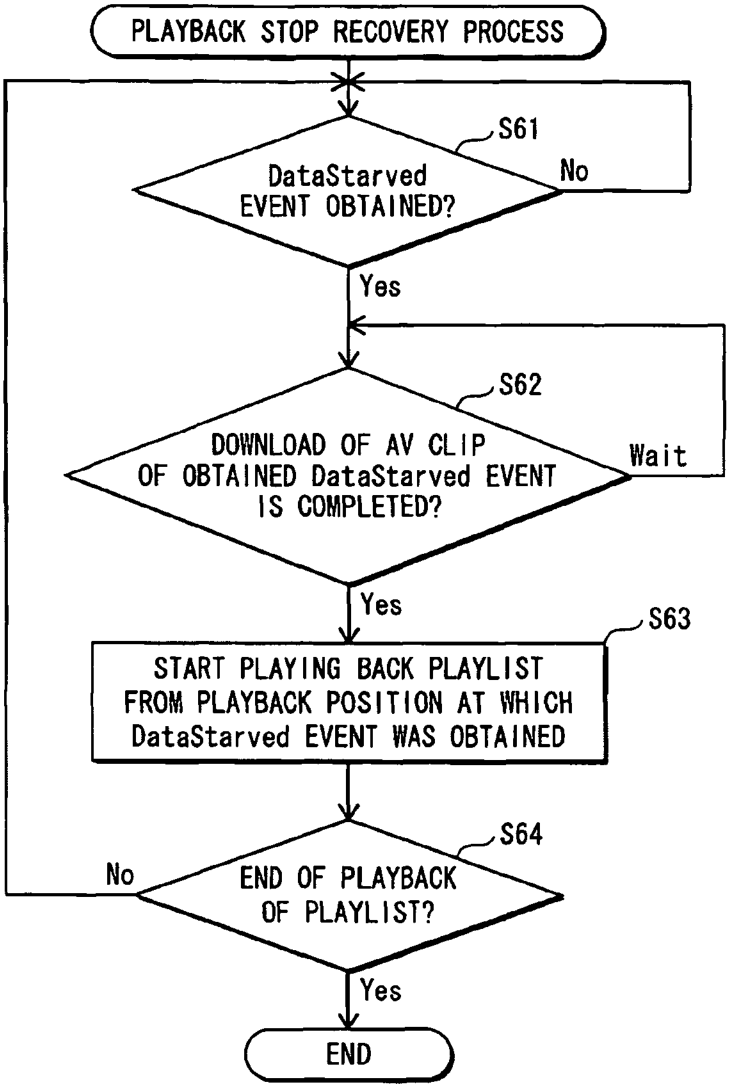
FIG. 17 is a flowchart showing the procedure of the playback stop recovery process.

FIG. 17 is a flowchart showing the procedure of the playback stop recovery process. Step S61 is a loop in which obtainment of DataStarved event is waited for. When DataStarved event is obtained, the control moves to step S62 which is an event completion waiting loop where a completion of downloading of an AV clip of the obtained DataStarved event is waited for. In step S63, a playlist is started to be played back from a playback position at which DataStarved event was obtained. In step S64, it is judged whether or not the playback of the playlist has ended.

Next, the relationships between the current playback position in the AV clip and the AV clip that is targeted to be downloaded.

Figure 18:
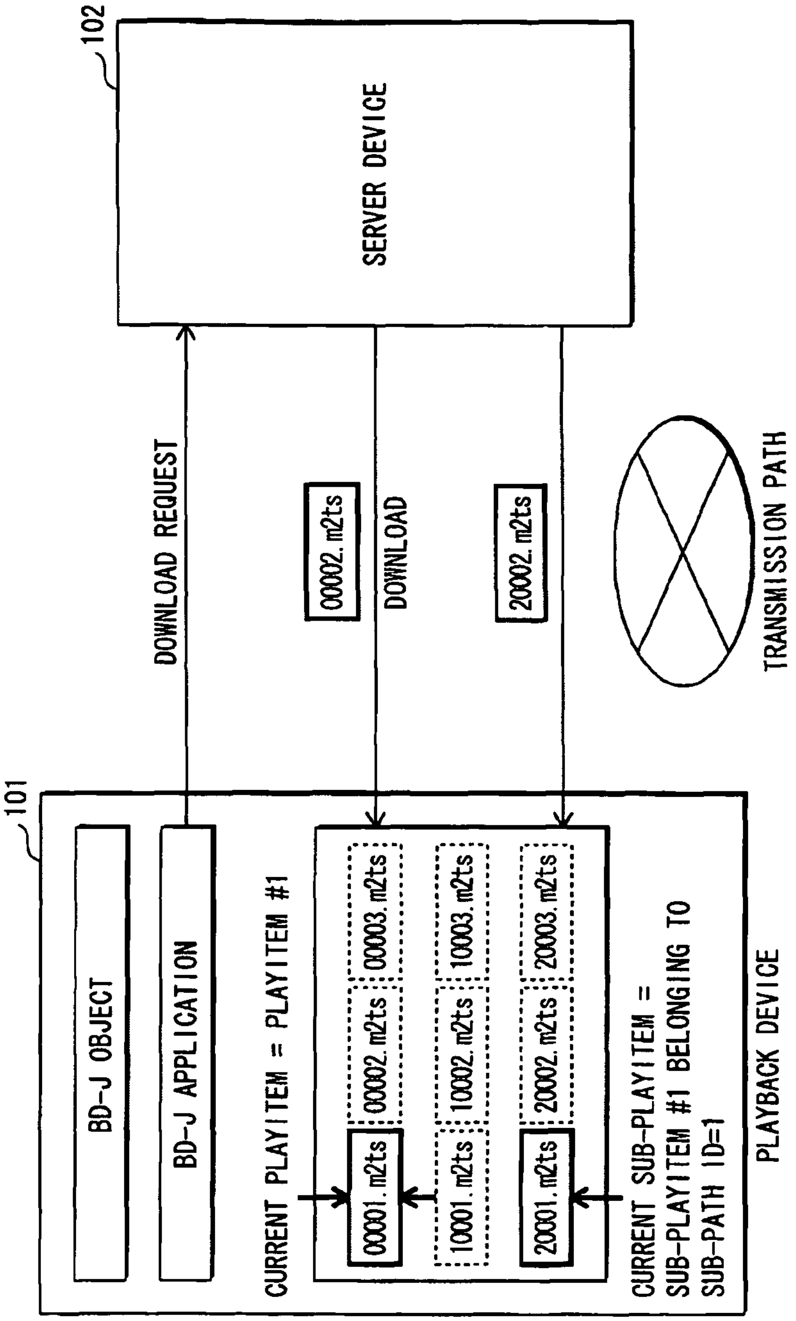
FIG. 18 shows the clip files that are requested to be downloaded when the current playitem is playitem #1 and the current sub-playitem information is sub-playitem #1 of sub-path (ID=1).

FIG. 18 shows the clip files that are requested to be downloaded when the current playitem is playitem #1 and the current sub-playitem information is sub-playitem #1 of subpath (ID=1). It is necessary that, in the local storage, 00001.m2ts constituting the current playitem and 20001.m2ts constituting the current sub-playitem information are both in the Enable state. In this case, the next playitem should be playitem #2 and the next sub-playitem information should be sub-playitem #2. Therefore, the clip files that should be requested to be downloaded while the current playitem and the current sub-playitem information are played back, are 00002.m2ts constituting the next playitem and 20002.m2ts constituting the next sub-playitem information.

Figure 19:
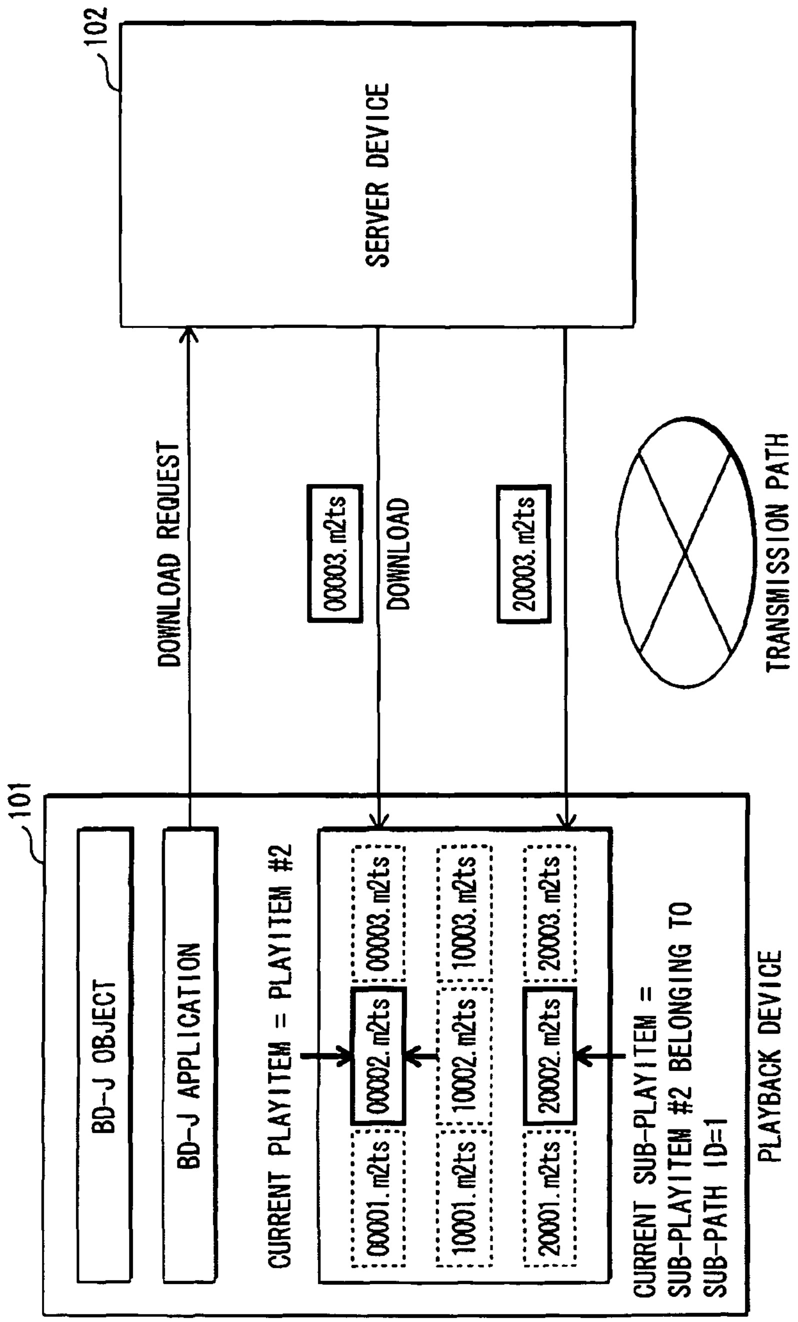
FIG. 19 shows the clip files that are requested to be downloaded when the current playitem is playitem #2 and the current sub-playitem information is sub-playitem #2 of sub-path (ID=1).

FIG. 19 shows the clip files that are requested to be downloaded when the current playitem is playitem #2 and the current sub-playitem information is sub-playitem #2 of subpath (ID=1). It is necessary that, in the local storage, 00002.m2ts constituting the current playitem and 20002.m2ts constituting the current sub-playitem information are both in the Enable state. In this case, the next playitem should be playitem #3 and the next sub-playitem information should be sub-playitem #3. Therefore, the clip files that should be requested to be downloaded while the current playitem and the current sub-playitem information are played back, are 00003.m2ts constituting the next playitem and 20003.m2ts constituting the next sub-playitem information.

Figure 20:
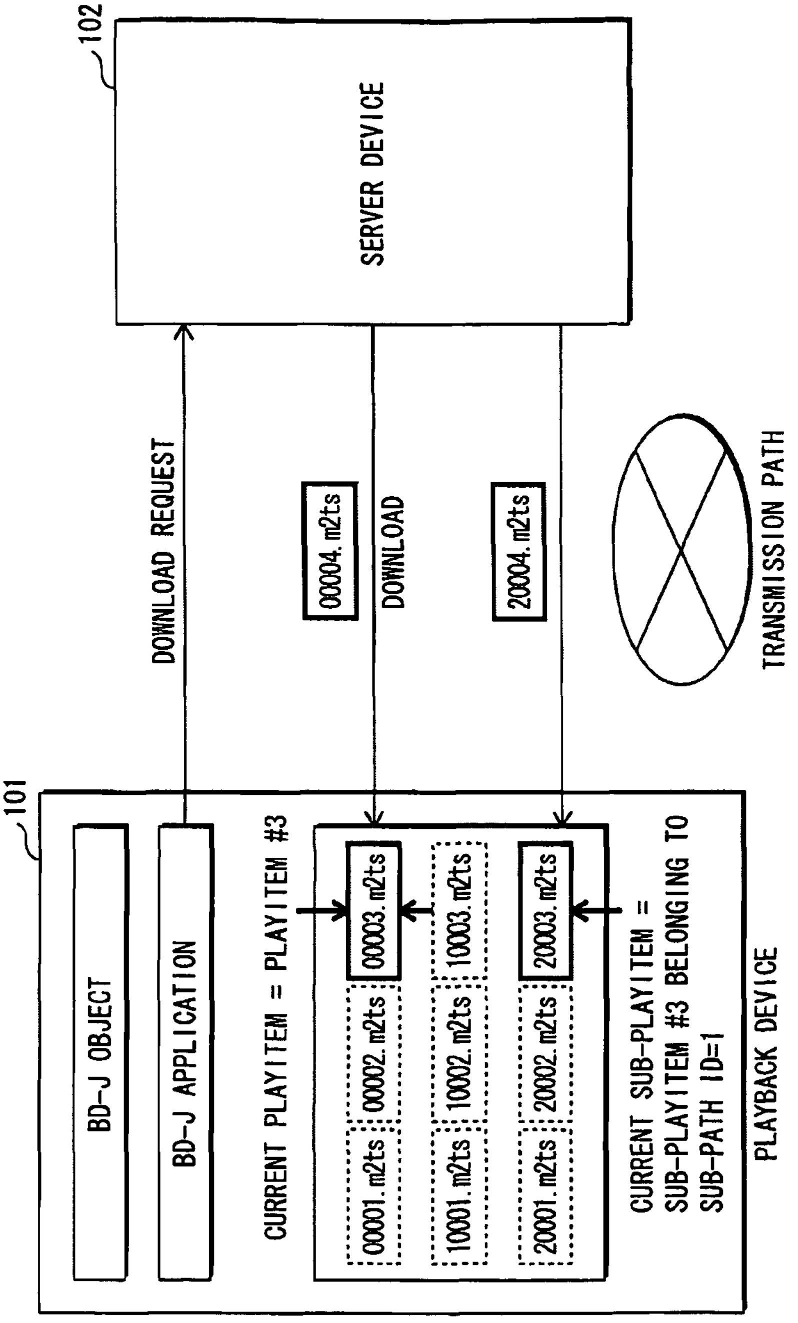
FIG. 20 shows the clip files that are requested to be downloaded when the current playitem is playitem #3 and the current sub-playitem information is sub-playitem #3 of sub-path (ID=1).

FIG. 20 shows the clip files that are requested to be downloaded when the current playitem is playitem #3 and the current sub-playitem information is sub-playitem #3 of sub-path (ID=1). It is necessary that, in the local storage, 00003.m2ts constituting the current playitem and 20003.m2ts constituting the current sub-playitem information are both in the Enable state. In this case, the next playitem should be playitem #4 and the next sub-playitem information should be sub-playitem #4. Therefore, the clip files that should be requested to be downloaded while the current playitem and the current sub-playitem information are played back, are 00004.m2ts constituting the next playitem and 20004.m2ts constituting the next sub-playitem information.

When the sub-path type is the synchronized type, the current sub-playitem information has the same playback time length as the current playitem. Accordingly, in the above-described downloading, the clip files constituting the next playitem and the next sub-playitem information should be downloaded while the current playitem is played back.

The bit rate (bit rate B) required for the download is calculated as follows.

Bit rate $B$=((data size of clip file constituting next playitem)+(data size of clip file constituting next sub-playitem))/playback time of current playitem The progress of playback is not interrupted by occurrence of DataStarved event as far as, as described above, the AV clip to be referred to by the next playitem and the AV clip to be referred to by the next sub-playitem are downloaded while the current playitem and the current sub-playitem are played back. This is because the required minimum AV clips are stored in the local storage.

As described above, according to the present embodiment, when a playlist composed of a plurality of sub-paths is to be played back, the player variables indicating the selected streams embedded in the playback device are referred to, and AV clips that are not necessary for the playback can be played back in succession even if the download has not been completed, thus achieving an efficient streaming-like playback.

<Notes>

The following technical topics among those shown in Embodiment 1 may further be improved or modified for implementation. Note that whether to implement these as described in Embodiment 1 or to implement these after improvement or modification is arbitrary, and should be determined by the implementor.

<Pre-Processing of Playlist Playback>

In the pre-processing of a playlist playback, priority may be given to downloading of an AV clip including an audio stream having a language code written in the language code for audio stream in SPRM (16) and an AV clip including a subtitle stream having a language code written in the language code for subtitle stream in SPRM (18). With this kind of structure, AV clips that the user is highly likely to use in playlist playback can be selected as targets for downloading.

<Parallel Use with BD-ROM>

In the case of the main path indicating main feature video stored on the disc, it is preferable to sequentially select, in order of proximity to the current playback position, AV clips used by sub-playitems from the current playback position onwards and including a stream corresponding to the stream number shown by the current Primary audio stream number SPRM (1), the subtitle stream number SPRM (2), Secondary video stream number SPRM (21), or Secondary audio stream number SPRM (22).

Since it is unlikely that the user will change the subtitles or audio while watching the main feature video, this kind of structure enables the playlist to be played back without making the user wait.

<Preventing Interruption During Playback of Main Feature Video>

The following process may be prepared in the BD-J application to prevent an occurrence of the state where DataStarved event is issued while a main feature video is played back due to the delay in downloading a subtitle/audio/Secondary video/Secondary audio, and the playback of the main feature video temporarily stops. That is to say, for example, when an AV clip including a stream corresponding to the current Primary audio stream number in SPRM (1) has not been in the Enable state, the following may be performed before the sub-playitem including the AV clip is reached: (a) the BD-J application writes, into SPRM (1), a special value indicating that "no stream has been selected"; or (b) the BD-J application writes SPRM (1) so that a stream number of an AV clip, that is already in the Enable state or exists on the disc, is determined (in this case, a dummy content may be prepared on the disc in advance in preparation for such a case). With such a structure, the BD-J application can perform a control which prevents DataStarved event from being issued. This process is also applicable to switching between streams performed by a user operation such as switching from Japanese audio to English audio. With the structure where the BD-J application prevents an actual occurrence of a rewriting of a stream switching SPRM (1), it is possible to prevent a playback of a main feature video from being stopped temporarily.

Embodiment 2

A description is now given of the AV clip (XXX.M2TS), clip information file (XXX.CLPI), and system target decoder.

<Internal Structure of AV Clip>

The AV clip is a digital stream having an MPEG-2 transport stream format.

Figure 21:
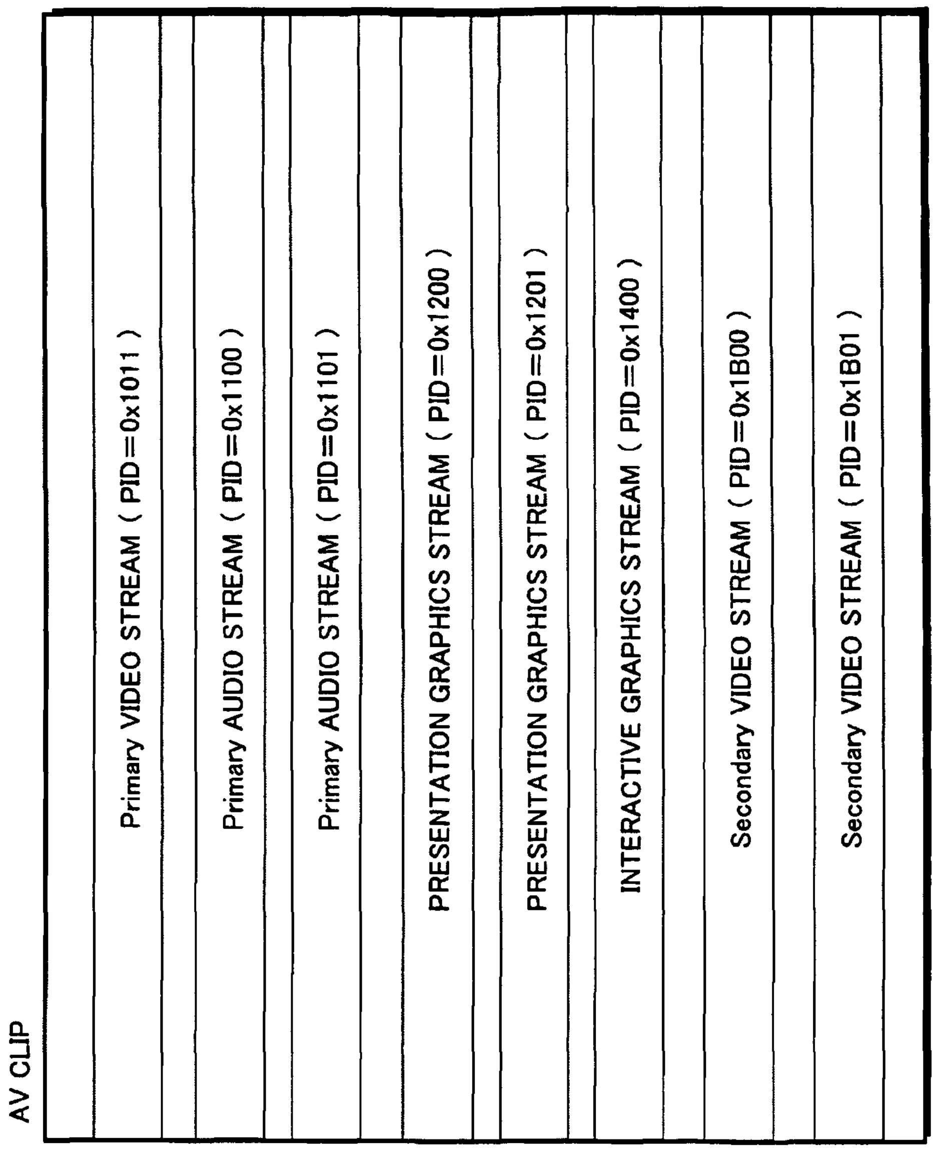
FIG. 21 shows one example of the structure of an AV clip.

FIG. 21 shows one example of the structure of an AV clip. As shown in FIG. 21, an AV clip is obtained by multiplexing one or more of each of a video stream, an audio stream, a presentation graphics stream (PG), and an interactive graphics stream. The video stream represents a Primary video and Secondary video of a movie. The audio stream represents a Primary audio portion of the movie and Secondary audio to mix with the Primary audio portion. The presentation graphics stream represents subtitles for the movie. The Primary video is ordinary video displayed on a screen. The secondary video is video displayed in a small screen in the main video. The interactive graphics stream represents an interactive screen created by disposing GUI components on a screen. The stream in each AV clip is identified by a PID. For example, 0x1011 is allocated to a video stream used as the video of the movie, 0x1100 to 0x111F are allocated to the audio streams, 0x1200 to 0x121F are allocated to the presentation graphics, 0x1400 to 0x141F are allocated to the interactive graphics streams, 0x1B00 to 0x1B1F are allocated to the video streams used as secondary video of the movie, and 0x1A00 to 0x1A1F are allocated to the audio streams used as secondary audio mixed with the main audio.

<Multiplexing of AV Clips>

Figure 22:
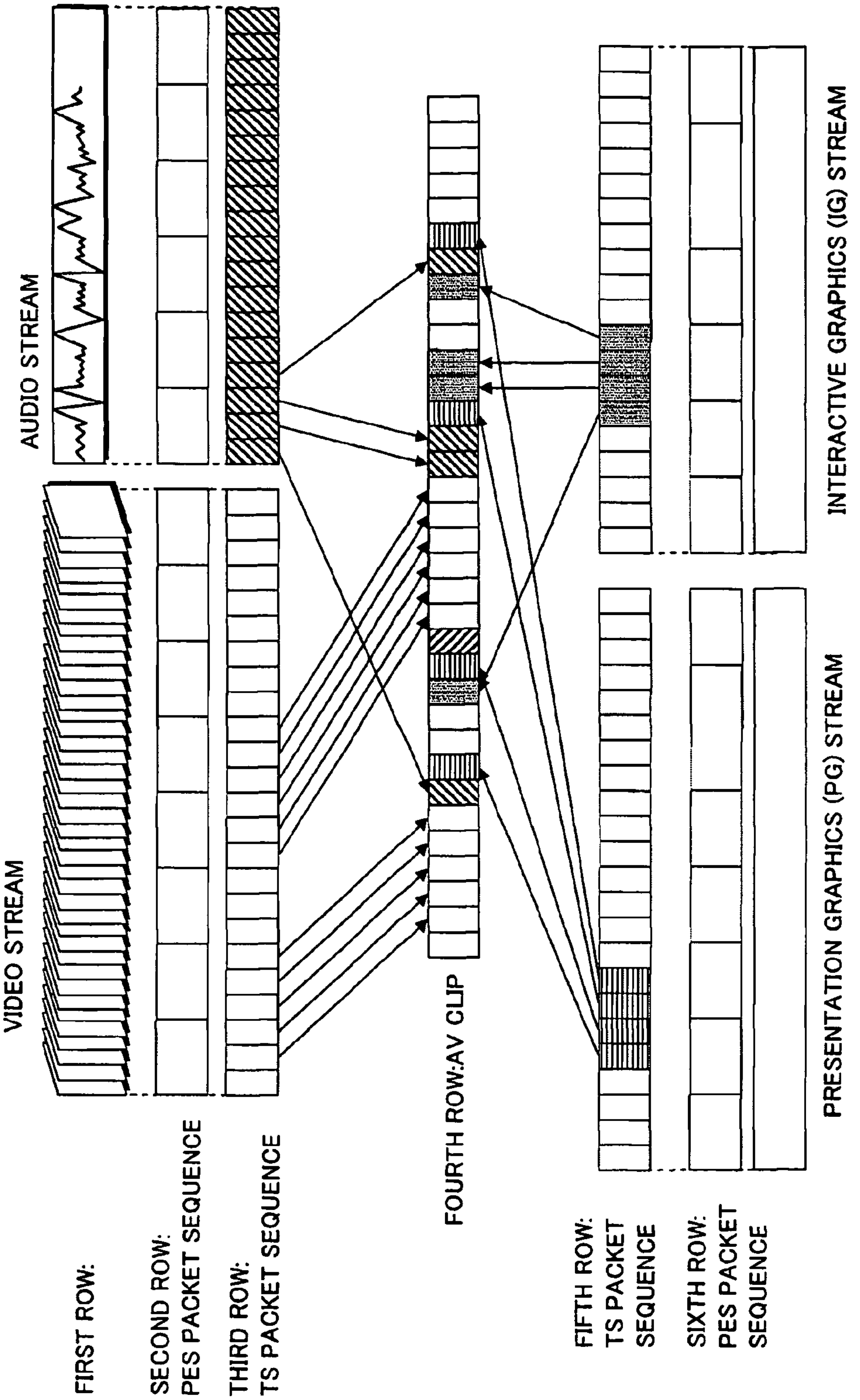
FIG. 22 schematically shows how the AV clips are multiplexed.

FIG. 22 schematically shows how the AV clips are multiplexed.

Firstly, a video stream and an audio stream (First row) are respectively converted into PES packet sequences (Second row), and further converted into TS packets sequences, respectively (Third row). Similarly, a presentation graphics stream and an interactive graphics stream (Seventh row) are converted into PES packet sequences, respectively (Elementary streams), and further converted into TS packet sequences, respectively (Fifth row). An AV clip (Fourth row) is composed of these TS packets multiplexed on one stream.

Figure 23:
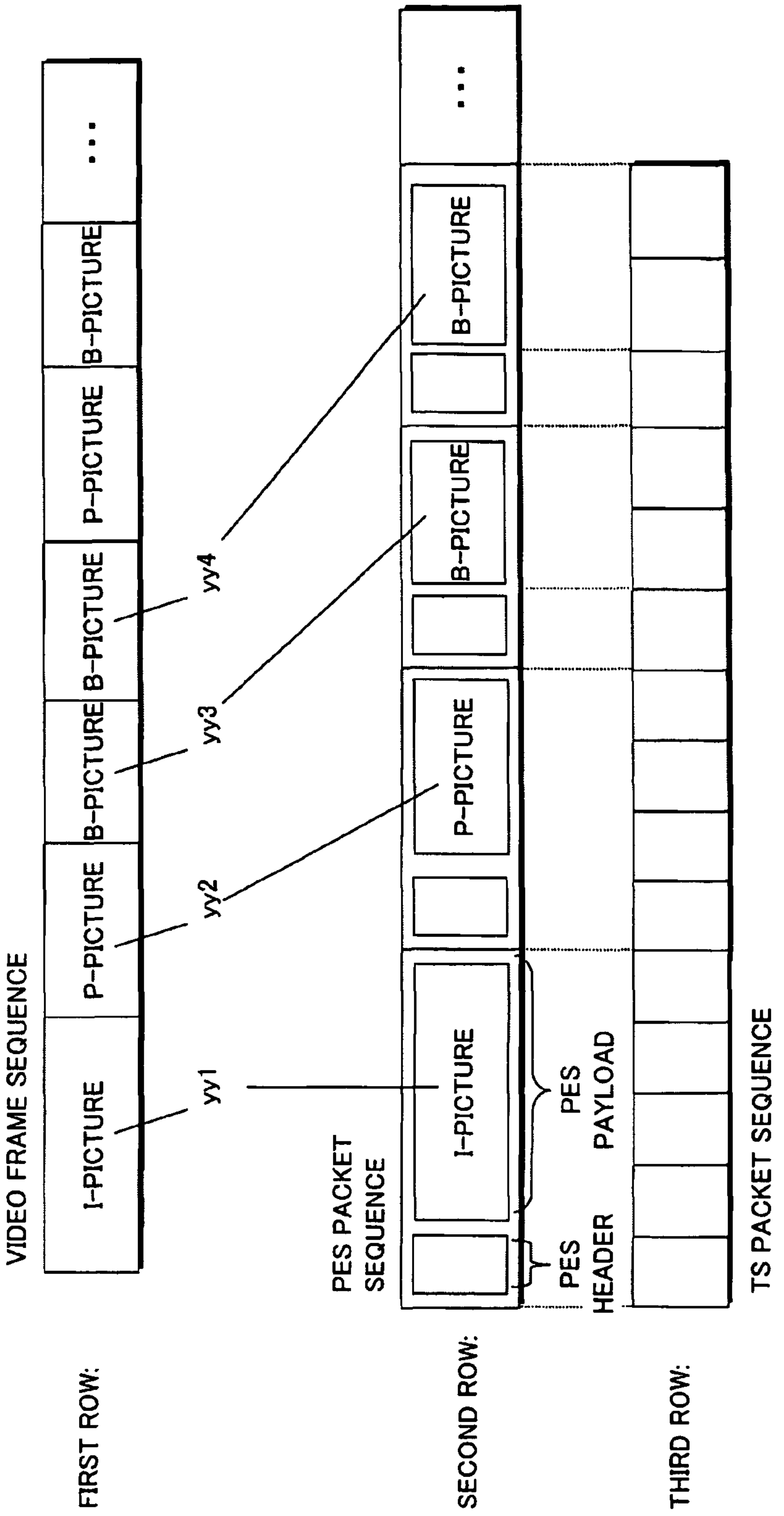
FIG. 23 illustrates in more detail how the video stream is stored in the PES packet sequences.

FIG. 23 illustrates in more detail how the video stream is stored in the PES packet sequences. The first row shows a video frame sequence of the video stream. The second row shows a PES packet sequence. The third row shows a TS packet sequence obtained by converting the PES packet sequence. As shown by arrows yy1, yy2, yy3 and yy4, the video stream is composed of a plurality of video presentation units (I picture, B picture, P picture). The video stream is divided up into the individual pictures, and each picture is stored in the payload of a PES packet. Each PES packet has a PES header storing a PTS (Presentation Time-Stamp) that is a display time of the picture stored in the payload of the PES packet, and a DTS (Decoding Time-Stamp) that is a decoding time of the picture stored in the payload of the PES packet.

<TS Packet Sequence>

Figure 24:
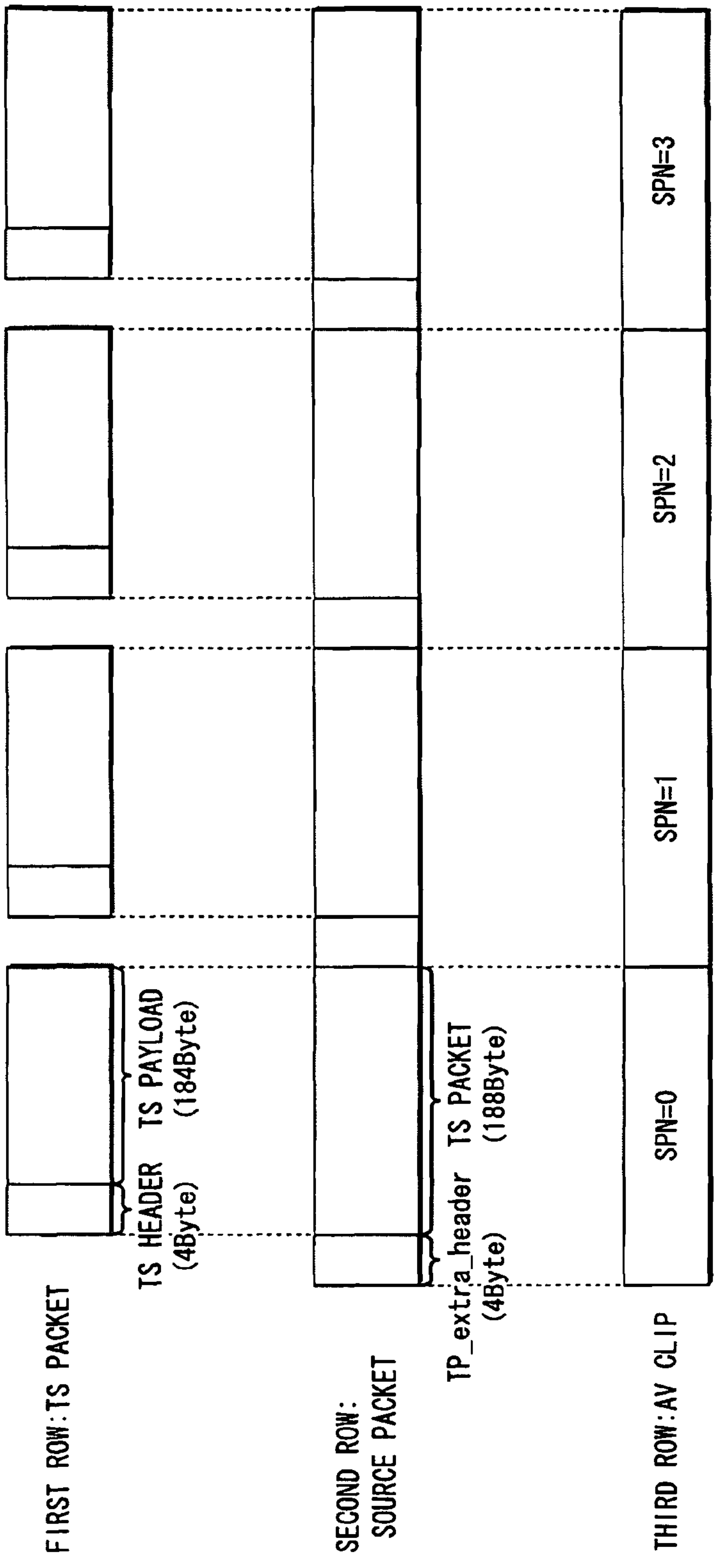
FIG. 24 shows the format of the TS packets ultimately written in the AV clip.

FIG. 24 shows the format of the TS packets ultimately written in the AV clip. The first row shows a TS packet sequence. The second row shows a source packet sequence. The third row shows an AV clip.

As shown in the first row, each TS packet is a fixed-length packet consisting of a 4-byte TS header carrying information such as a PID identifying the stream, and a 184-byte TS payload storing data. The PES packets are divided and stored in the TS payloads.

As shown in the second row, each TS packet is given a 4-byte TP_Extra_Header, thus constituting a 192-byte source packet. Such 192-byte source packets are written in an AV clip. The TP_Extra_Header stores information such as an ATS (Arrival_Time_Stamp). The ATS shows a transfer start time at which the TS packet is to be transferred to a PID filter. The source packets are arranged in the AV clip as shown on the third row. The numbers incrementing from the head of the AV clip are called SPNs (source packet numbers).

In addition to TS packets of audio, video, subtitles and the like, the AV clip also includes TS packets of a PAT (Program Association Table), a PMT (Program Map Table) and a PCR (Program Clock Reference). The PAT shows a PID of a PMT used in the AV clip, and is registered by the PID arrangement of the PAT itself. The PMT stores the PIDs in the streams of video, audio, subtitles and the like, and attribute information corresponding to the PIDs. The PMT also has various descriptors relating to the AV clip. The descriptors have information such as copy control information showing whether copying of the AV clip is permitted or not permitted. The PCR stores STC time information corresponding to an ATS showing when the PCR packet is transferred to a decoder, in order to achieve synchronization between an ATC (Arrival Time Clock) that is a time axis of ATSs, and an STC (System Time Clock) that is a time axis of PTSs and DTSs.

Figure 25:
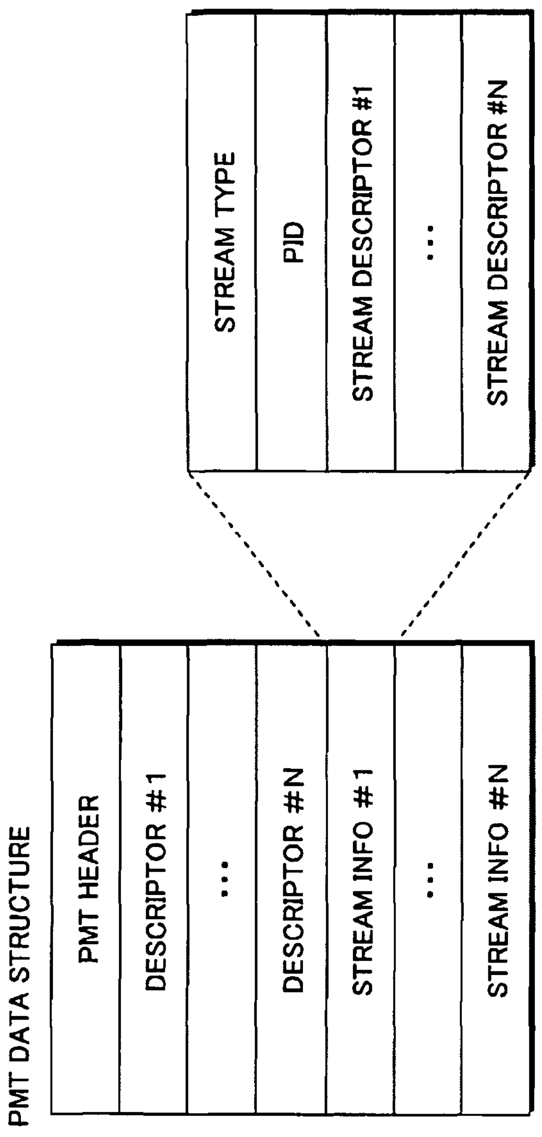
FIG. 25 explains the data structure of the PMT in detail.

FIG. 25 explains the data structure of the PMT in detail. A PMT header is disposed at the top of the PMT. Information written in the PMT header includes the length of data included in the PMT to which the PMT header is attached. A plurality of descriptors relating to the AV clip are disposed after the PMT header. Information such as the described copy control information is listed in the descriptors. After the descriptors is a plurality of pieces of stream information (stream information #1 through #N) relating to the streams included in the AV clip. Each piece of stream information is composed of stream descriptors, each listing information such as a stream type for identifying the compression codec of the stream, a stream PID, or stream attribute information (such as frame rate or aspect ratio). The stream descriptors are equal in number to the number of streams in the AV clip. Up to now, the AV clip has been explained. The following describes the clip information file in detail.

<Clip Information File>

Figure 26:
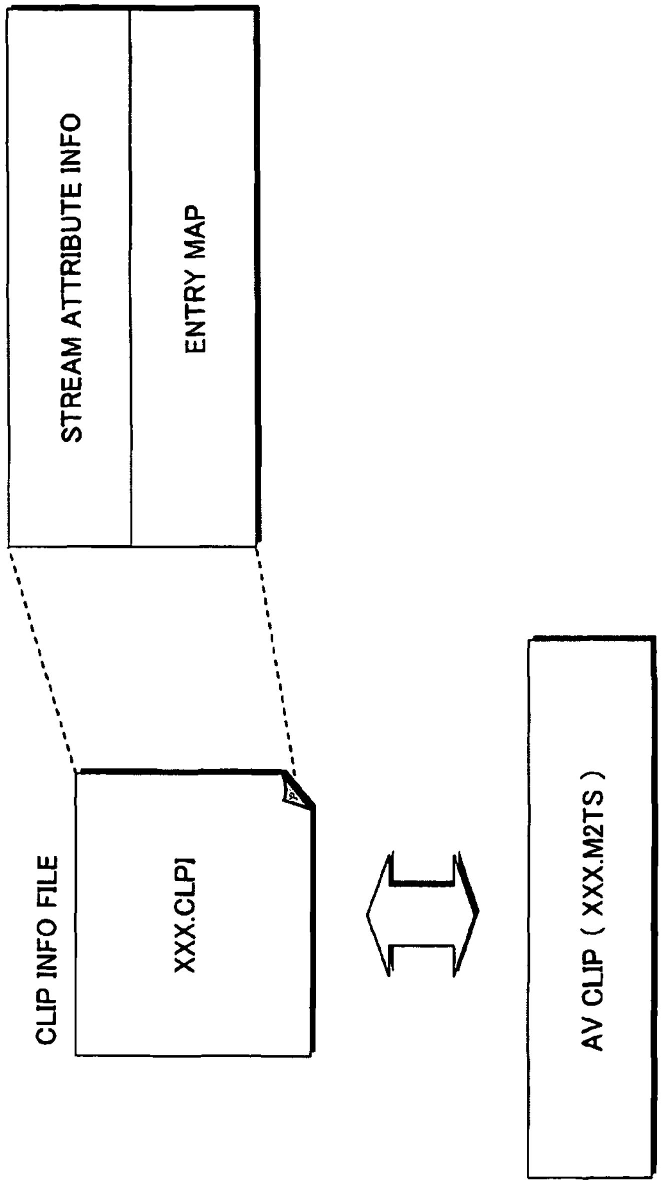
FIG. 26 shows one example of the clip information file.

FIG. 26 shows one example of the clip information file. Each clip information file is management information for an AV clip. The clip information files are in one to one correspondence with the AV clips, and are each composed of stream attribute information and entry map.

Figure 27:
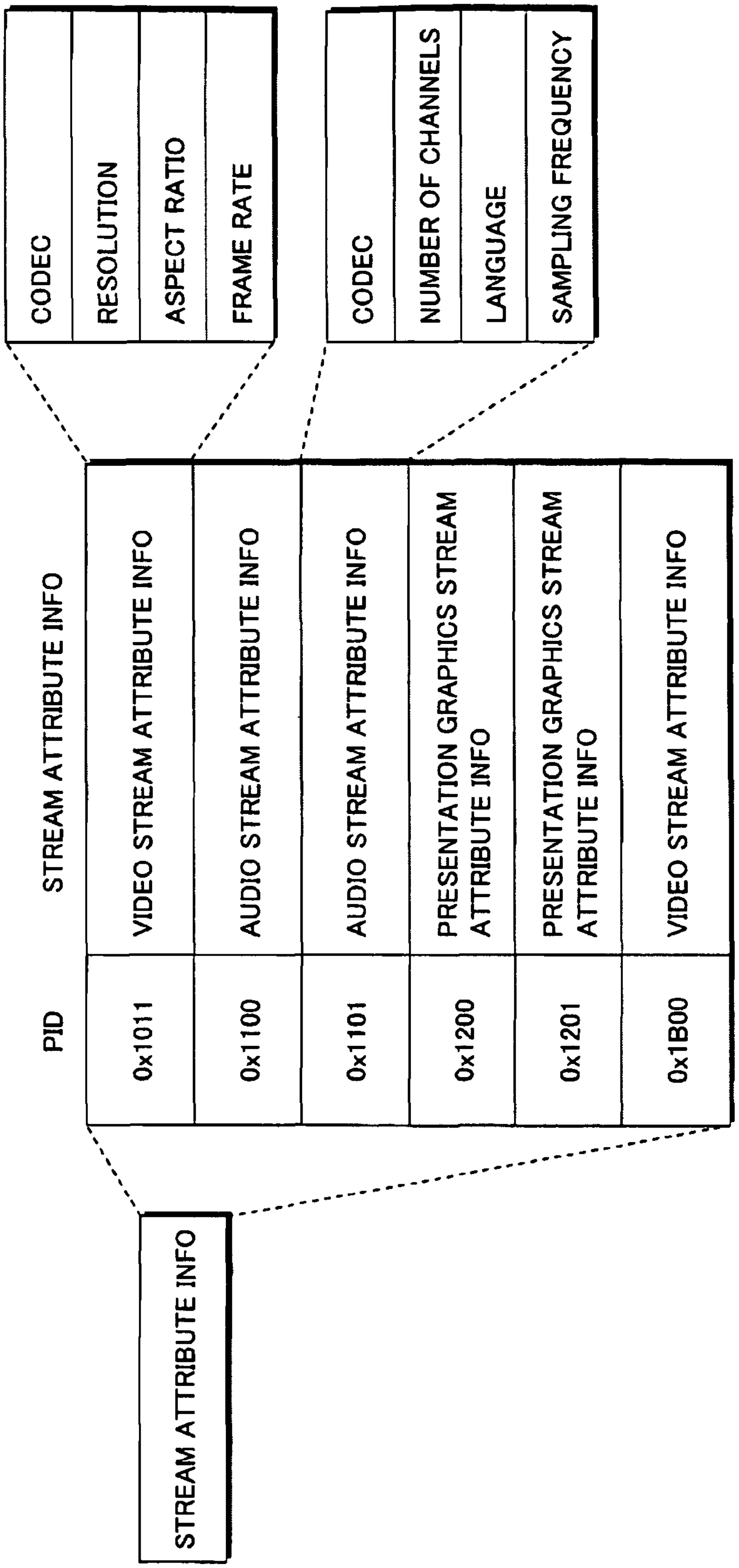
FIG. 27 shows one example of the stream attribute information.

FIG. 27 shows one example of the stream attribute information. As shown in FIG. 27, a piece of attribute information is registered for each PID of each stream in the AV clip. Each piece of attribute information has different information depending on whether the corresponding stream is a video stream, an audio stream, a presentation graphics stream, or am interactive graphics stream.

Each piece of "video stream attribute information" carries information including what kind of compression codec the video stream was compressed with, and the resolution, aspect ratio and frame rate of the pieces of picture data that compose the video stream.

Each piece of "audio stream attribute information" carries information including what kind of compression codec the audio stream was compressed with, how many channels are included in the audio stream, how many languages the audio stream supports, and the sampling frequency. The information in the video stream attribute information and the audio stream attribute information is used for purposes such as initialization of a decoder before the player performs playback.

Figure 28:
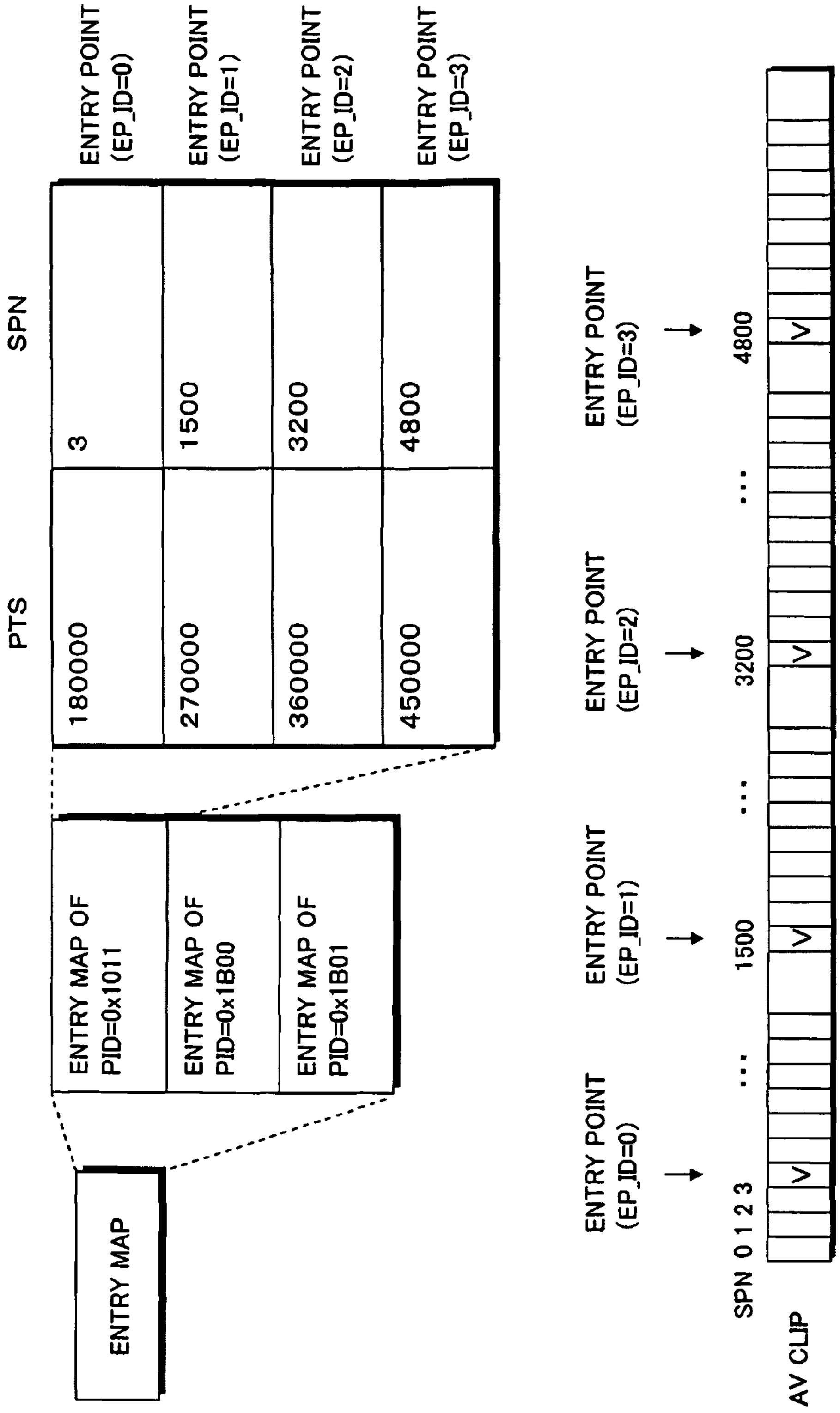
FIG. 28 shows one example of the entry map.

FIG. 28 shows one example of the entry map.

As shown in FIG. 28, the entry map is table information listing PTSs and SPNs. Each PTS show a display time of an intraframe encoded image (hereinafter referred to as an I picture) in the video stream in the AV clip. Each SPN is the SPN of the AV clip that the I picture is at the start of.

Here, a pair of a PTS and an SPN shown in a same row in the table are called an entry point. Each entry point has an entry point ID (hereinafter also referred to as an EP_ID). Starting with the top entry point, which has an entry point ID "0", the entry points have successively incrementing entry point IDs. Using the entry map, the player can specify the location of a file of an AV clip corresponding to an arbitrary point on the playback axis of the video stream. For instance, when performing special playback such as fast forward or rewind, the player can perform processing efficiently without analyzing AV clips, by specifying, selecting and playing back an I picture registered in the entry map. An entry map is created for each video stream multiplexed in the AV clip. The entry maps are managed according to PIDs.

Up to now, the AV clip and the clip information file have been explained. Next, the system target decoder 13 will be described in detail.

Figure 29:
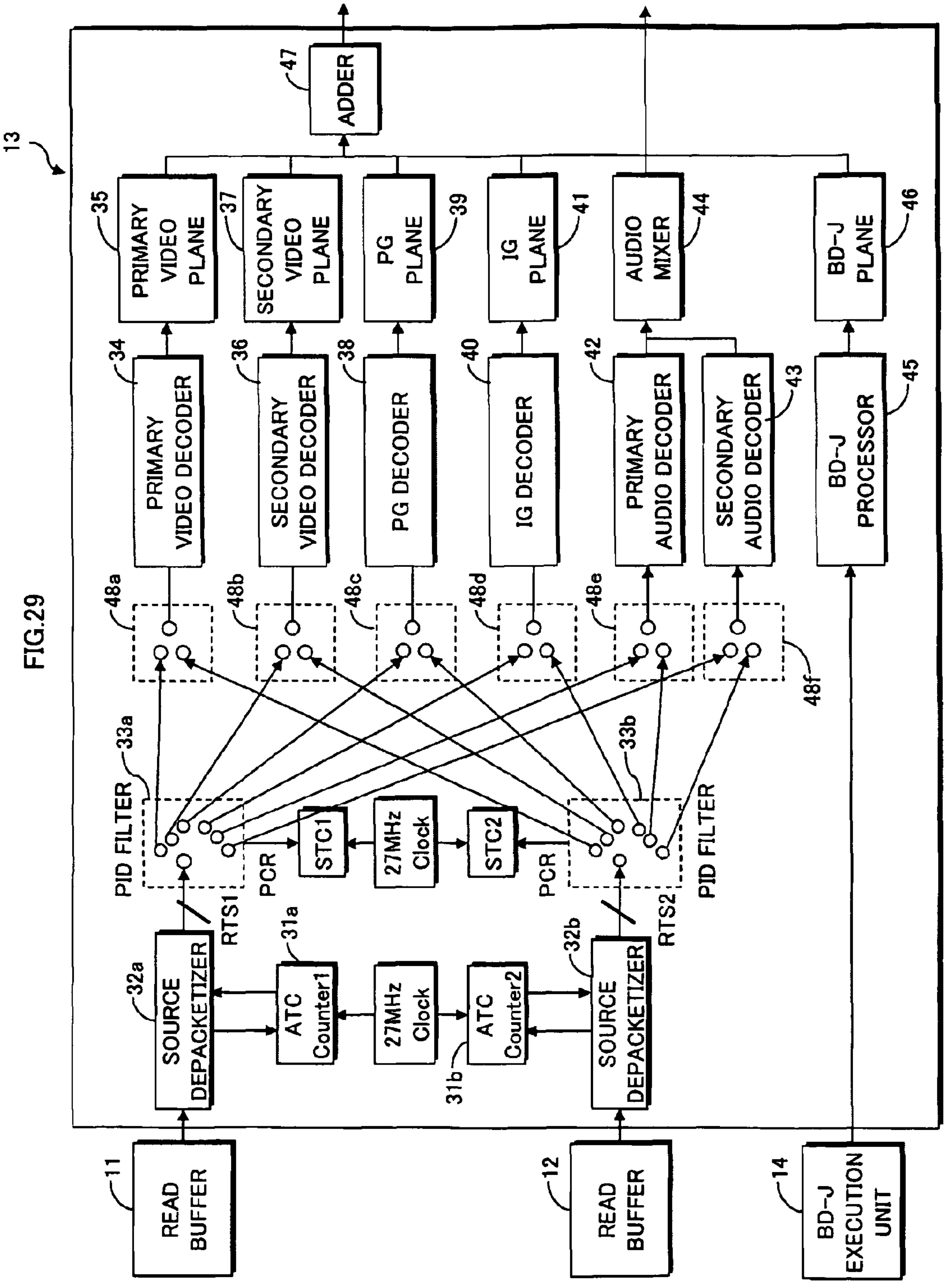
FIG. 29 shows one example of the internal structure of the system target decoder 13.

FIG. 29 shows one example of the internal structure of the system target decoder 13. As shown in FIG. 29, the system target decoder 13 is composed of source depacketizers 32*a* and 32*b*, PID filters 33*a* and 33*b*, a primary video decoder 34, a primary video plane 35, a secondary video decoder 36, a Secondary video plane 37, a PG decoder 38, a PG plane 39, an IG decoder 40, an IG plane 41, a primary audio decoder 42, a secondary audio decoder 43, an audio mixer 44, a BD-J processor 45, a BD-J plane 46, and an adder 47.

The source depacketizer 32*a*, 32*b* interprets a source packet transferred to the system target decoder 13, extracts the TS packet, and sends the TS packet to the PID filter. In sending the TS packet, the source depacketizer adjusts the time of input into the decoder in accordance with the ATS of the source packet. More specifically, the source depacketizer transfers the TS packet to the PID filer according to the recording rate of the AV clip, at the instant when the value of the ATC generated by the ATC counter and the value of the ATS of the source packet become identical.

The PID filters 33*a* and 33*b* transfer TS packets output from the source depacketizers. More specifically, the PID filters transfer TS packets having a PID that matches a PID required for playback to the primary video decoder, the secondary video decoder, the IG decoder, the PG decoder, the audio decoder or the secondary audio decoder, depending on the PID of the TS packet. For instance, in the case of the BD-ROM, a TS packet having a PID 0x1011 is transferred to the primary video decoder, TS packets having a PIDs 0x1B00 to 0x1B1F are transferred to the secondary video decoder, TS packets having PIDs 0x1100 to 0x111F are transferred to the primary audio decoder, TS packets having PIDs 0x1A00 to 0x1A1F are transferred to the secondary audio decoder, TS packets having PIDs 0x1200 to 0x121F are transferred to the PG decoder, and TS packets having PIDs 0x1400 to 0x141F are transferred to the IG decoder.

As shown in FIG. 28, the playback device has two source depacketizers and two PID filters. One set of a source depacketizer and a PID filter processes an AV clip transferred from the read buffer 11, and the other set processes an AV clip transferred from the read buffer 12. When the sub-path type is the synchronized type, playback is performed with synchronization between the AV clip referred to from the primary path and the AV clip referred to from the sub-path. When the sub-path type is non-synchronized type, playback is performed without synchronization between the AV clip referred to from the main path and the AV clip referred to from the sub-path.

The primary video decoder 34 has a buffer. While accumulating data in the buffer, the primary video decoder extracts information such as a TS header and a PES header, extracts a picture in an encoded state (I picture, B picture, P picture), and decodes each frame image in a video stream at respective predetermined decode times (DTS). As a result of these operations, the primary video decoder creates a plurality of frame images. The primary video decoder outputs the frame images to the primary video plane 35 in accordance with the respective display times (PTS). Possible compression encoding formats of the video stream multiplexed on the AV clip include MPEG2, MPEG4AVC, and VC1, and therefore the decoding scheme used to decode the compressed video is changed in accordance with stream attributes.

The primary video plane 35 stores frame images obtained by the primary video decoder 34.

The secondary video decoder 36, having the same structure as the primary video plane 35, performs decoding of an input secondary video stream, and writes resultant pictures to the secondary video plane in accordance with respective display times (PTS).

The secondary video plane 37 stores frame images obtained by the secondary video decoder 36.

The PG decoder 38 extracts and decodes a presentation graphics stream from the TS packets input from the source depacketizers, and writes the resultant non-compressed graphics data to the PG plane in accordance with respective display times (PTS).

The PG plane 39 stores non-compressed graphics data.

The IG decoder 40 extracts and decodes an interactive graphics stream from the TS packets input from the source depacketizers, and writes the resultant non-compressed graphics data to the IG plane in accordance with respective display times (PTS).

The IG plane 41 stores non-compressed graphics data.

The primary audio decoder 42 has a buffer. While accumulating data in the buffer, the primary audio decoder extracts information such as a TS header and a PES header, and performs audio stream decode processing to obtain non-compressed LPCM-state audio data. The primary audio decoder outputs the obtained audio data to the audio mixer in accordance with the respective playback time (PTS). Possible compression encoding formats of the audio stream multiplexed on the AV clip include AC3 and DTS, and therefore the decoding scheme used to decode the compressed audio is changed in accordance with stream attributes.

The secondary audio decoder 43 has the same structure as the primary audio decoder. The secondary audio decoder performs decoding of an input secondary audio stream, and outputs resultant non-compressed LPCM-state audio data to the audio mixer in accordance with respective display times. Possible compression encoding formats of the audio stream multiplexed on the AV clip include DolbyDigitalPlus and DTS-HD LBR, and therefore the decoding scheme used to decode the compressed audio is changed in accordance with stream attributes.

The audio mixer 44 mixes (superimposes) the non-compressed audio data output from the primary audio decoder and the non-compressed audio data output from the secondary audio decoder with each other, and outputs the resultant audio to a speaker or the like.

The BD-J processor 45 decodes graphics data (in PNG or JPEG format) transferred from the BD-J execution unit, and outputs the resultant decoded graphics data to the BD-J plane in accordance with a display time designated by the BD-J application.

The BD-J plane 46 stores graphics data decoded by the BD-J processor 45.

The adder 47 instantaneously superimposes the data written in the primary video plane, data written in the secondary video plane, data written in the IG plane, data written in the PG plane, and data written in the BD-J plane, and displays the resultant superimposed data on the screen of a television or the like.

As described above, the present embodiment achieves an internal structure in compliance with the BD-ROM player model so that the playlists can be played back.

Embodiment 3

In the present embodiment, a description is given of a detailed data structure of the playlist information, and how to determine the current secondary video stream.

Figure 30:
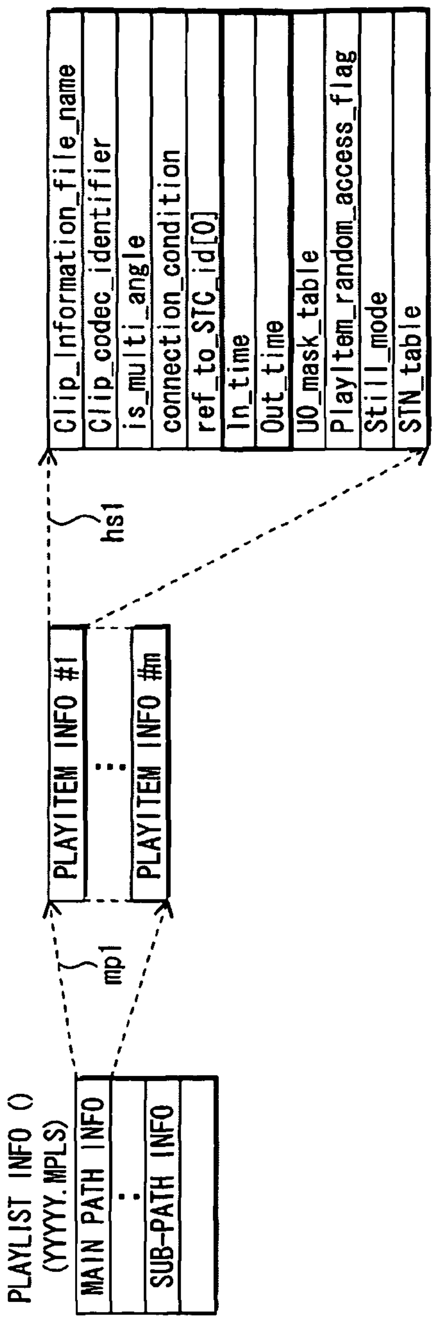
FIG. 30 shows the data structure of the playList information.

FIG. 30 shows the data structure of the playList information. As shown in FIG. 30, the PlayList information includes: MainPath information (MainPath( )) that defines MainPath; and SubPath information (Subpath( )) that defines SubPath.

<PlayList Information Explanation 1: SubPath Information>

While MainPath is a playback path defined for MainClip being a primary video, SubPath is a playback path defined for SubClip that should be synchronized with MainPath.

Figure 31:
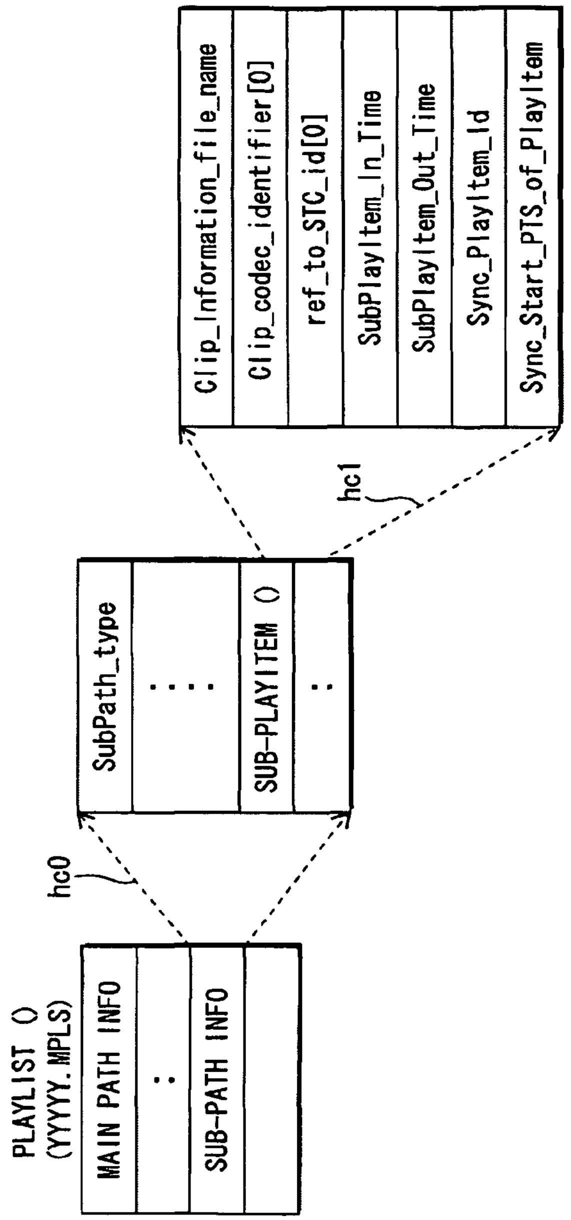
FIG. 31 shows the internal structure of the Subpath information with close-ups.

FIG. 31 shows the internal structure of the Subpath information with close-ups. As indicated by the arrow hc0, each Subpath includes: SubPath_type that indicates the type of SubClip; and one or more pieces of SubPlayItem information ( . . . SubPlayItem( )) . . . ).

The lead line hc1 indicates the close-up of the structure of the SubPlayItem information.

SubPlayItem defines one or more elementary stream playback paths that are separate from MainPath, and is used to indicate a type of how the SubPath is synchronized with MainPath. When SubPlayItem uses a sub-path of the Primary audio/PG/IG/Secondary audio/Secondary video, the SubPlayItem is synchronized with MainPath that uses PlayItem in PlayList. The elementary stream used by the sub-path for playing back the elementary stream is multiplexed in a clip (namely, SubClip) that is separated from MainClip that is used by PlayItem on the MainPath side.

The following describes the internal structure of SubPlayItem. As the lead line hc1 in FIG. 31 indicates, the SubPlayItem information includes: "Clip_information_file_name", "Clip_codec_identifier", "ref_to_STC_id[0]", "SubPlayItem_In_time", "SubPlayItem_Out_time", "Sync_PlayItem_id", and "Sync_Start_PTS_of_PlayItem".

The "Clip_information_file_name" is information that uniquely specifies a SubClip that corresponds to SubPlayItem, by writing the file name of the Clip information.

The "Clip_codec_identifier" indicates an encoding method of the AVClip.

The "ref_to_STC_id [0]" uniquely indicates a STC_Sequence that is the target of the PlayItem.

The "SubPlayItem_In_time" is information that indicates the start point of SubPlayItem in the playback time axis of the SubClip.

The "SubPlayItem_Out_time" is information that indicates the end point of SubPlayItem in the playback time axis of the SubClip.

The "sync_PlayItem_id" is information that uniquely specifies, among PlayItems constituting the MainPath, PlayItem with which the SubPlayItem is to be synchronized. The "SubPlayItem_In_time" is present in the playback time axis of the PlayItem specified by the "sync_PlayItem_id".

The "Sync_Start_PTS_of_PlayItem" indicates the position of the start point of the SubPlayItem specified by the SubPlayItem_In_time, in the playback time axis of the PlayItem specified by the "Sync_PlayItem_id", with the time accuracy of 45 KHz. When "Sync_Start_PTS_of_PlayItem" of a SubPlayItem indicates a time point in the playback time axis of the PlayItem, the SubPlayItem achieves a "Synchronization Picture in Picture".

Also, an indefinite value (0xFFF) may be set in the "Sync_Start_PTS_of_PlayItem". This indefinite value indicates that a time point at which a locking operation was performed by the user is set as a sync (synchronization) time point at which a synchronization with a PlayItem specified by Sync_ PlayItem_id is performed. When an indefinite value is set in the "Sync_Start_PTS_of_PlayItem" and a SubPlayItem intends to play back the secondary video stream, the SubPlayItem achieves a "Non-Synchronization Picture in Picture".

This completes an explanation of the SubPath information.

<STN_table>

What is unique to the PlayList information is the STN_Table.

The STN_table is a table that indicates reproducible streams among a plurality of elementary streams multiplexed in the AV Clips specified by the Clip_Information_file_name in the PlayItem information, and among Out_of_MUX streams specified by the Clip_Information_file_name in the information. More specifically, the STN_table is generated by associating the Stream_attributes with the Stream_entries respectively corresponding to the plurality of elementary streams multiplexed in the MainClips and to the Out_of_MUX streams multiplexed in the SubClips.

Figure 32:
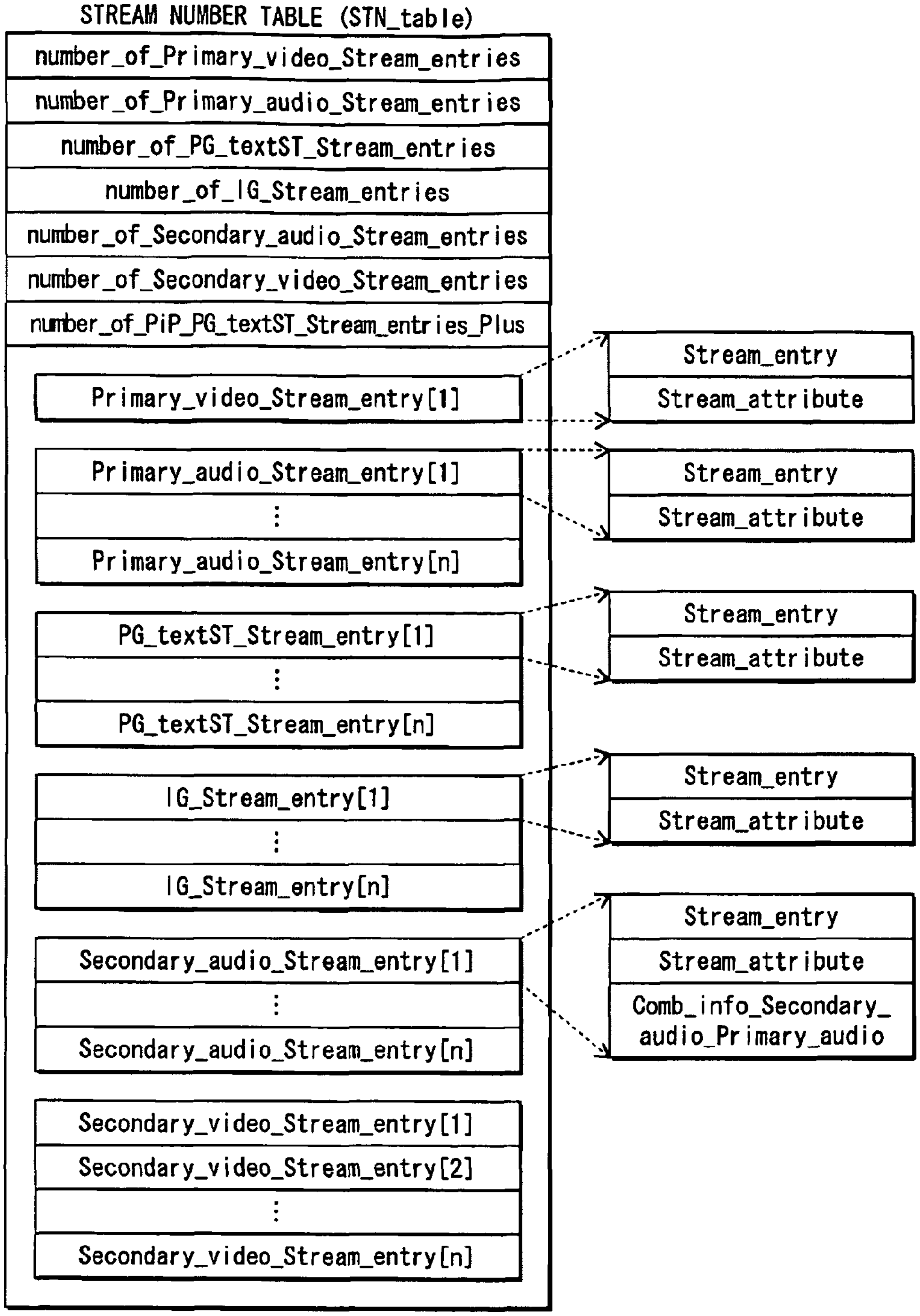
FIG. 32 shows one example of the entire structure of the STN_table.
Figure 33:
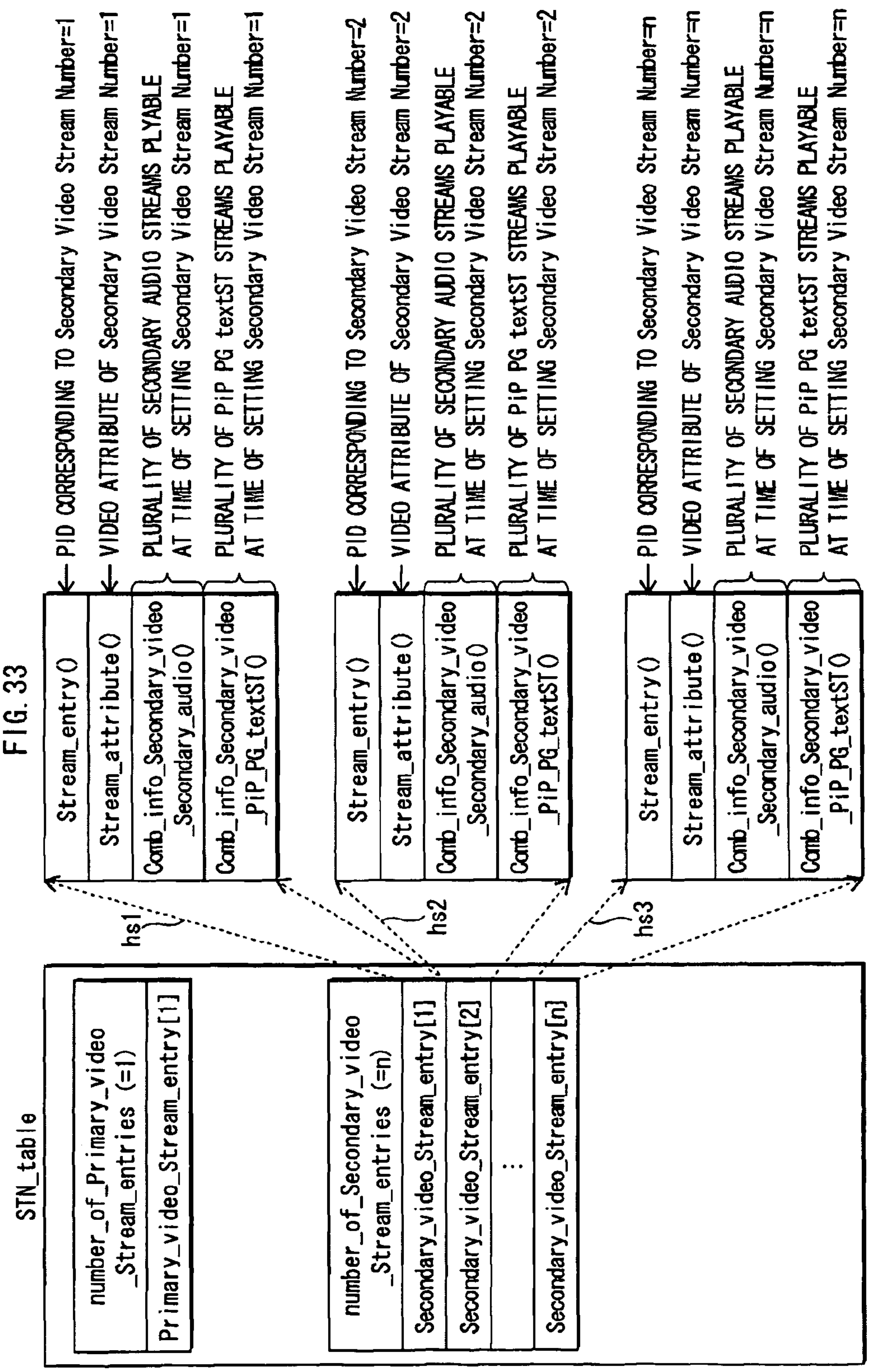
FIG. 33 shows one example of stream_entry for the secondary video stream, as a part of the entire structure of the STN_table shown in FIG. 32.

FIG. 32 shows one example of the entire structure of the STN_table. FIG. 33 shows one example of stream_entry for the secondary video stream, as a part of the entire structure of the STN_table shown in FIG. 32. As shown in FIG. 33, the STN_table includes n pieces of Secondary_video_stream_entries (Secondary_video_stream_entry[1] through Secondary_video_stream_entry[n]) and "number_of_Secondary_video_stream entries (=n)" which indicates the number of secondary video streams.

The lead line hs1 indicates the close-up of the internal structure of the Secondary_video_stream_entry[1]. That is to say, Secondary_video_stream_entry[1] through Secondary_video_stream_entry[n] are a plurality of instances that were generated from the same class structure, and have the same internal structure as the one indicated by the lead line hs1. The number in "[ ]" that is attached to each Secondary_video_stream_entry indicates a rank order thereof in the STN_table.

As indicated by the lead line hs1, Secondary_video_stream_entry[1] includes: "Stream_entry" that presents, to the playback device, a PID corresponding to the Secondary Video Stream Number (=1); "Stream_attribute" that indicates a video attribute corresponding to the Secondary video Stream-Number (=1); Comb_info_Secondary_Video_Secondary_Audio that indicates a secondary audio stream that becomes playable when the Secondary Video Stream Number (=1) is set; and Comb_info_Secondary_Video_PiP_PG_textST that indicates a PG stream or a text subtitle stream that becomes playable when the Secondary Video Stream Number (=1) is set.

As indicated by the lead line hs2, Secondary_video_stream_entry[2] includes: "Stream_entry" that presents, to the playback device, a PID corresponding to the Secondary video Stream Number (=2); "Stream_attribute" that indicates a video attribute corresponding to the Secondary Video StreamNumber (=2); Comb_info_Secondary_Video_Secondary_Audio that indicates a secondary audio stream that becomes playable when the Secondary Video Stream Number (=2) is set; and Comb_info_Secondary_Video_PiP_PG_textST that indicates a PG stream or a text subtitle stream that becomes playable when the Secondary Video Stream Number (=2) is set.

The structure indicated by the lead line hs3 is similar to the above. As described above, Secondary_video_stream_entry [x] that is positioned xth in the STN_table presents, to the playback device when the secondary video stream number is set to "x", a PID corresponding to the Secondary Video Stream Number (=x), a video attribute corresponding to the Secondary Video Stream Number (=x), and a secondary audio stream and a PGTextST that can be combined with it.

The streams representing subtitles include, as well as the presentation graphics stream that has been described in the embodiments, the text subtitle stream represented by the text code. The PG text subtitle stream used here is a name generated by combining the presentation graphics stream and the text subtitle stream. Furthermore, the PG text subtitle stream used in the Picture in Picture is called "PiP_PG_text subtitle stream".

Figure 34A:
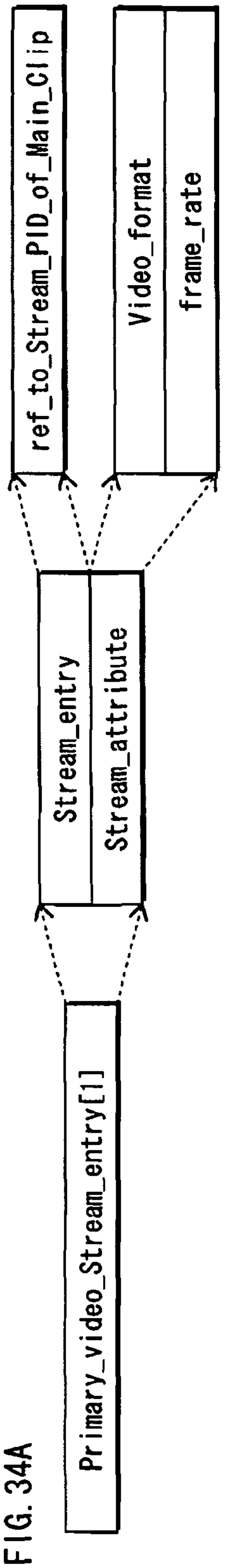
FIG. 34A shows one example of Stream_entry and Stream_attribute in the primary video stream.

FIG. 34A shows one example of Stream_entry and Stream_attribute in the primary video stream. The Stream_entry includes "ref_to_stream_PID_of_mainClip" that indicates a packet identifier of a PES packet that constitutes the primary video stream.

The Stream_attribute includes: "Video_format" that indicates a display method of the video stream; and "frame_rate" that indicates a display frequency of the video stream.

Figure 34B:
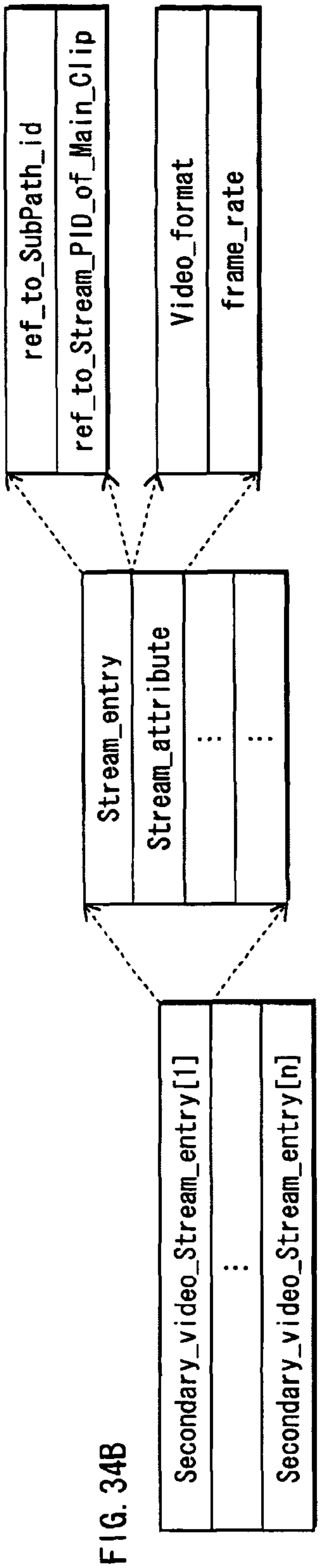
FIG. 34B shows Stream_entry in the secondary video stream.

FIG. 34B shows Stream_entry in the secondary video stream. As shown in FIG. 34B, the Stream_entry of the secondary video stream includes: "ref_to_Sub_Path_id" that indicates SubPath information that is referring to the secondary video stream; and "ref_to_stream_PID_of_mainClip" that indicates a packet identifier of a PES packet that constitutes the secondary video stream.

This completes description of the recording medium in the present embodiment.

The following describes PSR14 and PSR29. Each PSR is 32-bit long. The bit positions of the bits constituting one word (32 bits) of the PSR are represented by b0 through b31. In this notation, the most significant bit is b31, and the least significant bit is b0.

<PSR14>

FIG. 35A shows one example of the bit assignment in the PSR14.

As shown in FIG. 35A, the eight bits from b8 to b15 among 32 bits of the PSR14 represents a stream number of the secondary video stream number, and identifies one of a plurality of Secondary video streams whose entries are written in the STN_table of the current PlayItem. When the value set in the PSR14 changes, the playback device plays back a Secondary video stream corresponding to the set value after the change. The PSR14 is set to "0xFF" as the initial value, and then may be set to a value ranging from "1" to "32" by the playback device. The value "0xFF" is an indefinite value and indicates that there is no Secondary video stream or that a Secondary video stream has not been selected. When the PSR14 is set to a value ranging, from "1" to "32", the set value is interpreted as a stream number of a Secondary video stream.

The bit "b31" of the PSR14 is disp_v_f lag that indicates whether the playback device has a capability to play back a secondary video (1b: Presentation of Secondary Video is enable) or not (0b: Presentation of Secondary Video is disable).

<PSR29>

FIG. 35B shows one example of the bit assignment in the PSR29.

The bit "b0" of the PSR29 indicates whether or not there is HD_Secondary_video_Capability, namely whether the playback device has a capability to play back an HDTV-compliant secondary video (1b: Secondary Video is capable) or not (0b: Secondary Video is incapable).

The bit "b1" of the PSR29 indicates whether or not there is 50&25 Hz_video_Capability, namely whether the playback device has a capability to play back a PAL-compliant secondary video (1b:50&25 Hz Video is capable) or not (0b:50&25 Hz Video is incapable).

This completes an explanation of the PSR set.

Figure 36:
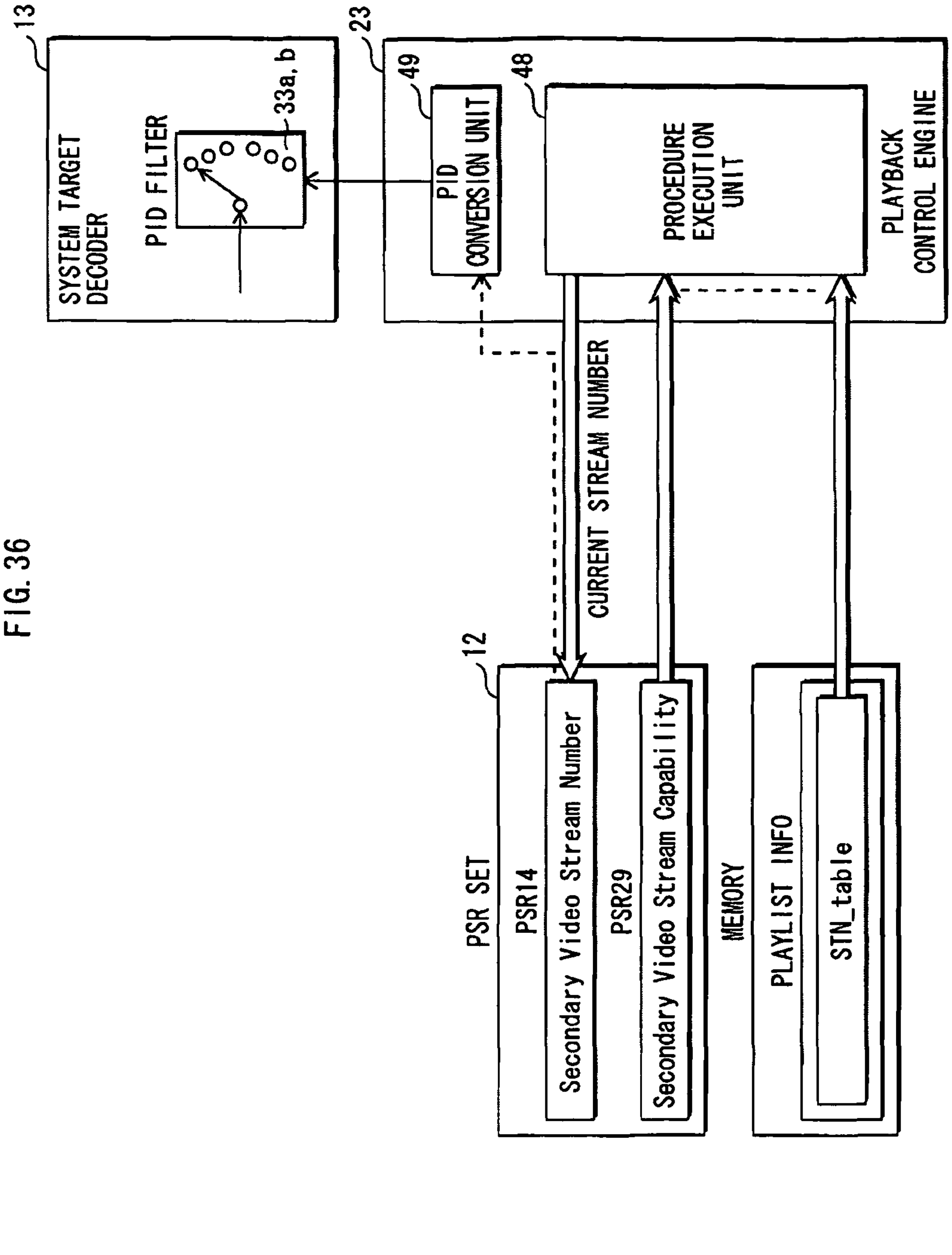
FIG. 36 shows one example of the internal structure of the playback control engine.

FIG. 36 shows one example of the internal structure of the playback control engine. As shown in FIG. 36, the playback control engine includes a procedure execution unit 48 and a PID conversion unit 49.

The procedure execution unit 48 executes a predetermined stream selection procedure to overwrite PSR14 with a stream number of a new secondary video stream when a piece of PlayItem information is switched to another piece of PlayItem information, or when the user performs an operation for switching the stream number. The playback device plays back a secondary video stream in accordance with the stream number written in the PSR14. Accordingly, a secondary video stream is selected via the setting in PSR14.

The reason for executing the stream selection procedure when the PlayItem information is switched is as follows. That is to say, since the STN_table exists for each piece of PlayItem information, there may be a case where a secondary video stream is not played back with a piece of PlayItem information while it is played back with another piece of PlayItem information.

The PID conversion unit 49 converts a stream number stored in the PSR set into a PID reference value based on the STN_table, and sends the conversion-resultant PID reference value to the PID filters 33*a* and 33*b*.

Figure 37:
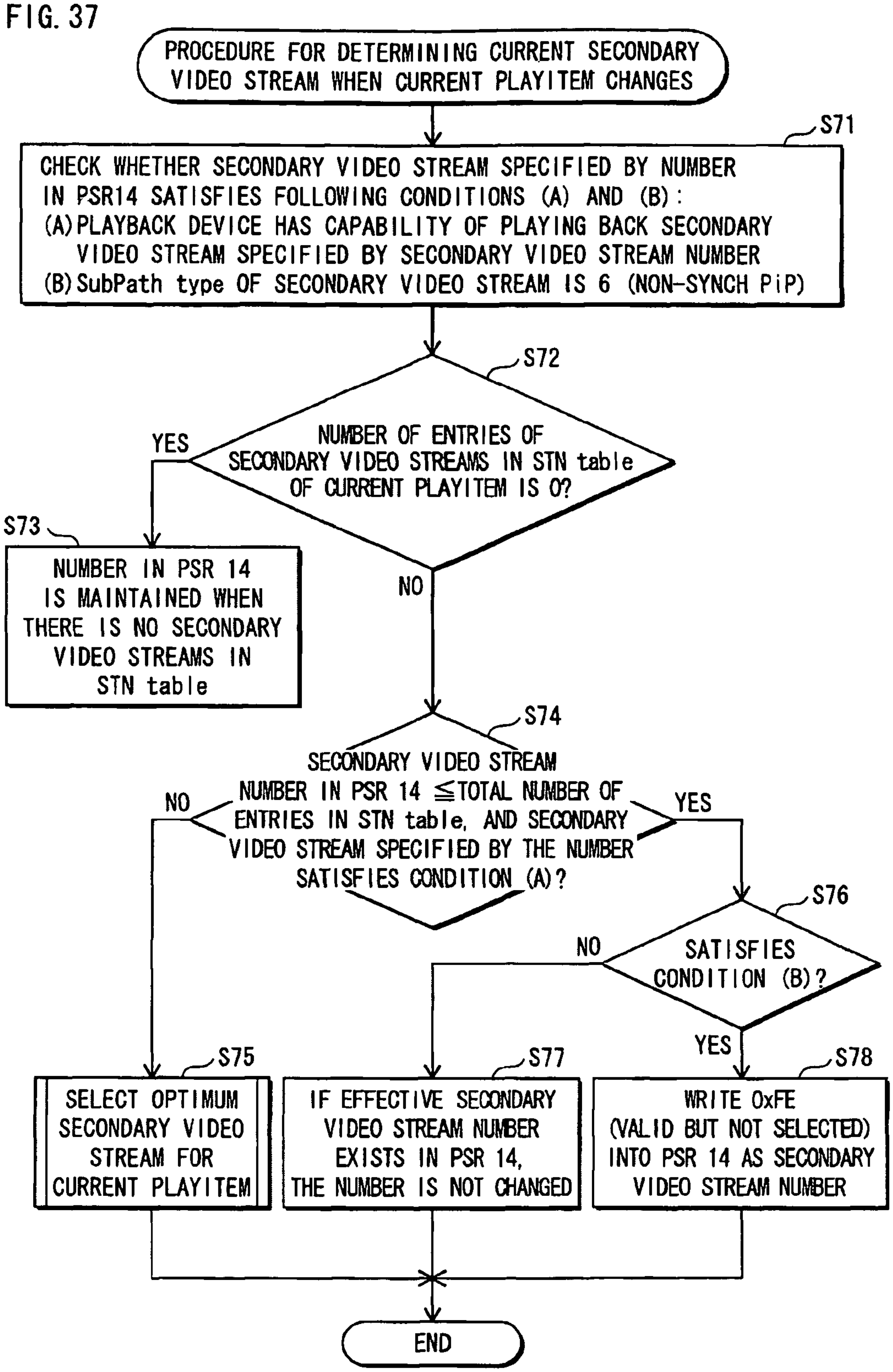
FIG. 37 is a flowchart showing the procedure for determining the current secondary video stream performed by the stream selection procedure.

FIG. 37 is a flowchart showing the procedure for determining the current secondary video stream performed by the stream selection procedure.

In step S71, it is checked whether a secondary video stream with a stream number that is equivalent with the number set in PSR14 satisfies the following conditions (A) and (B).

Condition (A): the playback device has the capability of playing back the secondary video stream with a stream number that is equivalent with the number set in PSR14, based on a comparison among Video format, frame_rate, HD Secondary Video Capability, and 50&25 Hz Video Capability.

Condition (B): SubPath_type of the secondary video stream is "=6 (non-synchronization Picture in Picture)"

It should be noted here that the Video format, frame_rate are written in the stream_attribute for the secondary video stream in the STN_table. Also, whether there is HD_Secondary video_Capability or 50&25 Hz_video_Capability is indicated by bit "b0" and "b1" of PSR29. The judgment on whether or not the condition (A) is satisfied is made by referring to these settings in the STN_table and the value of b1 in PSR29.

Step S71 is followed by steps S72 and S73.

In step S72, it is judged whether or not the number of entries of the secondary video streams in the STN_table of the current playitem is 0. It should be noted here that when the number of entries of the secondary video streams in the STN_table is 0, it means that there is no secondary video stream that has been permitted to be played back. When it is judged that the number of entries of the secondary video streams in the STN_table of the current playitem is 0, the secondary video stream number in PSR14 is maintained (step S73). This is because the value currently stored in PSR14 should be maintained when, in the current playitem, there is no secondary video stream that has been permitted to be played back.

Step S74 is a judgment step that is performed when it is judged in step S73 that the number of entries of the secondary video streams in the STN_table of the current playitem is not 0. In step S74, it is judged whether or not the secondary video stream number in PSR14 is equal to or smaller than the total number of entries in the STN_table, and the secondary video stream with the stream number satisfies the condition (A). When the judgment in step S74 results in Yes, a secondary video stream that is optimum for the current playitem is selected (step S75). When the judgment in step S74 results in No, the control moves to step S76 in which it is judged whether the condition (B) is satisfied. When it is judged that the condition (B) is satisfied, 0xFE is set in PSR 14 (step S78). Here, the value 0xFE indicates that the secondary video stream number in PSR14 is valid, but that the secondary video stream is not selected. In the execution of Non-Synchronization Picture in Picture, when PSR14 has been set to the above-described value, the procedure for determining the current stream is executed upon receiving the user operation therefor. However, if the stream number in PSR14 is invalid, the procedure for determining the current stream is not executed even if the user operation is received, and the secondary video stream is not played back. To prevent this from occurring, 0xFE is set in PSR14 when Non-Synchronization Picture in Picture is executed.

When it is judged that the condition (B) is not satisfied, but an effective secondary video stream number has already been set in PSR14, the number is not changed (step S77).

This completes an explanation of the stream selection procedure for the secondary video stream.

Figure 38:
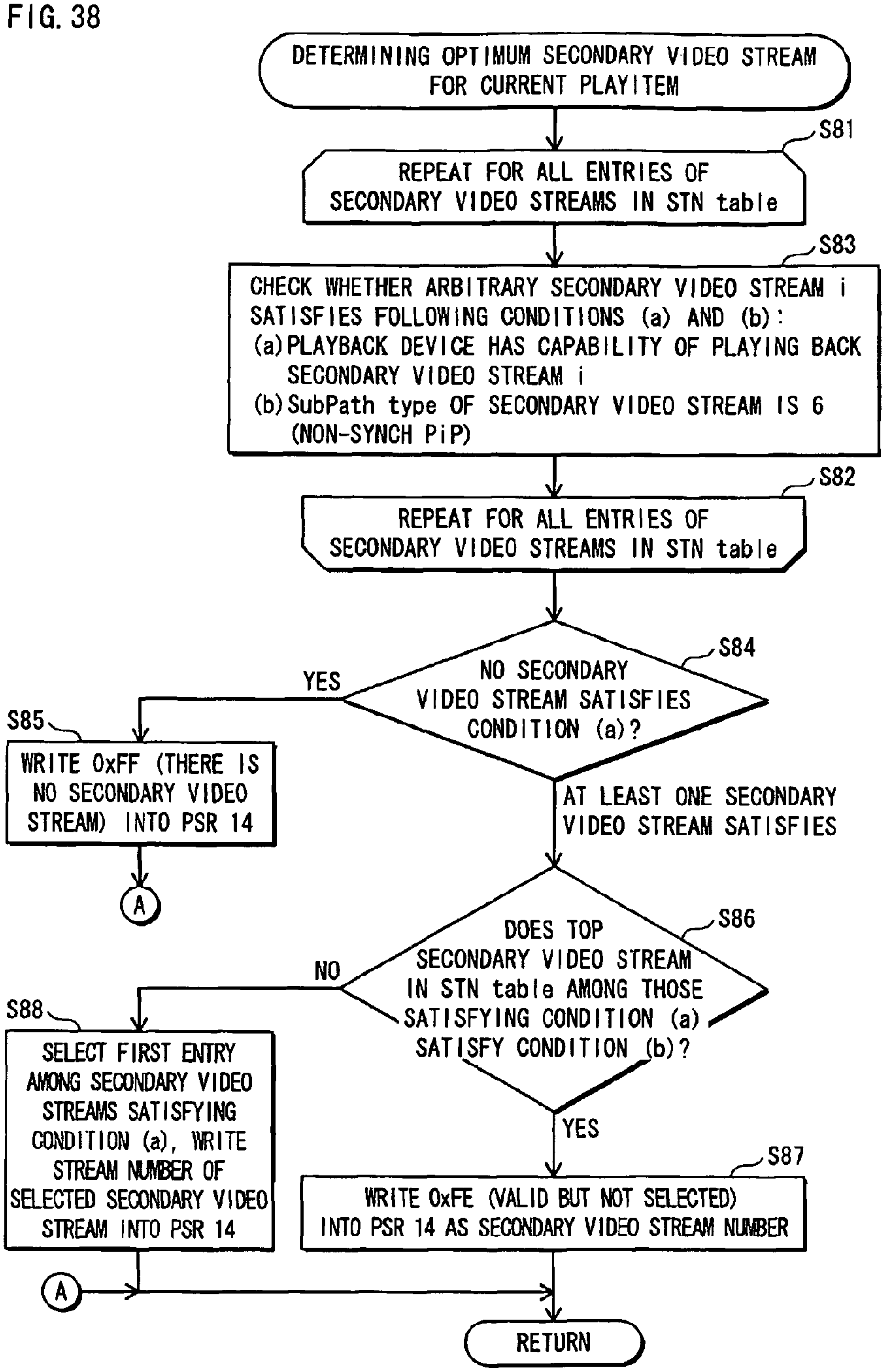
FIG. 38 is a flowchart showing the procedure for determining an optimum secondary video stream for the current playitem.

FIG. 38 is a flowchart showing the procedure for determining an optimum secondary video stream for the current playitem.

In steps S81 through S83, it is checked, for each stream written in all stream_entries in the STN_table, whether a stream satisfies the following conditions (a) and (b).

Condition (a): the playback device has the capability of playing back the secondary video stream with a stream number that is equivalent with the number set in PSR14, based on a comparison among Video format, frame_rate, HD Secondary Video Capability, and 50&25 Hz Video Capability for the secondary video stream.

Condition (b): SubPath_type of the secondary video stream is "=6 (non-synchronization Picture in Picture)"

After the above-described check is performed with respect to all secondary video streams that are permitted to be played back in the STN_table, the control goes to step S84.

In step S84, it is judged whether or not there is no secondary video stream that satisfies the condition (a). When it is judged that there is no secondary video stream that satisfies the condition (a), 0xFF is set in PSR14 as the secondary video stream number (step S85).

When it is judged that at least one secondary video stream that satisfies the condition (a) exists, the control goes to step S86.

In step S86, it is judged whether or not the top secondary video stream in the STN_table among the secondary video streams satisfying the condition (a) satisfies the condition (b). When it is judged that the top secondary video stream satisfies the condition (b), 0xFE is set in PSR14 as the secondary video stream number (step S87).

When it is judged that the top secondary video stream does not satisfy the condition (b), a secondary video stream whose corresponding stream_entry positioned at the top of the STN_table is selected from among the secondary video streams that satisfy the condition (a), and the stream number of the selected secondary video stream is set into the PSR14 (step S88).

With this structure, when a playback section in the current secondary video stream is defined by SubPlayItem, a subplayitem that defines the playback section in the current secondary video stream is identified as the current sub-playitem.

With these procedures, a current secondary video stream that is optimum for the current playitem is stored in PSR14. This completes an explanation of the procedures for selecting an optimum current secondary video stream.

As described above, according to the present embodiment, when there is a secondary video stream that cannot be played back among a plurality of secondary video streams recorded in a BD-ROM or a local storage, the next stream is selected. This provides an option for "using a stream, which can be played back by the device itself, in the Picture in Picture". With this structure, when the total size of the secondary video varies, and there is a variation in whether or not the playback device has a capability to play back the secondary video, it is possible to cause the playback device to display any secondary video and execute the Picture in Picture.

When an AV clip, which includes a secondary video stream corresponding to a secondary video selected in the above-described manner, is referred to by a second sub-playitem, the playback is interrupted if the AV clip is an Unavailable clip. Therefore, by downloading in time an AV clip which includes the current secondary video stream and is referred to by the sub-playitem information, it is possible to prevent the playback from being interrupted and ensure a smooth progress of playback.

Embodiment 4

The present embodiment relates to an improvement in the case where the playback list to be played back is a playlist for a stereoscopic image.

A stereoscopic viewing is achieved by using a holography technology or use of a parallax image.

The former method, the holography technology is characterized in that it can reproduce an object three-dimensionally in the same manner as the human being recognizes the object normally, and that, in regards with video generation, although it has established a technological theory, it requires (i) a computer that can perform an enormous amount of calculations to generate the video for holography in real time, and (ii) a display device having a resolution in which several thousands of lines can be drawn in a length of 1 mm. It is extremely difficult for the current technology to realize such a product, and thus a product for commercial use has hardly been developed.

On the other hand, the latter method using a parallax image has a merit that a stereoscopic viewing can be realized only by preparing images for viewing with the right eye and the left eye. Some technologies including the sequential segregation method have been developed for practical use from the viewpoint of how to cause each of the right eye and the left eye to view only the images associated therewith.

To achieve the stereoscopic viewing, the home theater system described in Embodiment 1, which includes the playback device and the television, also includes a sequential-type stereo goggle.

Figure 39A:
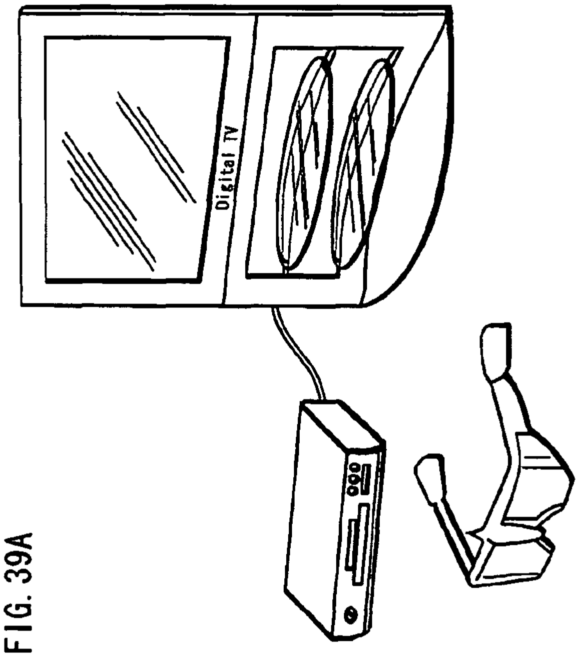
FIGS. 39A through 39E show one example of the sequential-type stereo goggle.

FIGS. 39A through 39E show one example of the sequential-type stereo goggle. FIG. 39A shows a home theater system that achieves the stereoscopic viewing. As shown in FIG. 39A, the home theater system includes a sequential-type stereo goggle 105, as an attachment to the television 104.

Figure 39B:

FIG. 39B shows the sequential-type stereo goggle 105 in the state where it is worn by the user. The sequential-type stereo goggle 105 is equipped with a liquid-crystal shutter that enables the user to view a parallax image by the sequential segregation method. Here, the parallax image is an image which is composed of a pair of (i) an image that enters only into the right eye and (ii) an image that enters only into the left eye, such that pictures respectively associated with the right and left eyes respectively enter the associated eyes, thereby achieving the stereoscopic viewing.

Figure 39C:
Figure 39D:
Figure 39E:

Note that the sequential segregation method is a method in which images for the left eye and right eye are alternately displayed in a time axis direction such that left and right scenes are overlaid in the brain by the effect of residual images of eyes, and the overlaid image is recognized as a stereoscopic image. FIG. 39C shows the sequential-type stereo goggle 105 in the state of being used for viewing a planar image. When a planar image is to be viewed, the liquid-crystal shutters for both eyes are set to a light-transmission state. FIG. 39D shows the sequential-type stereo goggle 105 in the state of being used for viewing with the left eye. At the instant when an image for viewing with the left eye is displayed on the display, the liquid-crystal shutter of the sequential-type stereo goggle 105 for the left eye is set to the light-transmission state, and the liquid-crystal shutter for the right eye is set to a light block state. FIG. 39E shows the sequential-type stereo goggle 105 in the state of being used for viewing with the right eye. At the instant when an image for viewing with the right eye is displayed on the display, the liquid-crystal shutter of the sequential-type stereo goggle 105 for the right eye is set to the light-transmission state, and the liquid-crystal shutter for the left eye is set to the light block state.

In the sequential segregation method, images for the left eye and right eye are alternately displayed in a time axis direction. For this reason, while 24 frames of images are displayed per second in the case of a regular two-dimensional movie, a total of 48 frames of images for the right and left eyes should be displayed per second. Accordingly, this method is suitable for displays that can rewrite the screen at a relatively high speed, but this method can be applied any displays that can rewrite the screen a predetermined times per second.

Different from the sequential segregation method in which images for the left eye and right eye are alternately displayed in a time axis direction, there is another method in which pictures for the left and right eyes are aligned vertically in a screen at the same time, and a lenticular lens is played on the surface of the display such that pixels constituting the picture for the left eye form an image only in the left eye and pixels constituting the picture for the right eye form an image only in the right eye. This enables the left and right eyes to see respectively pictures that have a parallax, thereby realizing a stereoscopic viewing. Note that this method is achieved not only by the lenticular lens, but by another device having a similar function such as a liquid-crystal element. Furthermore, a stereoscopic viewing can also be realized by a system in which a vertical polarizing filter is set for pixels for the left eye, a horizontal polarizing filter is set for pixels for the right eye, and the user watches the display by using a pair of polarizing glasses, where a vertical polarizing filter is attached to the left-eye glass, and a horizontal polarizing filter is attached to the right-eye glass.

The stereoscopic viewing using such a parallax image has already been in practical use in play equipment in amusement parks or the like, and its technology has been established, and thus is considered to be put into practical use at home first among others. Note that there have been proposed various methods, such as the two-color segregation method, for realizing a stereoscopic viewing as well as the above-described ones, and that although the sequential segregation method and the polarizing glass method are used as examples in the present embodiment, the present invention is not limited to the two methods, but is applicable to any method that uses the parallax image.

The present embodiment describes a method for storing the parallax images to be used for the stereoscopic viewing, onto an information recording medium. In the following description, an image including a screen for the left eye is referred to as "image for left eye", an image including a screen for the right eye is referred to as "image for right eye", and an image including both screens is referred to as "image for stereoscopic viewing".

<Improvement in Primary and Secondary Video Streams>

The primary video stream in the present embodiment is a video stream that is played back as an image for planar viewing in a playback device for planar viewing, and is played back as an image for left eye when an image for stereoscopic viewing is played back by a planar/stereoscopic view playback device. Hereinafter, this video stream is referred to as a "planar/left-eye view video stream".

The secondary video stream in the present embodiment is a "right-eye view video stream". The right-eye view video stream is a video stream that is played back as an image for right eye when an image for stereoscopic viewing is played back by a planar/stereoscopic view playback device. The right-eye view video stream is assigned with PID "0x1012", which is different from the PID of the primary video stream. Next, a description is given of the structure of the planar/left-eye view video stream and the right-eye view video stream.

It should be noted here that the right-eye view video stream, compared with the planar/left-eye view video stream, can be reduced greatly in data amount by performing an inter-picture predictive encoding between the left and right viewpoints since there is a large correlation between the images of the left and right viewpoints that view the same subject. Also, the frame rate for the planar/left-eye view video stream is a frame rate in the case where a single planar/left-eye view video stream is played back by a planar view playback device. The value of the frame rate is stored in the GOP header.

Figure 40:
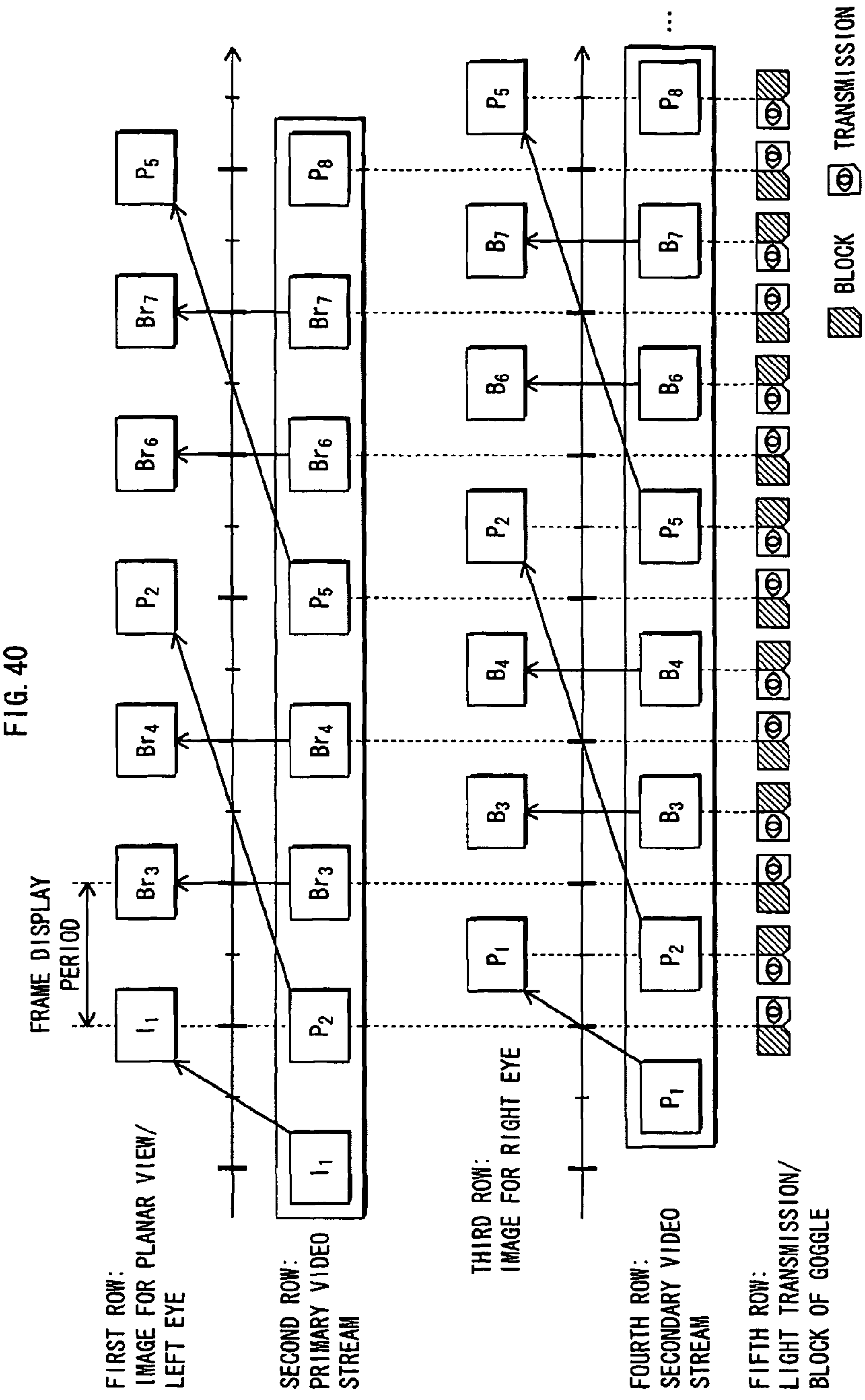
FIG. 40 shows one example of the internal structure of the primary video stream and the secondary video stream for stereoscopic viewing.

FIG. 40 shows one example of the internal structure of the primary video stream and the secondary video stream for stereoscopic viewing.

The second row of FIG. 40 shows the internal structure of the primary video stream. The primary video stream includes picture data I1, P2, Br3, Br4, P5, Br6, Br7, and P8. These picture data are decoded in accordance with the DTS. The first row shows the image for the left eye. The decoded picture data 11, P2, Br3, Br4, P5, Br6, Br7, and P8 are played back in the order of I1, Br3, Br4, P2, Br6, Br7, and P5 in accordance with the PTS, thereby achieving a display of the image for the left eye.

The fourth row of FIG. 40 shows the internal structure of the secondary video stream. The secondary video stream includes picture data P1, P2, B3, B4, P5, B6, B7, and P8. These picture data are decoded in accordance with the DTS. The third row shows the image for the right eye. The decoded picture data P1, P2, B3, B4, P5, B6, B7, and P8 are played back in the order of P1, B3, B4, P2, B6, B7, and P5 in accordance with the PTS, thereby achieving a display of the image for the right eye.

The fifth row of FIG. 40 shows how the state of the sequential-type stereo goggle 105 is changed. As shown in the fifth row, the shutter for right eye is closed when the left-eye image is viewed, and the shutter for left eye is closed when the right-eye image is viewed.

These primary and secondary video streams have been compressed by an inter-picture predictive encoding that makes use of the redundancy between the viewpoints, as well as by an inter-picture predictive encoding that makes use of the redundancy in a time axis direction. The pictures of the right-eye view video stream have been compressed by referring to the pictures of the planar/left-eye view video stream for the same display time.

For example, the first P picture in the right-eye view video stream refers to the I picture in the planar/left-eye view video stream, the B picture in the right-eye view video stream refers to the Br picture in the planar/left-eye view video stream, and the second P picture in the right-eye view video stream refers to the P picture in the planar/left-eye view video stream.

<Video Access Unit>

The time axis in FIG. 40 indicates the relationships between the display times (PTS) and the decode times (DTS) that are assigned to each video access unit for the planar/left-eye view video stream and the right-eye view video stream. More specifically, the DTSs of each picture data in the planar/left-eye view video stream and the right-eye view video stream are set such that they alternately appear in the time axis. Also, the PTS of each picture data in the planar/left-eye view video stream and the PTS of each picture data in the right-eye view video stream are set such that they alternately appear in the time axis. This can be achieved by setting the pictures of the planar/left-eye view video stream and the right-eye view video stream, which are in the reference relationships in the inter-picture predictive encoding, alternately in the decoding order and the display order.

Also, the time gap between the DTSs for a frame for the planar/left-eye viewing and the next frame for the right-eye viewing is set to be a half of one display time gap of frames for the planar/left-eye viewing. Similarly, the time gap between the PTSs for a frame for the planar/left-eye viewing and the next frame for the right-eye viewing is set to be a half of one display time gap of frames for the planar/left-eye viewing.

<Stereoscopic Viewing Display Delay>

A stereoscopic viewing display delay is defined as a differential between a gap between PTSs of pictures in the planar/left-eye view video stream and a gap between PTSs of pictures in the right-eye view video stream, for the same display time. The stereoscopic viewing display delay is a half of one display time gap of frames in the planar/left-eye view video stream.

<Stereoscopic View Playlist>

A sub-path for AV clips for the right-eye view is prepared in the stereoscopic view playlist. The sub-path is set to refer to a plurality of AV clips for the right-eye view and to be synchronized with the main path in the time axis. With this structure, the planar view playlist and the stereoscopic view playlist can share an AV clip for the planar/left-eye view, and the stereoscopic view playlist can associate the left-eye view with the right-eye view so that they are synchronized in the time axis.

The playlist information includes a stereoscopic view flag for the distinction between the stereoscopic view playlist and the planar view playlist. The stereoscopic view flag indicates whether or not a stereoscopic viewing is available, which means that the secondary video stream can be played back because the stream number table in the playlist information indicates that the secondary video stream is permitted to be played back.

Up to now, an improvement of the recording medium has been explained. Next, the playback device will be described in detail. The playback device in the present embodiment includes, in place of the primary video plane 35, a 2D/left-eye image plane 61 and a right-eye image plane 62.

Figure 41:
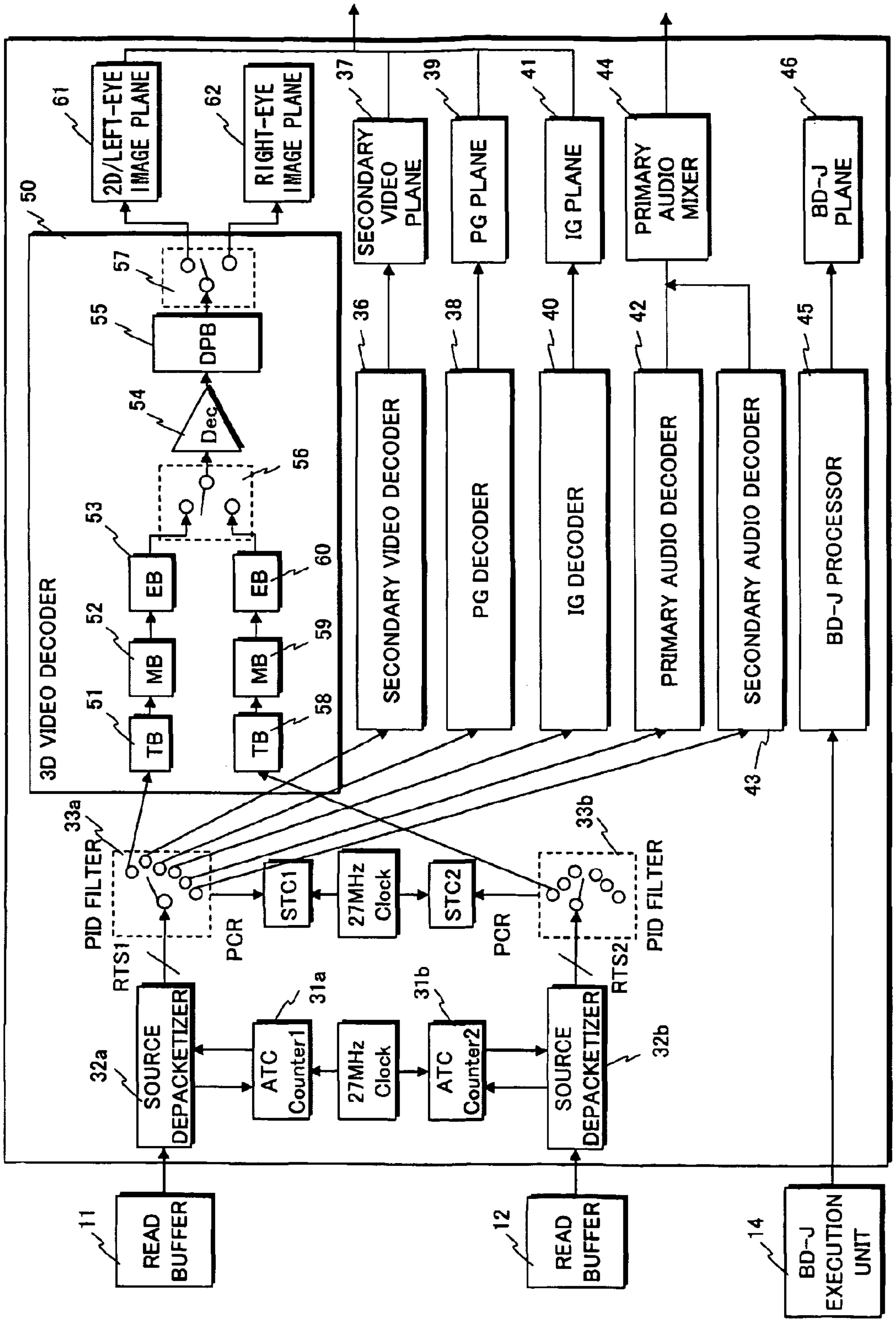
FIG. 41 shows one example of the internal structure of the system target decoder 13.

FIG. 41 shows one example of the internal structure of the system target decoder 13. Among the components shown in FIG. 41, the structure of the secondary video decoder, IG decoder, PG decoder, primary audio decoder, secondary audio decoder, audio mixer, and image processor is the same as the structure of the corresponding components of the playback device for a planar view described in Embodiment 1, and description thereof is omitted here.

The source depacketizer 32*a* interprets a source packet stored in the read buffer 11, extracts the TS packet, and sends the TS packet to the PID filter 33*a*.

The source depacketizer 32*b* interprets a source packet stored in the read buffer 11, extracts the TS packet, and sends the TS packet to the PID filter 33*b*. In sending the TS packet, the source depacketizer adjusts the time of input into the decoder in accordance with the ATS of each source packet. More specifically, the source depacketizer transfers a TS packet to the PID filer according to the recording rate of the AV clip, at the instant when the value of the ATC generated by the ATC counter and the value of the ATS of the source packet become identical.

The PID filter 33*a* transfers TS packets output from the source depacketizer 32*a*. More specifically, the PID filter 33*a* transfers, among TS packets output from the source depacketizer 32*a*, TS packets having a PID that matches a PID required for playback to the TB 51 of the 3D video decoder 50, the secondary video decoder, the IG decoder, the PG decoder, the audio decoder or the secondary audio decoder, depending on the PID of the TS packet. For instance, in the case of the BD-ROM, a TS packet having a PID 0x1011 is transferred to the primary video decoder, TS packets having a PIDs 0x1B00 to 0x1B1F are transferred to the secondary video decoder, TS packets having PIDs 0x1100 to 0x111F are transferred to the primary audio decoder, TS packets having PIDs 0x1A00 to 0x1A1F are transferred to the secondary audio decoder, TS packets having PIDs 0x1200 to 0x121F are transferred to the PG decoder, and TS packets having PIDs 0x1400 to 0x141F are transferred to the IG decoder. Also, the PID filter 33*b* transfers, among TS packets output from the source depacketizer 32*b*, TS packets having a PID that matches a PID required for playback to the TB 58 of the 3D video decoder 50.

The 3D video decoder 50 includes a TB 51, MB 52, EB 53, TB 58, MB 59, decoder 54, DPB 55, buffer switch 56, picture switch 57, and EB 60.

The TB 51 is a buffer for temporarily storing, as they are, TS packets which include the planar/left-eye view video stream and are output from the PID filter 33*a*.

The MB 52 is a buffer for temporarily storing the video stream that is to be output from the TB 51 to the EB 53. TS headers are removed from the TS packets when the data is transferred from the TB 51 to the MB 52.

The EB 53 is a buffer for storing a video access unit that is in the encoded state. PES headers are removed when the data is transferred from the MB 52 to the EB 53.

The TB 58 is a buffer for temporarily storing, as they are, TS packets which include the right-eye view video stream and are output from the PID filter 33*b*.

The MB 59 is a buffer for temporarily storing the video stream that is to be output from the TB 58 to the EB 60. TS headers are removed from the TS packets when the data is transferred from the TB 58 to the MB 59.

The EB 60 is a buffer for storing a video access unit that is in the encoded state. PES headers are removed when the data is transferred from the MB 52 to the EB 53.

The decoder 54 generates a frame/field image by decoding each video access unit of the video elementary stream at a predetermined decoding time (DTS). Since there are various compression encoding methods such as MPEG2, MPEG4 AVC, and VC1 for compress-encoding the video stream to be multiplexed into the AV clips, the decoder 54 changes the decoding method depending on the attribute of each stream. The decoder 54 transfers the decoded frame/field images to the DPB 55 so that each corresponding frame/field image is transferred to the picture switch at the timing of the display time (DTS).

The DPB 55 is a buffer for temporarily storing decoded frame/field images. When the decoder 54 decodes a vide access unit such as an inter-picture predictive encoded P or B picture, the decoder 54 refers to a decoded picture stored in the DPB 55.

The buffer switch 56 operates so that the pictures stored in the EB 53 and the EB 60 are transferred to the decoder 54 at the timing of the decoding time (DTS) assigned to each video access unit. Also, the buffer switch 56 may decide from which of the EB 53 and the EB 60, the next access unit should be extracted, by using the decode switch information having been obtained by the decoder 54 during decoding of a video access unit. Also, since the DTSs of each picture data in the planar/left-eye view video stream and the right-eye view video stream are set such that they alternately appear in the time axis, the video access units may be transferred to the decoder 54 in units of pictures when, for example, the decoder 54 is such a decoder that brings forward the decoding regardless of the DTS.

The picture switch 57 operates so that, when a decoded frame/field image transferred from the decoder 54 is the planar/left-eye view video stream, it is immediately written into the 2D/left-eye image plane 61, and when a decoded frame/field image transferred from the decoder 54 is the right-eye view video stream, it is immediately written into the right-eye image plane 62.

This completes an explanation of the system target decoder. Next, an improvement of the virtual package control unit 16 in the present embodiment will be explained.

The virtual package control unit 16 does not output the DataStarved event when the stereoscopic view flag is set off, even if an AV clip including a secondary video stream has not been downloaded. With this structure, the JMF player instance and the playback control engine do not stop the playback even if a secondary video stream has not been downloaded.

On the contrary, when the stereoscopic view flag is set on, the virtual package control unit 16 notifies the DataStarved event to the JMF player instance and the playback control engine when the current secondary video stream corresponds to a sub-playitem, and the sub-playitem is referring to an AV clip not having been downloaded yet or referring to an AV clip in the Disable state. With this notification of the DataStarved event, the playback stops.

Also, the playback is proceeded even if an AV clip including a secondary video stream has not been downloaded when the sequential-type stereo goggle 105 has been removed and the playback device 101 has been set to "stereoscopic view off".

As described above, according to the present embodiment, when the stereoscopic view is set "off", a playback of a playitem is proceeded without waiting for the downloading of an AV clip including a secondary video stream.

Embodiment 5

The present embodiment describes a detailed data structure and a structure of the playback device for selecting the current primary audio stream and the current secondary audio stream.

Figure 42:
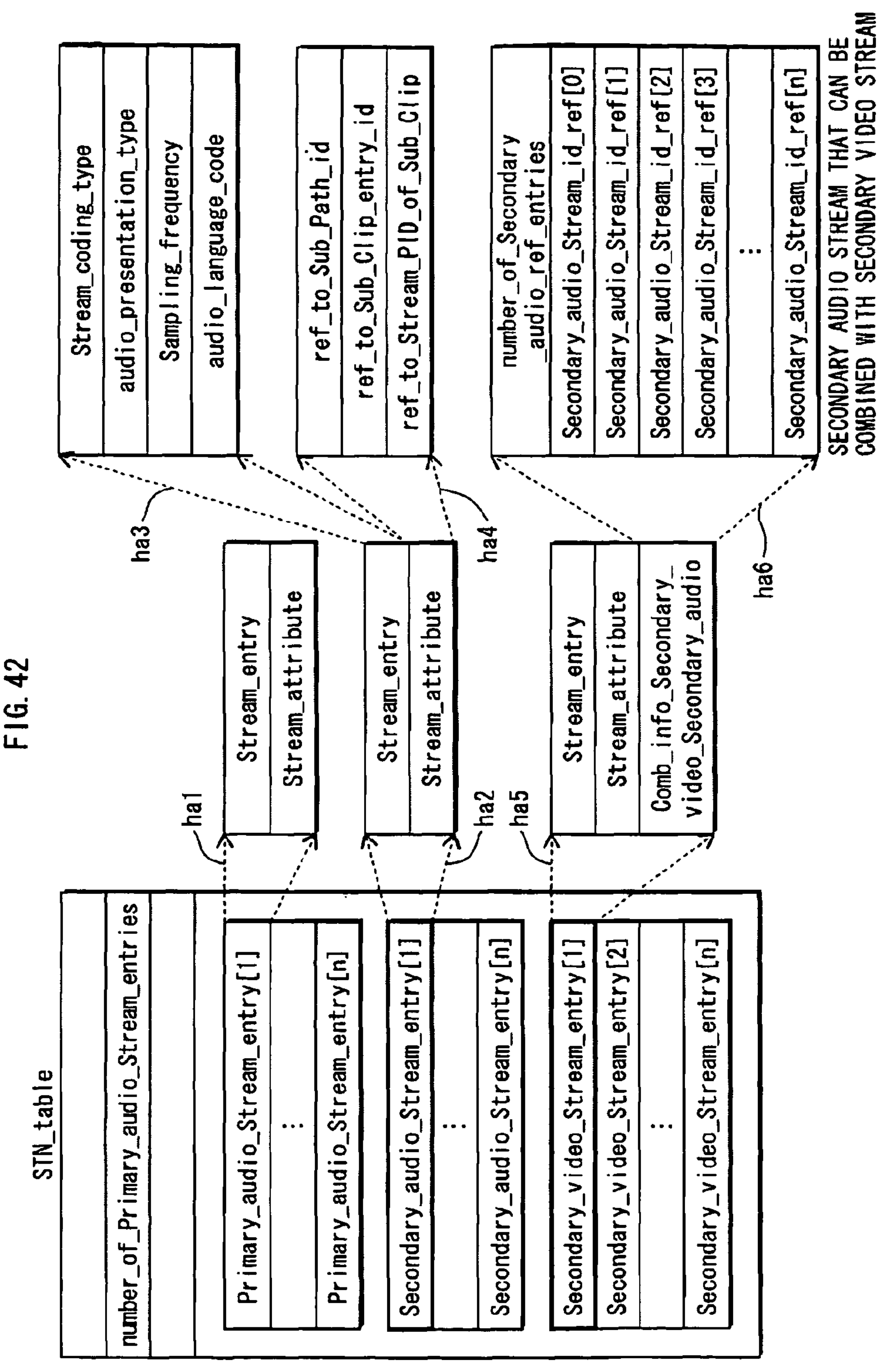
FIG. 42 shows one example of the internal structure of Primary_audio_stream_entry and Secondary_audio_stream_entry, and the internal structure of Comb_info_Secondary_video_Secondary_audio.

FIG. 42 shows one example of the internal structure of Primary_audio_stream_entry and Secondary_audio_stream_entry, and the internal structure of Comb_info_Secondary_video_Secondary_audio. In FIG. 42, the lead lines ha1 and ha2 respectively indicate the close-ups of the internal structures of Primary_audio_stream_entry and Secondary_audio_stream_entry. These internal structures are structured in the same manner, being composed of Stream_entry and Stream_attribute.

The lead line ha3 indicates the close-up of the internal structure of Stream_entry. As shown therein, Stream_entry of the primary audio stream and the secondary audio stream is composed of: Stream_coding type indicating an encoding method of the audio stream; audio_presentation_type indicating a channel structure of the corresponding audio stream; Sampling_frequency indicating a sampling frequency of the corresponding audio stream; and audio_language_code indicating a language attribute of the audio stream.

The lead line ha4 indicates the close-up of the internal structure of Stream_attribute. As shown therein, Stream_attribute of the primary audio stream and the secondary audio stream is composed of: ref_to_Sub_Path_id indicating SubPath information being referring to the secondary audio stream; ref_to_Sub_Clip_entry_id indicating SubClip in which the primary audio stream and the secondary audio stream are multiplexed; and ref_to_Steam_PID_of_Sub_Clip indicating a reference value for a PID of the PES packet constituting the primary audio stream and the secondary audio stream.

As information corresponding to the secondary audio stream, Stream_entry for the secondary audio stream includes Comb_info_Secondary_video_Secondary_audio as indicated by the lead line ha5.

The lead line ha6 indicates the close-up of Comb_info_Secondary_video_Secondary_audio. Comb_info_Secondary_video_Secondary_audio is composed of: "number_of_Secondary_audio_stream_ref_entries" indicating the total number of secondary audio streams that can be combined for each secondary video stream; and "Secondary_audio_stream_id_ref [0] through [n]" indicating stream numbers of secondary audio streams that can be combined when the secondary video stream is played back.

As described above, the STN_table includes Stream_entry of the primary audio stream that is to be the audio of the primary video stream, and Stream_entry of the secondary audio stream that is to be the audio of the secondary video stream. Also, Stream_entry of the secondary video stream describes secondary audio streams that can be combined with the secondary video stream, for each secondary video stream (Comb_info_Secondary_video_Secondary_audio).

This completes description of the features of the recording medium for the playback of the audio stream. Next, the features of the playback device for the playback of the audio stream will be described.

The playback device is provided with, as a structure for achieving the audio playback, the stream number of the current primary audio stream and the stream number of the current secondary audio stream. The following describes these numbers.

<PSR1>

FIG. 43A shows one example of the bit assignment in the PSR1.

As shown in FIG. 43A, the lower eight bits (b0-b7) among 32 bits of the PSR1 represents the primary audio stream number, and identifies one of a plurality of Primary audio streams whose entries are written in the STN_table of the current Play Item. When the value set in the PSR1 changes, the playback device plays back a Primary audio stream corresponding to the set value after the change. The PSR1 is set to "0xFF" as the initial value, and then may be set to a value ranging from "1" to "32" by the playback device. The value "0xFF" is an indefinite value and indicates that there is no Primary audio stream or that a Primary audio stream has not been selected. When the PSR1 is set to a value ranging from "1" to "32", the set value is interpreted as a stream number of a Primary audio stream.

<PSR14>

FIG. 43B shows one example of the bit assignment in the PSR14.

As shown in FIG. 43B, the lower eight bits (b0-b7) among 32 bits of the PSR14 represents a secondary stream number, and identifies one of a plurality of Secondary audio streams whose entries are written in the STN_table of the current Play Item. When the value set in the PSR14 changes, the playback device plays back a Secondary audio stream corresponding to the set value after the change. The PSR14 is set to "0xFF" as the initial value, and then may be set to a value ranging from "1" to "32" by the playback device. The value "0xFF" is an indefinite value and indicates that there is no Secondary audio stream or that a Secondary audio stream has not been selected. When the PSR14 is set to a value ranging from "1" to "32", the set value is interpreted as a stream number of a Secondary audio stream.

Figure 44:
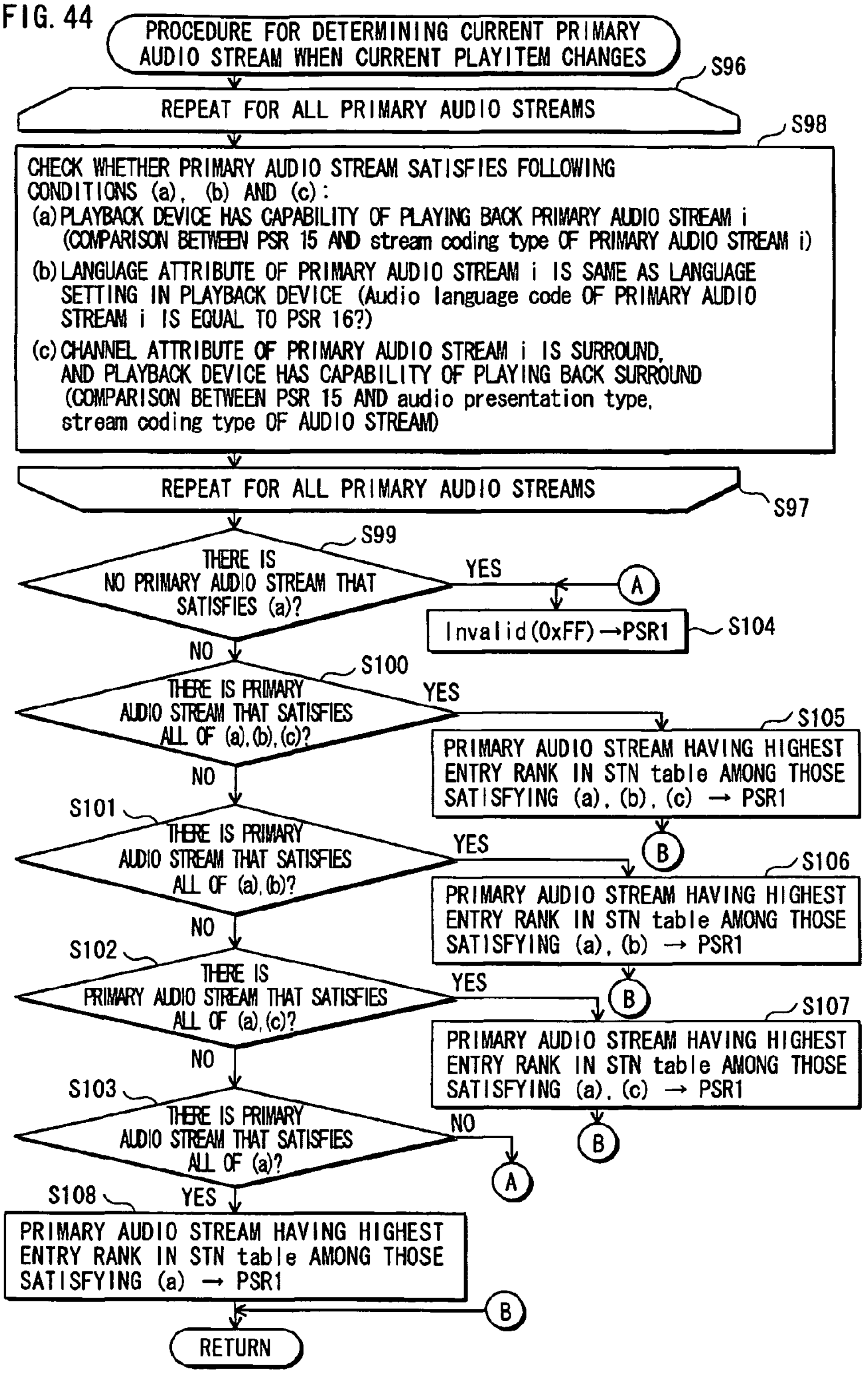
FIG. 44 is a flowchart showing the procedure for determining the current primary audio stream when the current playitem changes.

FIG. 44 is a flowchart showing the procedure for determining the current primary audio stream when the current play-item changes. In this flowchart, the steps S96 through S98 constitute a loop in which the step S98 is repeated for all the primary audio streams indicated in the STN_table. In this loop, each processing-target primary audio stream is called "primary audio stream i", and step S98 checks whether or not the primary audio stream i satisfies the conditions (a), (b), and (c).

The condition (a) is that the playback device has a capability of playing back the primary audio stream i, and whether or not the condition (a) is satisfied is judged based on the comparison between PSR 15 and stream_coding_type of the primary audio stream.

The condition (b) is that the language attribute of the primary audio stream i is the same as the deck information, where the deck information is information indicating the language setting of the playback device, and whether or not the condition (b) is satisfied is judged by checking whether or the not the set value of PSR16 is the same as the Audio_language_code of the primary audio stream i described in the STN_table.

The condition (c) is that the channel attribute of the primary audio stream i is "surround" and the playback device has a capability of playing back the surround channel. Whether or not the condition (c) is satisfied is judged based on the comparison between PSR 15 and audio_presentation_type and stream_coding_type of AudioStream.

The present flowchart assigns a priority rank to the primary audio stream depending on the pattern of the conditions it satisfies, for example, "which conditions among the above-described conditions are satisfied by the primary audio stream i" or "how many conditions are satisfied by the primary audio stream i".

After the loop process is performed for all of the primary audio streams, steps S99 through S103 are performed. In step S99, it is judged whether or not it is true that there is no primary audio stream that satisfies (a). When there is no primary audio stream that satisfies (a) (Yes in step S99), an indefinite value (0xFF) is set in the PSR1 (step S104).

In step S100, it is judged whether or not there is a primary audio stream that satisfies all of (a), (b) and (c). When there is such a primary audio stream, the number of the primary audio stream that satisfies all of (a), (b) and (c) is set in the PSR1 (step S105).

The problem is that, when there are a plurality of primary audio streams that satisfy all of (a), (b) and (c), a selection should be made. They have the same priority rank when they satisfy all of (a), (b) and (c). In this example, step S105 selects a primary audio stream that has the highest entry rank in the STN_table among the primary audio streams that satisfy all of (a), (b) and (c). That is to say, with respect to a plurality of primary audio streams that have the same codec-language attribute-channel attribute, entry ranks thereof in the STN_table are referred to, and a primary audio stream that has the highest entry rank in the STN_table is selected.

This structure enables a person in charge of the authoring to, at the time of the authoring, define the selection control for determining the priority for each stream by changing the order of description in the STN_table.

When it is judged that there is no primary audio stream that satisfies all of (a), (b) and (c), the control goes to step S101, in which it is judged whether or not there is a primary audio stream that satisfies condition (a) and (b). When there are primary audio streams that satisfy (a) and (b), the number of the primary audio stream that has the highest entry rank in the STN_table among them is set in the PSR1 (step S106).

When it is judged that there is no primary audio stream that satisfies all of (a), (b) and (c) and there is no primary audio stream that satisfies (a) and (b), the control goes to step S102, in which it is judged whether or not there is a primary audio stream that satisfies conditions (a) and (c). When there are primary audio streams that satisfy (a) and (c), the number of the primary audio stream that has the highest entry rank in the STN_table among them is set in the PSR1 (step S107).

When it is judged that there is no primary audio stream that satisfies all of (a), (b) and (c), no primary audio stream that satisfies (a) and (b), and no primary audio stream that satisfies (a) and (c), the control goes to step S103, in which it is judged whether or not there is a primary audio stream that satisfies condition (a). When there are primary audio streams that satisfy (a), the number of the primary audio stream that has the highest entry rank in the STN_table among them is set in the PSR1 (step S108).

When a playback section of the current primary audio stream has been defined by a sub-playitem, the sub-playitem that defines the playback section of the current primary audio stream is determined as the current sub-playitem.

Up to now, the procedure for determining the current primary audio stream has been described.

The following describes the procedure for determining the secondary audio stream.

Figure 45:
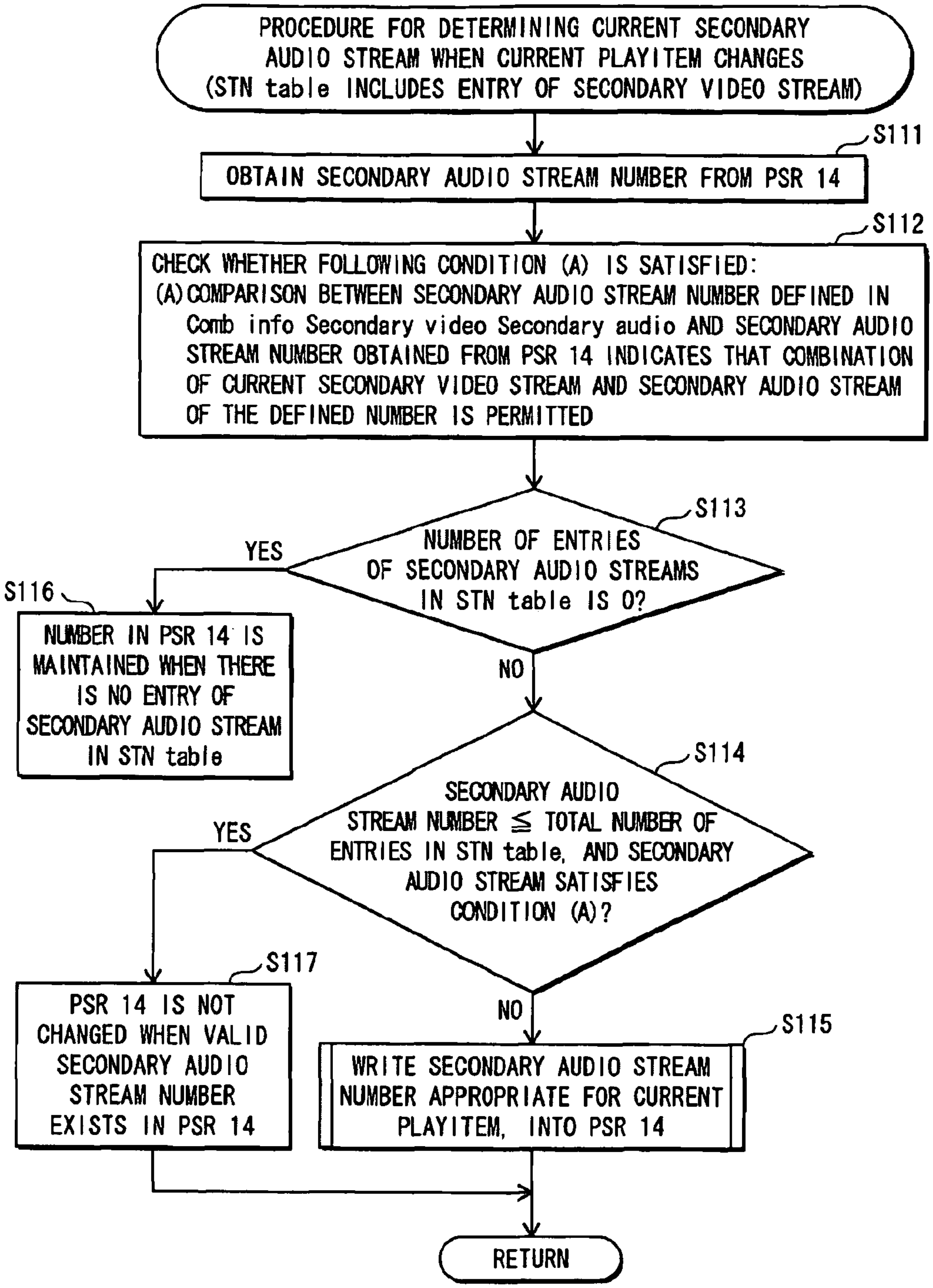
FIG. 45 is a flowchart showing the procedure for determining the secondary audio stream.

FIG. 45 is a flowchart showing the procedure for determining the secondary audio stream.

In step S111, a secondary audio stream number is obtained from PSR 14. In step S112, it is checked whether or not the obtained secondary audio stream number satisfies the following condition (A):

Condition (A): a comparison between a secondary audio stream number defined in Comb_info_Secondary_video_Secondary_audio and the secondary audio stream number obtained from PSR 14 indicates that a combination of the secondary audio stream number with the number and the current secondary video stream is permitted.

After the check, step S113 is performed. In step S113, it is judged whether the number of Stream_entries in the STN_table for the secondary audio streams in the current playitem is "0". When the number of Stream_entries is "0", the secondary audio stream number in PSR 14 is maintained (step S116). When the number of Stream_entries is not "0", the control goes to step S114.

In step S114, it is judged whether or not the secondary audio stream number is equal to or smaller than the total number of Stream_entries in the STN_table and the condition (A) is satisfied. When it is judged that the condition (A) is satisfied, it is considered that a valid secondary audio stream number already exists in PSR14, and thus the number in PSR14 is maintained. When it is judged that the condition (A) is not satisfied, a current secondary audio stream that is optimum for the current playitem is selected (step S115).

Up to now, the procedure for determining the secondary audio stream has been described.

The following describes the procedure for selecting a current secondary audio stream that is optimum for the current playitem.

Figure 46:
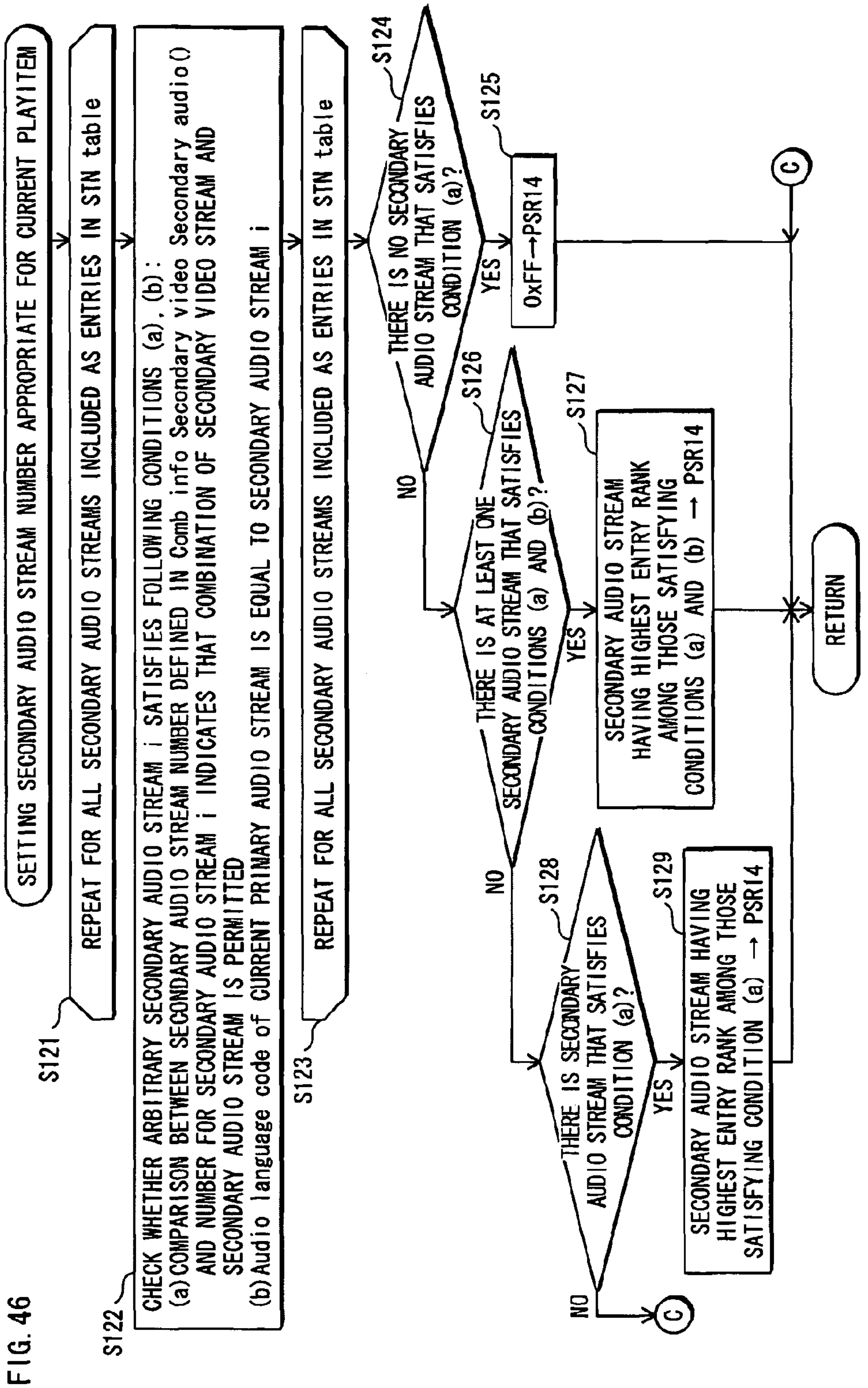
FIG. 46 is a flowchart showing the procedure for selecting a current secondary audio stream that is optimum for the current playitem.

FIG. 46 is a flowchart showing the procedure for selecting a current secondary audio stream that is optimum for the current playitem.

In this flowchart, the steps S121 through S123 constitute a loop in which it is checked for all streams corresponding to all Stream_entries written in the STN_table whether or not an arbitrary stream satisfies the following conditions:

Condition (a): a comparison between a secondary audio stream number defined in Comb_info_Secondary_video_Secondary_audio and the number of secondary audio stream i indicates that a combination of the secondary audio stream i and the current secondary video stream is permitted; and Condition (b): the audio_language_code of the current primary audio stream matches the audio_language_code of the secondary audio stream.

After the loop process is performed for all of the secondary audio streams that are permitted to be played back in the STN_table, the control goes to step S124.

In step S124, it is judged whether or not it is true that there is no secondary audio stream that satisfies (a). When there is no secondary audio stream that satisfies (a) (Yes in step S124), a value 0xFF as a secondary audio stream number is set in the PSR14 (step S125).

When there are one or more secondary audio streams that satisfy (a) (No in step 124), the control goes to step S126 in which it is judged whether or not there is at least one secondary audio stream that satisfies conditions (a) and (b). When there is at least one secondary audio stream that satisfies conditions (a) and (b), a secondary audio stream whose corresponding Stream_entry is placed first in the STN_table is selected among the secondary audio streams that satisfy conditions (a) and (b), and the secondary audio stream number of the selected secondary audio stream is set in PSR14 (step S127).

When there is no secondary audio stream that satisfies conditions (a) and (b) (No in step 126), the control goes to step S128 in which it is judged whether or not there is a secondary audio stream that satisfies condition (a). When there are secondary audio streams that satisfy condition (a), a secondary audio stream whose corresponding Stream_entry is placed first in the STN_table is selected among the secondary audio streams that satisfy condition (a), and the secondary audio stream number of the selected secondary audio stream is set in PSR14 (step S129).

When a playback section of the current secondary audio stream has been defined by a sub-playitem, the sub-playitem that defines the playback section of the current secondary audio stream is determined as the current sub-playitem.

As described above, according to the present embodiment, the STN_table preliminarily defines the streams that are permitted to be played back as the primary audio stream for the primary video stream, and as the secondary audio stream for the secondary video stream. And, from among the streams that correspond to the Stream_entries written in the STN_table, one primary audio stream and one secondary audio stream are respectively selected, and they are output in mixture. With this structure, for example, mixed audio in which a commentary by the movie director is overlaid on the main feature audio can be heard when the Picture in Picture is executed.

When an AV clip, which includes the primary and secondary audio streams selected as described above, is referred to by a sub-playitem, the playback is interrupted if the AV clip is an Unavailable clip. Therefore, by downloading in time an AV clip which includes the current primary and secondary audio streams is referred to by the sub-playitem information, it is possible to prevent the playback from being interrupted and ensure a smooth progress of playback.

Embodiment 6

The present embodiment describes a detailed data structure and an improvement of the playback device for selecting the current subtitle stream.

First, Stream_entry for the subtitle in the STN_table is explained. The primary audio streams and the secondary audio streams are respectively assigned to the primary video streams and the secondary video streams. With respect to the subtitle, there is a distinction between the presentation graphics stream and the text subtitle stream, but there is no clear distinction between the text subtitle stream for the primary video stream and the text subtitle stream for the secondary video stream.

Figure 47:
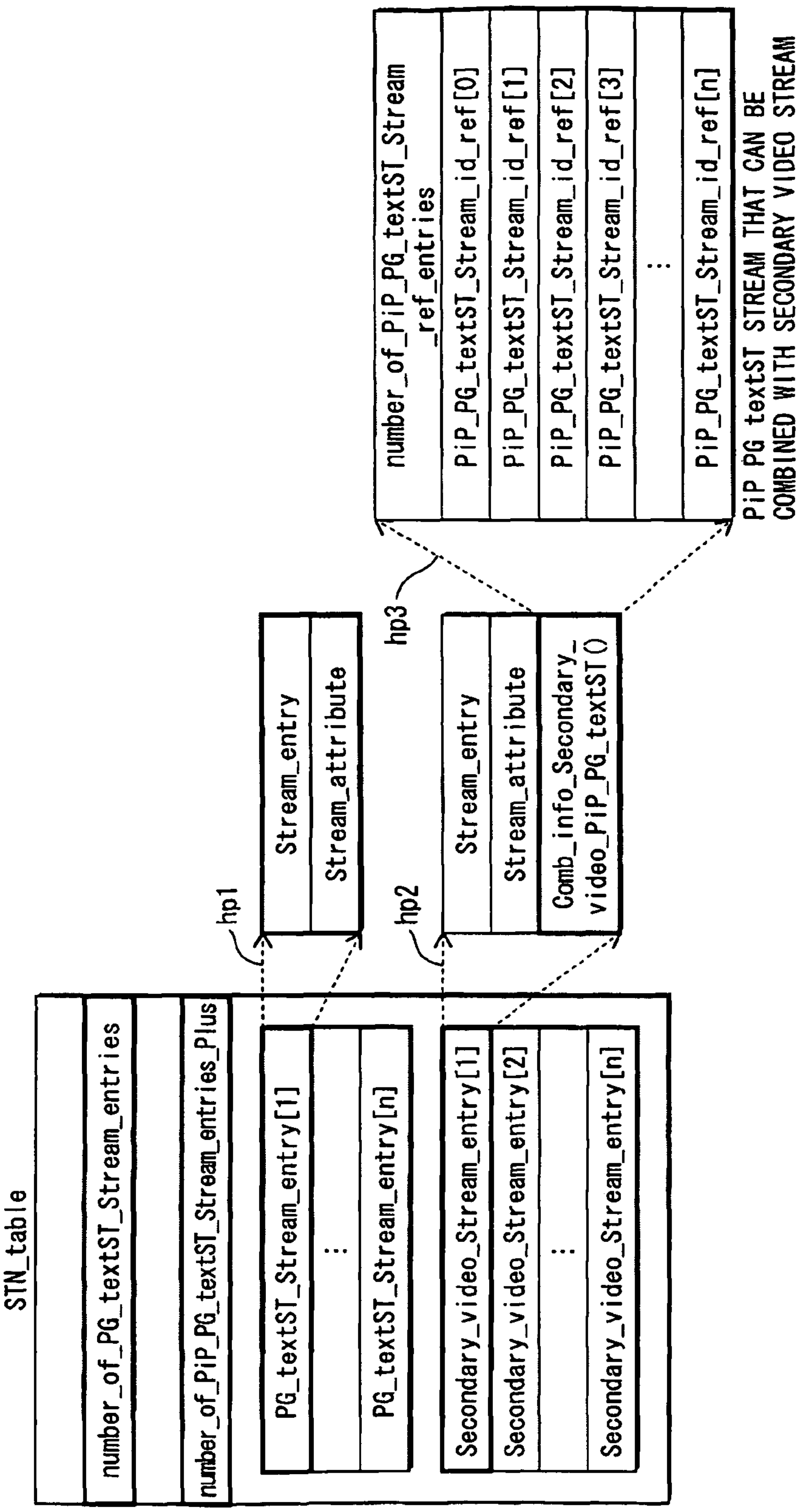
FIG. 47 shows a portion of the STN_table that is especially related to the PGtextST stream.

The following describes the Stream_entry for the PGtextST stream. FIG. 47 shows a portion of the STN_table that is especially related to the PGtextST stream. As shown in FIG. 47, what are especially related to the subtitle display are: "number_of_PG_textST_streams_entries [1] through [n]"; "number_of_PiP_PG_textST_stream_entries_plus"; "PgtestST_stream_entry"; and "Comb_info_Secondary_video_PiP_PG_textST" in "Secondary_video_Stream_entry".

The "number_of_PG_textST_streams_entries" indicates the number of PGtextST streams that are targets for selection while the Picture in Picture is not executed.

The "number_of_PiP_PG_textST_stream_entries_plus" indicates the number of presentation graphics streams and text subtitle streams that should be added to the "number_of_PG_textST_streams_entries" defined in the STN_table for Picture in Picture applications. The sum of the "number_of_PG_textST_streams_entries" and the "number_of_PiP_PG_textST_stream_entries_plus" should be "255" or less.

Here, when the "number_of_PG_textST_streams_entries" is n1, the range of the PG text subtitle streams is a range from stream number 1 to stream number n1. Also, when the "number_of_PiP_PG_textST_stream_entries_plus" is n2, the range of the PG text subtitle streams is a range from stream number 1 to stream number n1+n2 when the Picture in Picture is executed. That is to say, when the "number_of_PiP_PG_textST_stream_entries_plus" is written in the STN_table, the range of the PG text subtitle streams is broadened by as the number written in the "number_of_PiP_PG_textST_stream_entries_plus".

When the Picture in Picture is not executed, Stream_entries 1 through n1 for the PGtextST streams are targets for selection; and when the Picture in Picture is executed, Stream_entries 1 through n1+n2 for the PGtextST streams are targets for selection. It should be noted here that, even when the Picture in Picture is executed, it is not that the subtitles for the primary video and the secondary video are respectively played back. What is played back when the Picture in Picture is executed is either the subtitle for the primary video or the subtitle for the secondary video. For this, there are two reasons: (i) when the subtitles for the primary video and the secondary video are to be recorded separately on the BD-ROM, the playback device would require two graphics decoders, resulting in an increase in the hardware cost; and (ii) even if a reduced subtitle for the secondary video is displayed, it would be difficult to watch.

The lead line hp1 indicates the close-up of the "PG_textST_ Stream_entry". As shown by the lead line, the "PG_textST_ Stream_entry" includes Stream_entry and Stream_attribute. The Stream_entry includes a PID of a PGtextST stream that is permitted to be played back.

The lead line hp2 indicates the close-up of the "Secondary_video_Stream_entry[1]". Among the components thereof, the "Comb_info_Secondary_video_PiP_PG_textST" indicates uniquely PGtextST streams that are permitted to be combined with the secondary video stream.

The lead line hp3 indicates the internal structure of the "Comb_info_Secondary_video_PiP_PG_textST". The "Comb_info_Secondary_video_PiP_PG_textST" includes: "number_of_PiP_PG_textST_stream_ref_entries" indicating the total number of PiP PG text subtitle streams that can be combined with each secondary video stream; and "PiP_PG_textST_stream_id_ref[0] through [n]" indicating the stream numbers of PiP PG text subtitle streams that can be combined during a playback.

Up to now, an improvement of the recording medium in the present embodiment has been described. Next, an improvement of the playback device in the present embodiment will be described. As the structure for playing back the subtitles, the playback device stores separately in the PSR set 23: (i) the stream number of the current PGtextST stream for the execution of Picture in Picture; and (ii) the stream number of the current PGtextST stream for non-execution of Picture in Picture.

FIG. 48A shows one example of the numerical range of the stream numbers that the current PGtextST stream may have.

When the Picture in Picture is not executed, the stream number of the current PGtextST stream takes a value in the range from 1 to n1 as shown in the upper row in FIG. 48A, when the "PiP_PG_text_ST_stream_number" written in the STN_table is n1.

On the other hand, the number of the current PGtextST stream for when the Picture in Picture is executed is called "PiP PG textST stream number". And the PiP PG textST stream number takes a value in the range from 1 to n1+n2 as shown in the lower row in FIG. 48A, when the "PG_text_ST_stream_number" written in the STN_table is n1 and the "number_of_PiP_PG_text_ST_stream entries_plus" written in the STN_table is n2.

FIG. 48B shows one example of the bit assignment in the PSR2. A description is given of the meaning of each bit in PSR2.

disp_s_flag

The b31 of PSR2 is "disp_s_flag", and the value set in the bit b31 is interpreted as follows:

0b: it is not able to display both "PG textST stream" and "PiP PG textST stream"; and 1b: it is able to display both "PG textST stream" and "PiP PG textST stream".

When the "disp_s_flag" is set off, the procedure for selecting the PG text subtitle stream is not executed. When the "disp_s_flag" in PSR2 is set off, there is no current PG text subtitle stream, and thus, in steps S34 and S35 shown in FIG. 34, AV clips that include only PG text subtitle streams are excluded from the selection targets for download.

PiP_PG_textST_valid_flag

The b30 of PSR2 is "PiP_PG_textST_valid_flag", and the value set in the bit b30 is interpreted as follows:

0b: the PG textST stream number defined in PSR2 should be used when a secondary video stream is displayed while the current playitem is displayed; and 1b: the PiP PG textST stream number defined in PSR2 should be used when a secondary video stream is displayed while the current playitem is displayed.

When a secondary video stream is not displayed while the current playitem is displayed, the "PiP_PG_textST_valid_flag" doe not have an influence on the display of the BD-ROM display device. In this case, the PG txtST Stream Number defined in PSR2 is used.

PG txtST Stream Number

The b0 through b11 of PSR2 are "PG txtST Stream Number", and the value set in the read buffer 12 bits is interpreted as follows.

That is to say, when a secondary video stream is not displayed while the current playitem is displayed (when a secondary video stream is not displayed is when the "dis_v_flag" in PSR14 is set to 0b), the value of the PG txtST Stream Number in PSR2 is used to specify either the PG stream or the textST stream that is to be displayed, among the PG textST stream items in the STN_table for the current playitem.

PiP PG txtST Stream Number

The b16 through b27 of PSR2 are "PiP PG txtST Stream Number", and the value set in the read buffer 12 bits is interpreted as follows.

That is to say, when a secondary video stream is displayed while the current playitem is displayed (when a secondary video stream is displayed is when the "dis_v_flag" in PSR14 is set to 1b, and the secondary video stream determined by PSR14 while the current playitem is displayed is displayed), and the PiP_PG_textST_valid_flag is set to 1b, the value of the PiP PG txtST Stream Number in PSR2 is used to specify either the PG stream or the textST stream that is to be displayed, among the PG textST stream items in the STN_table for the current playitem.

Figure 49:
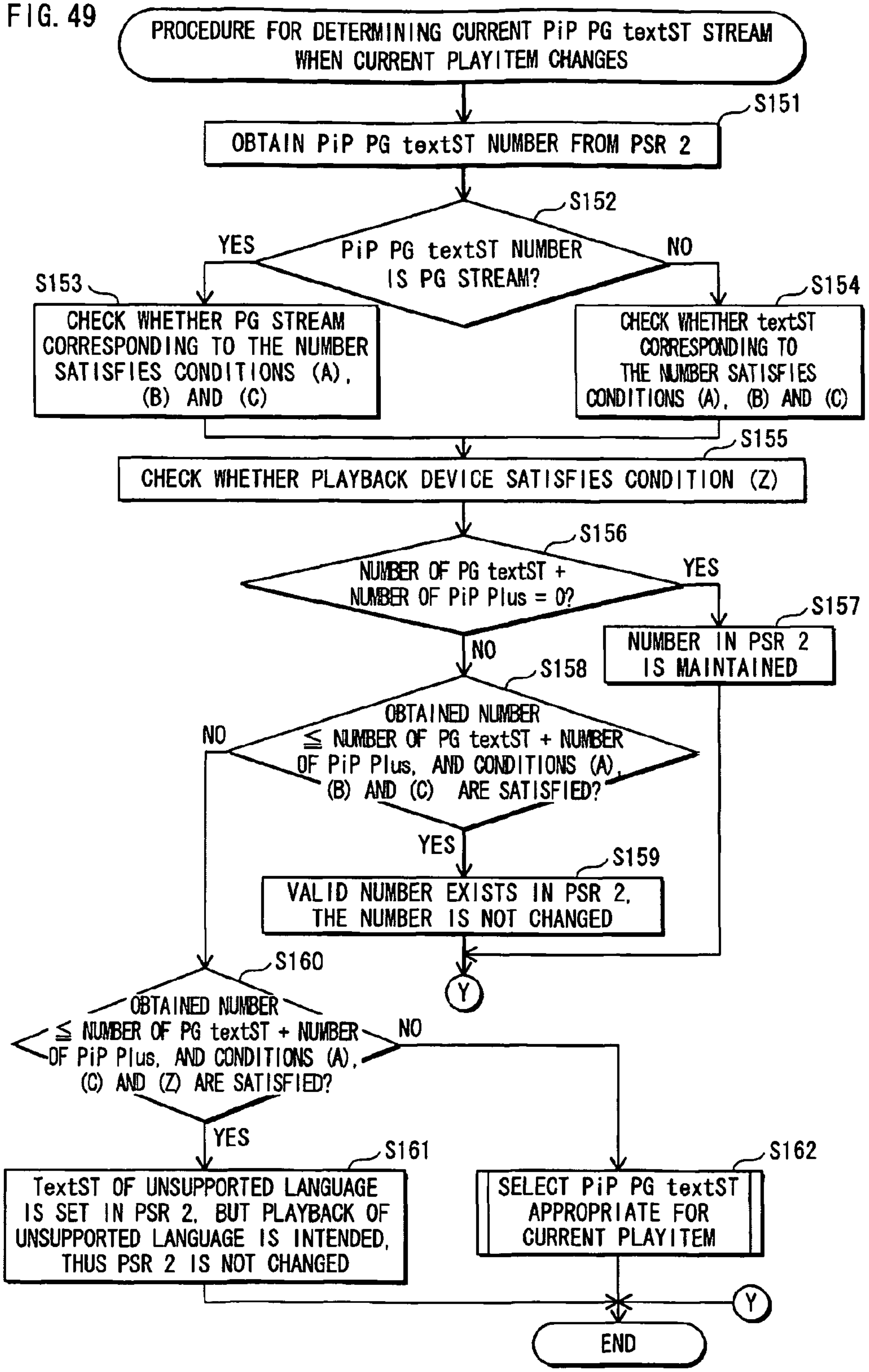
FIG. 49 is a flowchart showing the procedure for determining the current PiP PG textST stream when the current playitem changes.

FIG. 49 is a flowchart showing the procedure for determining the current PiP PG textST stream when the current playitem changes.

Note that in the following description, the stream numbers of PGtextST streams for non-execution of the Picture in Picuture and how they are treated are omitted since they are simplified selection of the PGtextST streams for execution of the Picture in Picuture. In the present embodiment, stream numbers of PGtextST streams for execution of the Picture in Picuture will be described.

In step S151, the current PiP PG textST stream number is obtained from PSR2. In step S152, it is judged whether the current PiP PG textST stream number is for a presentation graphics stream or for a text subtitle stream. In step S153, it is judged whether the presentation graphics stream corresponding to the current PiP PG textST stream number satisfies the conditions (A), (B), and (C).

The conditions (A), (B), and (C) are defined as follows:

Condition (A): the playback device has the capability of decoding the presentation graphics stream corresponding to the current PiP_PG_textST stream number;

Condition (B): the playback device has the capability of playing back a specified language; and Condition (C): a comparison between a secondary video stream number in PSR14 and a PG text subtitle stream number by Comb_info_Secondary_video_PiP_textST( ) indicates that a combination of the current secondary video stream and the PG text subtitle stream identified from the current PiP_PG_textST stream number is permitted.

In step S154, it is checked whether the text subtitle stream corresponding to the current PiP_PG_textST stream number satisfies the following conditions (A), (B) and (C).

Condition (A): the playback device has the capability of expanding, into the bit map, the character code of the text subtitle stream corresponding to the current PiP_PG_textST stream number, where this capability is indicated by PSR30 in the PSR set 23.

Condition (B): the playback device has the capability of supporting the language attribute of the character code of the text subtitle stream corresponding to the current PiP_PG_textST stream number, where this capability is indicated by PSR48-61 in the PSR set 23.

Condition (C): a comparison between a secondary audio stream number in PSR14 and a PG text subtitle stream number by Comb_info_Secondary_video_PiP_textST( ) indicates that a combination of the current secondary video stream of the number stored in PSR14 and the PG text subtitle stream identified from the current PiP_PG_textST stream number is permitted.

Note that, for a playback device to "be able to decode" a text subtitle stream which represents the subtitle of a language, the playback device should have the capability of expanding the text subtitle stream of the language into the bit map, and the capability of supporting the characteristic of the language.

Here, this will be considered by taking examples of English, Japanese, and Arabic. As for subtitle displays in English, the language characteristics of English are judged to be supported only when the functions of "horizontal writing", "kerning", "double letter /logotype" are all supported.

As for subtitle displays in Japanese, the language characteristics of Japanese are judged to be supported only when the functions of "horizontal writing" "vertical writing" "prohibit line breaks after certain characters", "characters in smaller size" are all supported as bit maps are written into the PG plane 8.

As for subtitle displays in Arabic, the language characteristics of Arabic are judged to be supported only when the functions of "rendering from the right to the left" and "double letter/logotype" are all supported as bit maps are written into the PG plane 8.

When the playback device has the capability of expanding the text subtitle stream of a language into the bit map and has the capability of supporting the language characteristic, it can be said that the above-described conditions (A) and (B) are satisfied. When the playback device has the capability of expanding the text subtitle stream of a language into the bit map, but not the capability of supporting the language characteristic, it can be said that the condition (B) is not satisfied, but only the condition (A) is satisfied.

After this checking, the control goes to step S155 in which it is judged whether or not the playback device satisfies the condition (Z).

Here, the condition (z) is that the user is intending to play back a subtitle of an unsupported language, the intention being indicated by PSR30 in the PSR set 23.

After this, in step S156, it is judged whether or not the sum of the number_of_PG_textST_streams_entries in the STN_table of the current playitem and the number_of_PiP_PG _ textST_stream_entries_plus is "0". When the STN_table does not include a PGtextST stream that is permitted to be played back, the number of the PGtextST stream in PSR2 is maintained (step S157). When the STN_table includes at least one PGtextST stream that is permitted to be played back, the control goes to step S158 in which, to check the validity of the current PiP_PG_textST_stream number, it is judged whether the current PiP_PG_textST_stream number is equal to or lower than the total number of Stream_entries in the STN_table, and the conditions (A), (B) and (C) are satisfied.

When it is judged that the conditions are satisfied, it is considered that a valid PiP_PG_textST_stream number already exists in PSR2, and thus the number in PSR2 is maintained (step S159).

When it is judged that the conditions are not satisfied in step S158, the control goes to step S160 in which it is judged whether the current PiP_PG textST stream number is equal to or lower than the total number of Stream_entries in the STN_table, and the conditions (A), (C) and (Z) are satisfied.

When it is judged that the conditions are satisfied, it is considered that although a PiP_PG_textST_stream number corresponding to a text subtitle of an unsupported language is set in PSR2, the user is intending to playback the unsupported language, and thus the number in PSR2 is maintained (step S161). When it is judged that the conditions are not satisfied in step S160, a current PG textST subtitle stream that is optimum for the current playitem is selected (step S162).

Up to now, the procedure for selecting a PG textST stream has been described.

Figure 50:
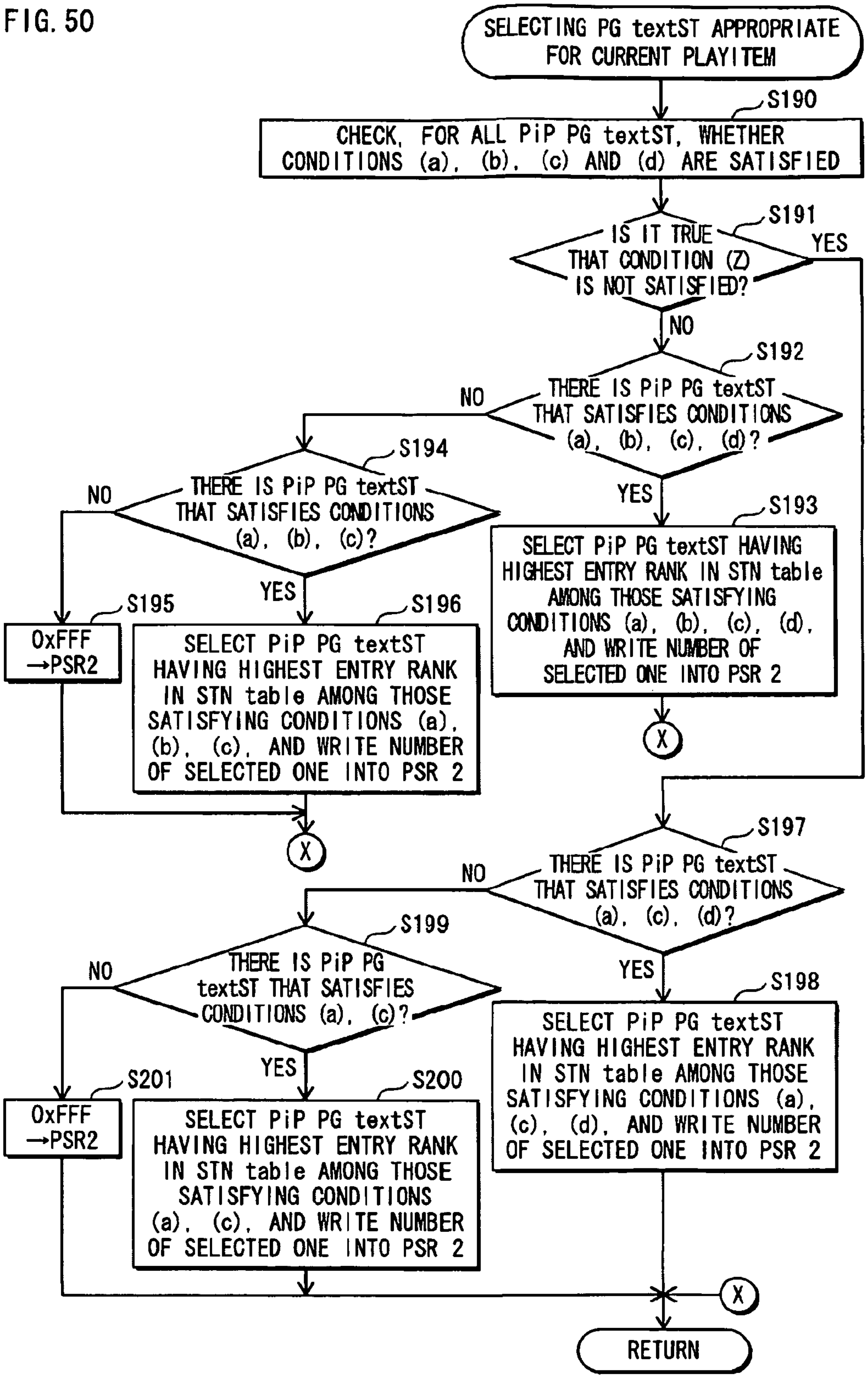
FIG. 50 is a flowchart showing the procedure for selecting a current PG textST subtitle stream that is optimum for the current playitem.

FIG. 50 is a flowchart showing the procedure for selecting a current PG textST subtitle stream that is optimum for the current playitem.

In step S190, it is checked for all PG textST subtitle streams whether the following conditions (a), (b), (c) and (d) are satisfied.

The conditions (a), (b), (c) and (d) are defined as follows when the check-target presentation graphics stream is a presentation graphics stream i.

Condition (a): the playback device has the capability of decoding the presentation graphics stream i;

Condition (b): the playback device has the capability of playing back a language that is specified by the presentation graphics stream i;

Condition (c): a comparison between a secondary video stream number in PSR14 and a PG text subtitle stream number by Comb_info_Secondary_video_PiP_textST( ) indicates that a combination of the current secondary video stream and the presentation graphics stream i is permitted.

Condition (d): PG_language_code of the presentation graphics stream i matches the deck information, where the deck information is information indicating the language setting in the playback device, more specifically, the setting in PSR17 in the PSR set 23.

The conditions (a), (b), (c) and (d) are defined as follows when the check-target text subtitle stream is a text subtitle stream i.

Condition (a): the playback device has the capability of expanding the character code of the text subtitle stream i into bit map;

Condition (b): the playback device has the capability of supporting the language attribute of the text subtitle stream i;

Condition (c): a comparison between a secondary video stream number in PSR14 and a PG text subtitle stream number by Comb_info_Secondary_video_PiP_textST( ) indicates that a combination of the current secondary video stream and the text subtitle stream i specified by the PiP_PG_textST stream number is permitted.

Condition (d): textST_language_code of the text subtitle stream i matches the language setting in the deck information in the playback device.

After the checking, in step S191, it is judged whether or not the playback device satisfies the condition (Z) described in the previous flowchart (playback of unsupported language).

When the playback device does not satisfy the condition (Z), the control goes to step S192 in which it is judged whether or not there is a PG textST stream that satisfies the conditions (a), (b), (c) and (d). When there are PG textST streams that satisfy the conditions (a), (b), (c) and (d), a PG textST stream whose corresponding stream_entry is placed first in the STN_table is selected among the PG textST streams that satisfy conditions (a) through (d), and the PG textST stream number of the selected PG textST stream is set in PSR2 (step S193).

When there is no PG textST stream that satisfies the conditions (a), (b), (c) and (d), the control goes to step S194 in which it is judged whether or not there is a PG textST stream that satisfies less conditions. Here the less conditions are the conditions (a), (b) and (c). Namely, in step S194, it is judged whether or not there is a PG textST stream that satisfies the conditions (a), (b) and (c).

When there are PG textST streams that satisfy the conditions (a), (b) and (c), a PG textST stream whose corresponding Stream_entry is placed first in the STN_table is selected among the PG textST streams that satisfy conditions (a) through (c), and the PG textST stream number of the selected PG textST stream is set in PSR2 (step S196).

When there is no PG textST stream that satisfies the conditions (a), (b) and (c), a value 0xFFF as a PiP_PG_textST stream number is set in the PSR2 (step S195). When it is judged in step S191 that the playback device satisfies the condition (Z), the control goes to step S197 in which it is judged whether or not there is a PG textST stream that satisfies another less conditions. Here the "another less conditions" are the conditions (a), (c) and (d). Namely, in step S197, it is judged whether or not there is a PG textST stream that satisfies the conditions (a), (c) and (d).

When there are PG textST streams that satisfy the conditions (a), (c) and (d), a PG textST stream whose corresponding Stream_entry is placed first in the STN_table is selected among the PG textST streams that satisfy conditions (a), (c) and (d), and the PG textST stream number of the selected PG textST stream is set in PSR2 (step S198).

When there is no PG textST stream that satisfies the conditions (a), (c) and (d), the control goes to step S199 in which it is judged whether or not there is a PG textST stream that satisfies the conditions (a) and (c).

When there are PG textST streams that satisfy the conditions (a) and (c), a PG textST stream whose corresponding Stream_entry is placed first in the STN_table is selected among the PG textST streams that satisfy conditions (a) and (c), and the PG textST stream number of the selected PG textST stream is set in PSR2 (step S200). When there is no PG textST stream that satisfies the conditions (a) and (c), a value 0xFFF is set in PSR2 (step S201).

According to the above-described structure, the playback section for the current PiP_PG_textST stream number is defined by the sub-playitem without fail. Therefore, a sub-playitem that defines the playback section for the current PiP_PG_textST stream number is identified as the current sub-playitem.

Up to now, the procedure for selecting a current PG textST subtitle stream has been described.

As described above, according to the present embodiment, when the Picture in Picture is valid, a PiP_PG_textST stream number is selected from a numerical range of the sum of the number_of_PG_textST_streams_entries and the number_of_ PiP_PG_textST_stream_entries_plus, and either of a presentation graphics stream and a text subtitle stream that correspond to the selected PiP_PG_textST stream number is played back. With this structure, it is possible to select between a subtitle that is suitable for the primary video stream and a subtitle that is suitable for the secondary video stream, as a subtitle that is to be played back together with a video image. This broadens the range of options to select subtitles.

When an AV clip, which includes a text subtitle stream of a subtitle that was selected as described above, is referred to by a sub-playitem, the playback is interrupted if the AV clip is an Unavailable clip. Therefore, by downloading in time an AV clip which includes the current text subtitle stream and is referred to by the sub-playitem information, it is possible to prevent the playback from being interrupted and ensure a smooth progress of playback.

Embodiment 6

The present embodiment describes building of the virtual package in detail.

First, the data structure of the BD-ROM, which is the basic part of the virtual package, will be described.

Figure 51:
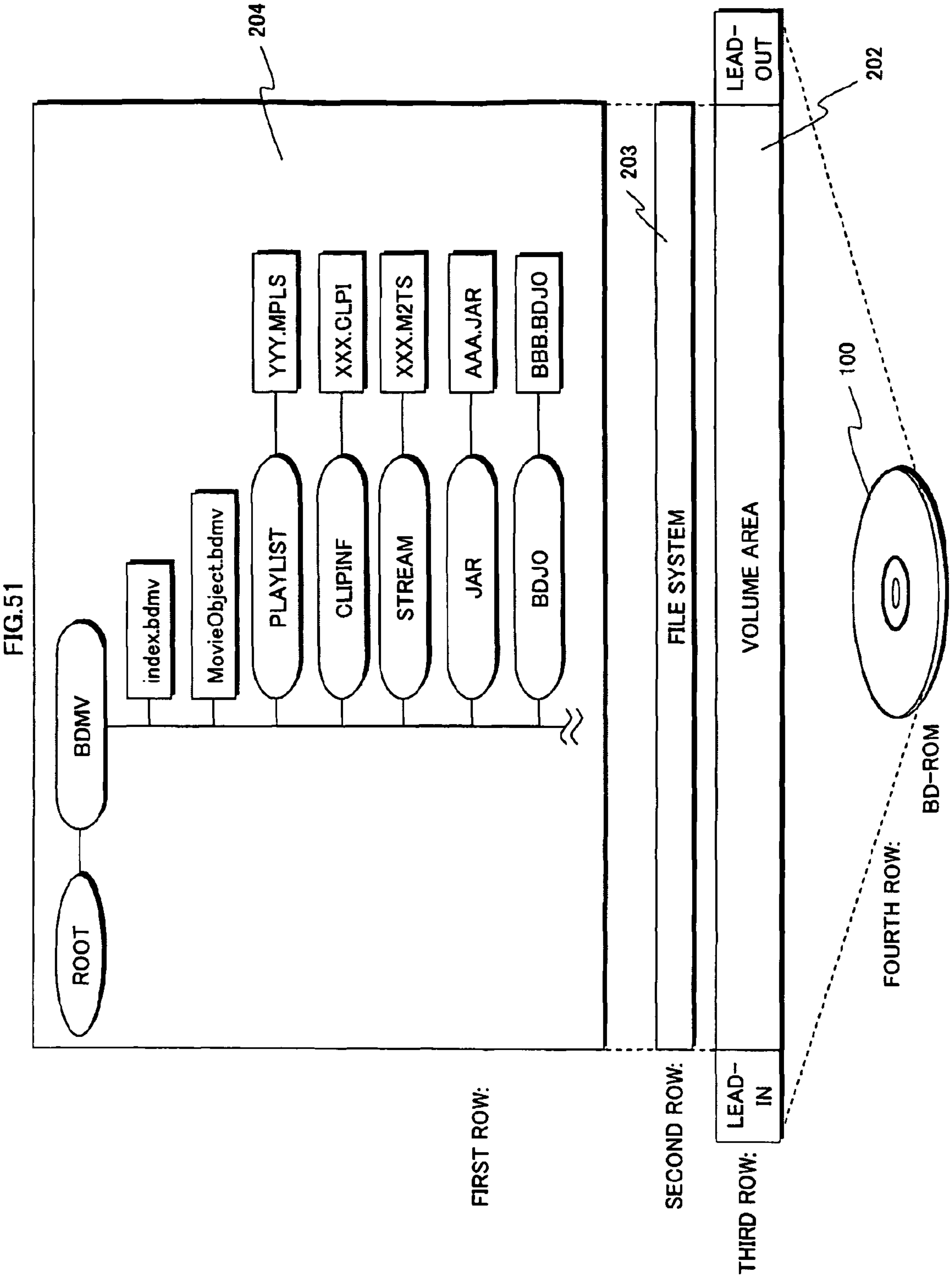
FIG. 51 shows an example of the structure of the BD-ROM.

FIG. 51 shows an example of the structure of the BD-ROM.

The fourth row of FIG. 51 shows a BD-ROM 100. The third row shows a track 202 on the BD-ROM 100. FIG. 51 shows the track 202 in the state where it is horizontally extended though it is in reality formed spirally from the inner circumference to the outer circumference of the BD-ROM 100. The BD-ROM 100, as other types of optical discs such as DVD and CD, has a recording area that is formed spirally from the inner circumference to the outer circumference of the BD-ROM. The BD-ROM 100 has a "logical address space" in which logical data can be recorded, the logical address space being formed between the lead-in on the inner circumference side and the lead-out on the outer circumference side. Also, there is a special area inside the lead-in. The special area is called BCA (Burst Cutting Area), and can only be read by the drive, but not by applications. Due to this structure, the BCA is often used for copyright protection technologies, for example.

The "logical address space" stores volume information for the file system at the head thereof, followed by application data such as image data. The file system is a system for representing the data on the disc in units of directories and files. In the BD-ROM 100, data is recorded by UDF (Universal Disc Format). In the case of general-purpose personal computers, a file system such as FAT or NTFS is used such that the data recorded on the hard disk in directories and files are represented in the computers, increasing the usability. Such a file system enables the logical data, which is recorded in the same manner as in general personal computers, to be read out by using the directory-file structure.

According to the directory-file structure of the BD-ROM 100, a BDMV directory is placed immediately under the root directory. The BDMV directory is a directory in which data that can be stored in the BD-ROM, such as AV contents and management information, are recorded. Under the BDMV directory, there are: an index file (index.bdmv) which defines an index table constituting a title; a movie object file (MovieObject.bdmv) which defines a dynamic scenario; a PLAYLIST directory; a CLIPINF directory; a STREAM directory; a BDJA directory; and a JAR directory.

These directories includes: an AV clip (XXX.m2ts) storing multiplexed AV contents of video, audio or the like; clip information file (XXX.clpi) storing management information of the AV clip; and playlist file (YYY.mpls) defining a logical playback path of the AV clip.

Other than these files, there are: a BDJ object file (BBB.bdjo) specifying a JAR file to be executed, and defining its execution method; and a JAR file (AAA.jar) storing a BD-J application. These files are respectively placed under the STREAM, CLIPINF, PLAYLIST, BDJO, and JAR directories.

The following describes the data structure of each file that is placed under the BDMV directory. First, the index file (Index.bdmv) will be described. The index file includes an index table.

Figure 52:
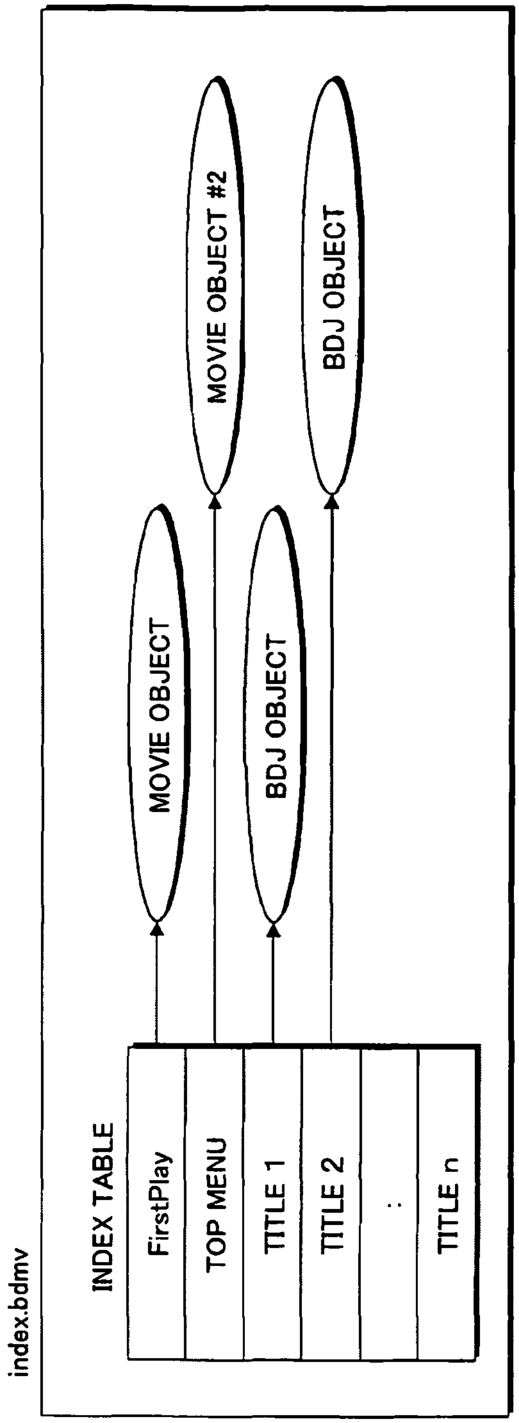
FIG. 52 shows an example of the internal structure of the index file.

FIG. 52 shows an example of the internal structure of the index file.

The index table is a table placed in the highest layer and defines a title structure including all the titles stored in the BD-ROM, a top menu, and FirstPlay. The index table specifies all the titles, top menu, and a movie object included in a movie object file to be first executed by the FirstPlay. The player of the BD-ROM refers to the index table each time a title or a menu is called, and executes a predetermined movie object or a BDJ object. Here, the FirstPlay is set by the content provider, and in which a movie object or a BDJ object that is to be automatically executed upon an insertion of the disc is set. The top menu specifies a movie object or a BDJ object that is called when a command such as "Return to menu" is executed by a user operation on the remote control. A playlist that is to be played back the in the progressive attribute should be played back by the BD-J object without fail.

Up to now, the data structure of the BD-ROM as a basis of the virtual package has been described.

Next, the data structure of the update kit stored in the local storage 103 will be described with reference to FIG. 53.

Figure 53:
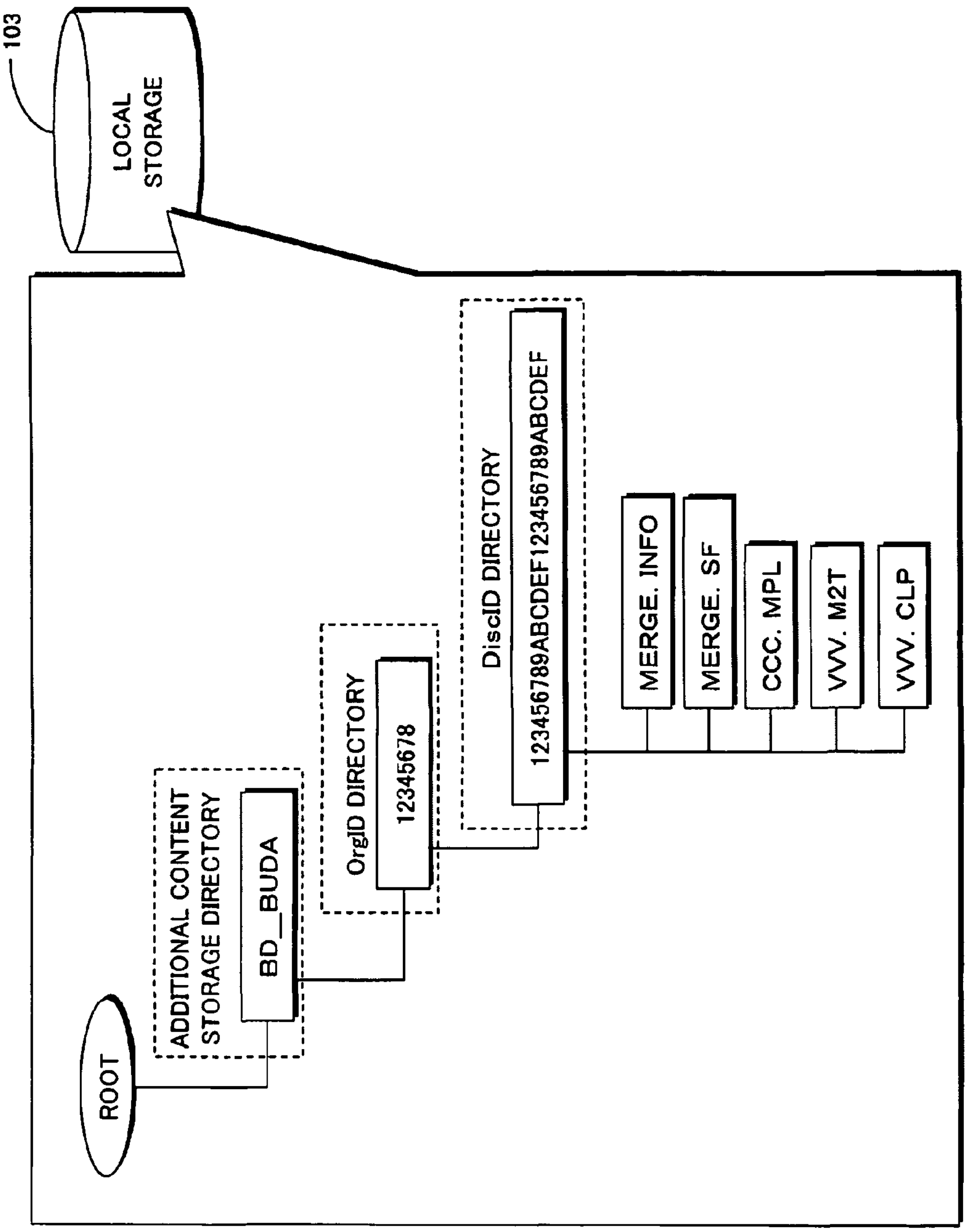
FIG. 53 shows an example of the internal structure of the update kit stored in the local storage 103.

FIG. 53 shows an example of the internal structure of the update kit stored in the local storage 103.

As shown in FIG. 53, the update kit stored in the local storage 103 includes an additional content storage directory, an OrgID directory, a DiscID directory, a merge management information file (MERGE.xml), a signature information file (MERGE.sf), and additional content data files (CCC.mpl, VVV.m2t, and VVV.clp). The additional content storage directory is a directory that exists immediately under the root directory of the local storage 103, and indicates a route of the additional content storage area. The additional content storage directory has a fixed value (BD_BUDA) that is equal to or smaller than the directory name distribution medium characters.

The OrgID directory is a directory whose name is composed of eight characters, and which represents, by hexadecimal notation, a 32-bit identifier (OrganizationID) for identifying the provider of the movie, recited in the BD management information (index file) of the BD-ROM recording layer. The successive "0"s at the head of the OrganizationID are omitted from the directory name. For example, when the OrganizationID is 0x0000001A, the directory name is "1A".

The DiscID directory is a directory which represents, by hexadecimal notation, four 32-bit parts that are obtained by separating the 128-bit identifier (DiscID) for identifying the BD-ROM recording layer, recited in the BD management information (index file) of the BD-ROM recording layer. As is the case with the OrganizationID, the successive "0"s at the head of the DiscID are omitted from the directory name.

The merge management information file, signature information file, and additional content data files exist under the DiscID directory.

The merge management information file (MERGE.xml) is composed of file storage position information and virtual path information, where the file storage position information indicates positions of files recorded in a local storage constituting the virtual package, and the virtual path information is used for accessing the files on the virtual package. The merge management information file (MERGE.xml) is stored directly under the DiscID directory.

The signature information file is a file indicating an electronic signature applied by the provider to the merge management information file, and is stored in the DiscID directory with a file name "MERGE.sf". In general, an encrypted hash value is used as the electronic signature, where the encrypted hash value is generated by calculating a hash value for the information that needs to be protected from tampering, and encrypting the hash value using a predetermined private key. In the signature information file of the present embodiment the hash value for the merge management information file is encrypted using a private key corresponding to a public key contained in the merge certificate recorded in the BD-ROM recording layer.

The merge certificate is a certificate that is used for authenticating the merge management information file, and includes a public key publicized by the provider. The merge certificate provided from the provider is stored in BD-ROM recording layer, with a file name "bd.cert". The file format of the merge certificate may be, for example, X.509.

The additional content data files are a group of files that are to be added/updated with respect to the original content recorded in the BD-ROM recording layer. Playlist files, AV clips and the like are recorded here.

Figure 54:
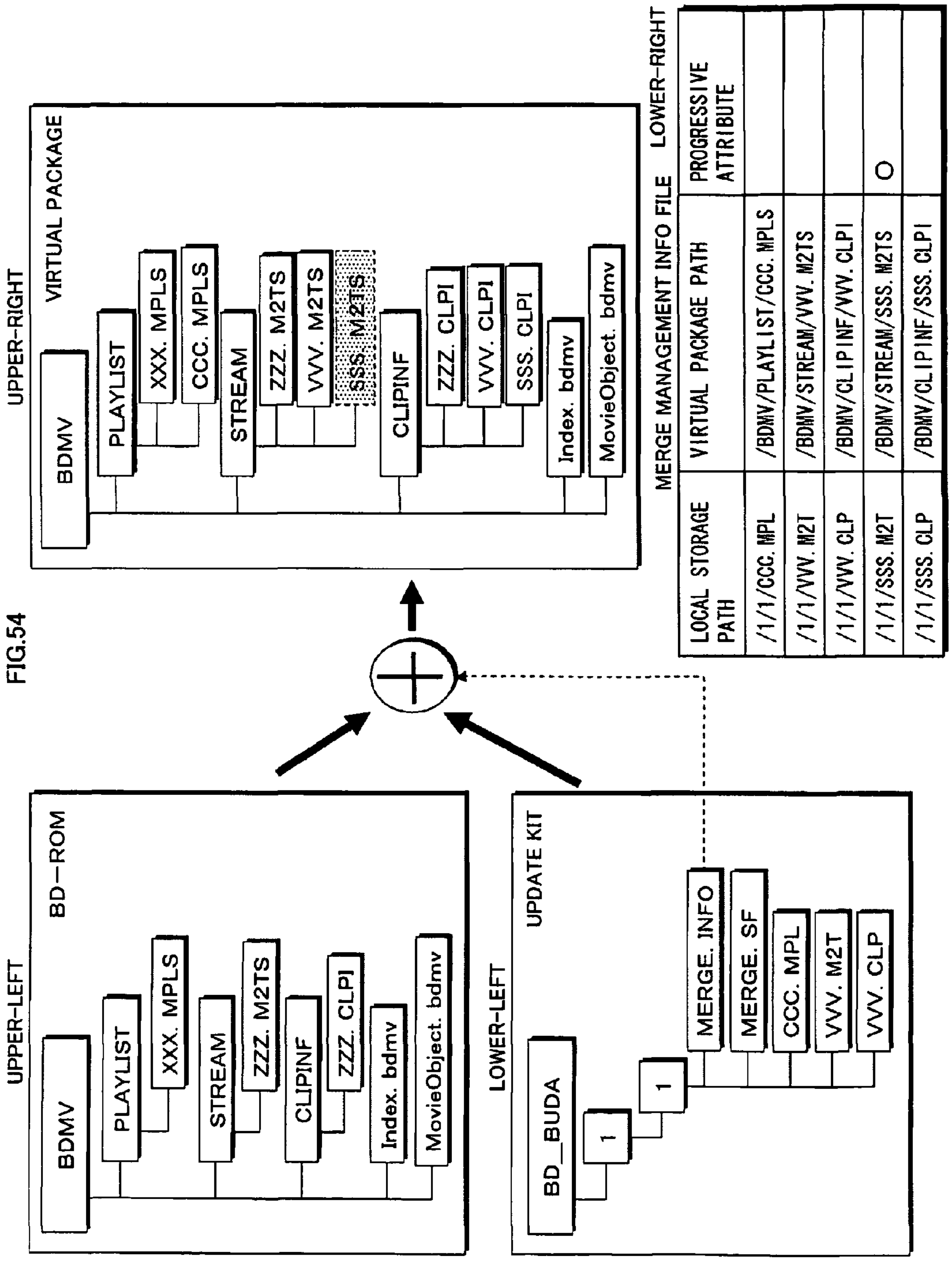
FIG. 54 shows an example of the contents of the merge management information file and the process for building the virtual package, based on the contents of the merge management information file, from the BD-ROM file and the update kit file.

FIG. 54 shows an example of the contents of the merge management information file and the process for building the virtual package, based on the contents of the merge management information file, from the BD-ROM file and the update kit file.

The upper left part of FIG. 54 shows the directory-file structure of the BD-ROM. The lower left part of FIG. 54 shows the directory-file structure of the update kit.

The lower right part of FIG. 54 shows the contents of the merge management information file. As shown in the drawing, the manifest file is composed of: "local storage path" of the local storage constituting the virtual package; "virtual package path" for accessing these files on the virtual package; and "progressive attribute". The progressive attribute indicates that the file is not necessary before the virtual package is built.

As one example of the local storage path, FIG. 54 shows "1/1/CCC.mpl", "1/1/VVV.m2t", "1/1/VVV.clp", "1/1/SSS.m2t", and "1/1/SSS.clp". It clearly shows the path from the BD_BUMF directory to the additional content data file.

Also, as one example of the virtual package path, FIG. 54 shows "BDMV/PLAYLIST/CCC.mpls", "BDMV/STREAM/VVV.m2ts", "BDMV/CLIPINF/VVV.clpi", "BDMV/STREAM/SSS.m2ts", and "BDMV/CLIPINF/SSS.clpi".

The upper right of FIG. 54 shows the virtual package generated by this manifest file. The directory-file structure is changed virtually such that the files located at "1/1/CCC.mpl", "1/1/VVV.m2t", "1/1/VVV.clp", "1/1/SSS.m2t", and "1/1/SSS.clp" according to the local storage path are arranged at "BDMV/PLAYLIST/CCC.mpls", "BDMV/STREAM/VVV.m2ts", "BDMV/CLIPINF/VVV.clpi", "BDMV/STREAM/SSS.m2ts", and "BDMV/CLIPINF/SSS.clpi". With this arrangement, VVV.clpi, VVV.m2ts, SSS.clpi, and SSS.m2ts that do not exist in the BD-ROM are treated as if they exist.

After the virtual package is generated based on the merge management information, these files on the local storage can be accessed by the path information in the merge management information. Here, the SSS.m2ts, to which the progressive attribute is assigned, does not need to be downloaded into the local storage before the virtual package is built. It may be downloaded when the necessity arises after the virtual package is built.

As understood from the above description, the data is written into the local storage in the following order when the update kit is downloaded:

merge management information file→playlist information→a plurality of pieces of clip information→a plurality of AV clips. Here, when the "playlist information→a plurality of pieces of clip information" is completed, the virtual package can be built. This is because it becomes possible by treating the AV clips as the Disable state.

As described above, the present embodiment (Embodiment 6) enables the sub-playitem to be supplied to the system target decoder via the virtual file system.

Figure 55:
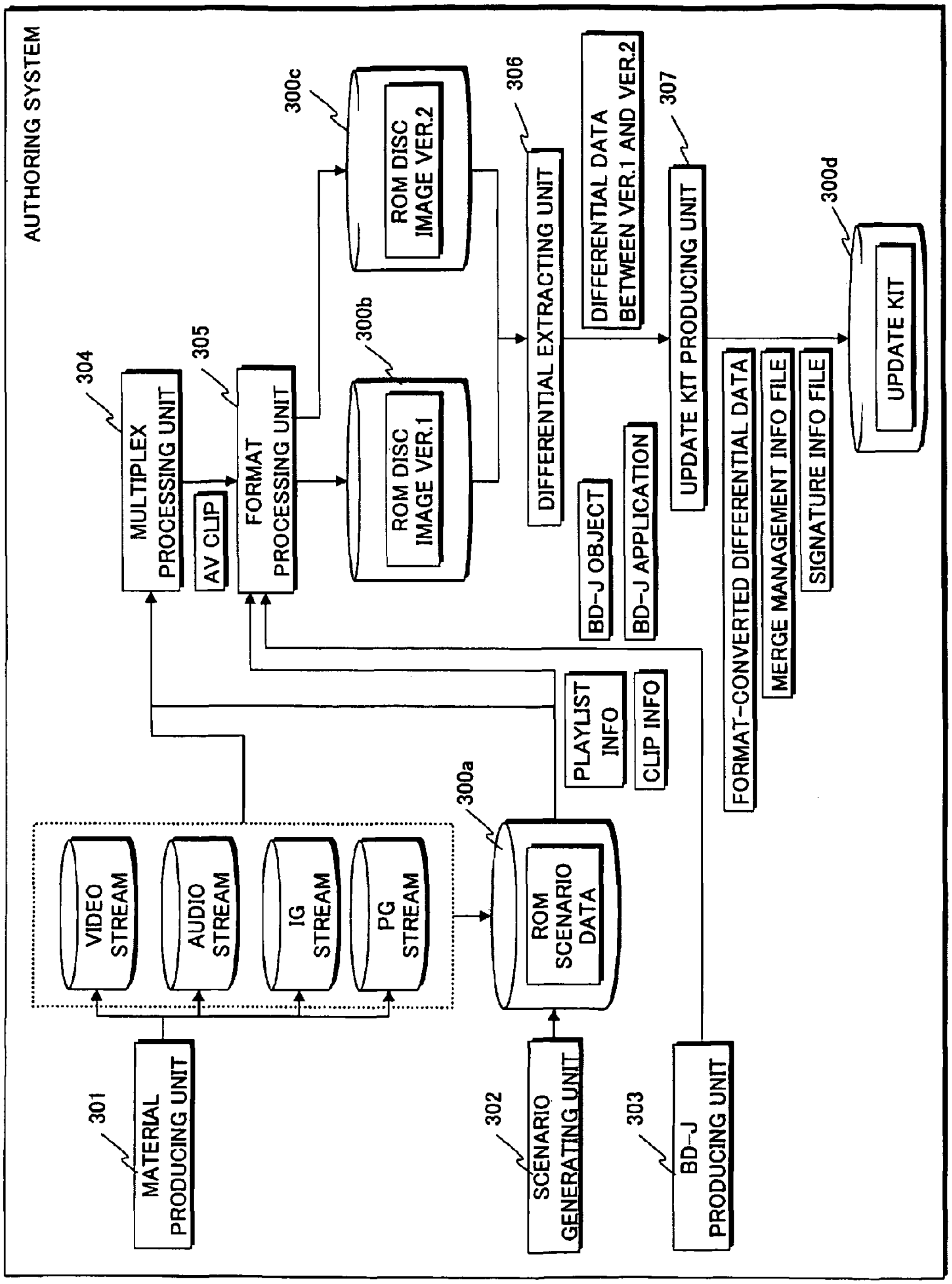
FIG. 55 shows one example of the authoring system.

Now, an authoring system in the present embodiment for creating an update kit for achieving the PG stream playlist will be described. As shown in FIG. 55, the authoring system includes storages 300*a* and 300*b*, a material producing unit 301, a scenario generating unit 302, a BD-J producing unit 303, a multiplex processing unit 304, and a format processing unit 305.

FIG. 55 shows one example of the authoring system.

The storages 300*a*, 300*b*, and 300*c* respectively store the ROM scenario data, ROM disc image version 1, and ROM disc image version 2.

The material producing unit 301 creates streams such as a video stream, an audio stream, a presentation graphics stream, and an interactive graphics stream. The material producing unit 301 creates the video stream by encoding image data, such as an uncompressed bitmap, in accordance with a compression scheme such as MPEG4-AVC or MPEG-2. Furthermore, the material producing unit 301 creates an audio stream by encoding uncompressed Linear PCM audio or the like in accordance with a compression scheme such as AC3. The material producing unit 301 creates a presentation graphics stream being a subtitle stream, based on subtitle images and display timing, and subtitle information file that includes subtitle effects such as fade in/fade out. The material producing unit 301 creates an interactive graphics stream constituting a menu screen, based on bit map images to be used in the menu and a menu file listing transition, display effects and the like of buttons in the menu.

The scenario generating unit 302 creates a scenario in accordance with information about each stream created by the material creation unit 301 and operations by the authoring staff via a GUI. Here, files such as an index file, a movie object file, and a playlist file are scenarios. The scenario generating unit 302 also creates a parameter file showing which streams each AV clip is composed of, in order to realize multiplex processing.

The BD-J producing unit 303 is a means for programming a BD-J application. The BD-J producing unit 303 creates the BD-J application by creating source code of a BD-J application program in accordance with a request from a user through a user interface such as a GUI.

The multiplex processing unit 304 multiplexes a plurality of streams such as video, audio, subtitles and buttons defined in the BD-ROM scenario data, to create an AV clip in an MPEG2-TS format. When creating the AV clip, the multiplex processing unit 304 also creates a clip information file that is a pair with the AV clip. The multiplex processing unit 304 generates the clip information file in the following way. The multiplex processing unit 304 creates an entry map when creating the AV clip. More specifically, the multiplex processing unit 304 detects where each I picture (in the case of MPEG2), each I picture or IDR picture (in the case of MPEG4-AVC) or each I picture (in the case of VC-1) exists in each stream generated by the material producing unit 301. The multiplex processing unit 304 then registers entry points in an entry map. Each entry point shows, with respect to a corresponding one of the detected pictures, a display time of the picture and which number packet in the AV clip in the MPEG2-TS format has the source packet containing the top data of the picture. When there are two types of video stream included in the AV clip (i.e., main video and secondary video), entry maps are made for each of the two types. The multiplex processing unit 304 creates a clip information file using the set of the generated entry map (or maps) and attribute information showing audio attribute, video attributes and the like of each stream included in the AV clip.

The format processing unit 305 creates a disc image in a UDF format that is a file system complying with the BD-ROM standard. In the file system, the BD-ROM original data generated by the scenario generation unit 302, the BD-J application created by the BD-J producing unit 303, an AV clip and clip information generated by the multiplex processing unit 304, and files and directories are arranged. The generated disc image is converted to BD-ROM press data. By performing a press process with respect to this data, the BD-ROM can be manufactured.

Two disc images are prepared in order to create an update kit. One is a disk image stored on the BD-ROM, and the other is a disc image after the construction of the virtual package.

The differential extracting unit 306 compares the two ROM disc images, and extracts differential data. For example, the differential extracting unit 306 extracts a file that was not in the original disc image, or performs a binary comparison to extract an updated file.

Based on the differential extracting unit 306, the update kit producing unit 307 creates a merge management information file and a signature information file that conform with the data format of the update kit, and arranges the file and directories.

Figure 56B:
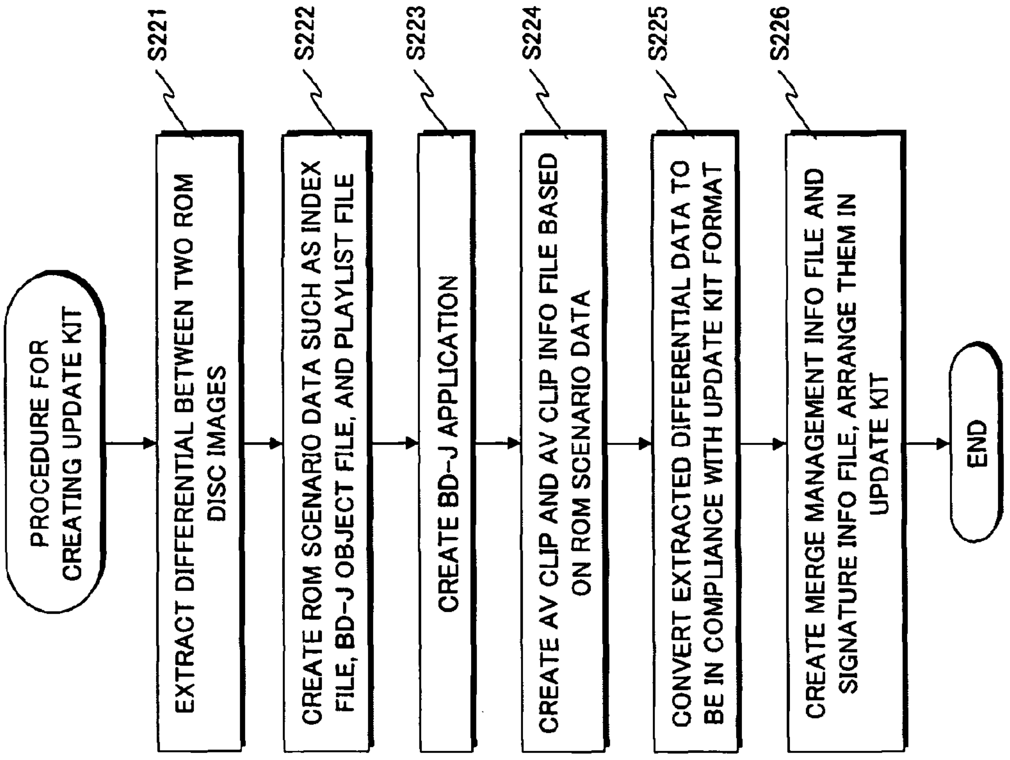
FIGS. 56A and 56B illustrate the method used to create the ROM disc image and the update kit image.
Figure 56A:
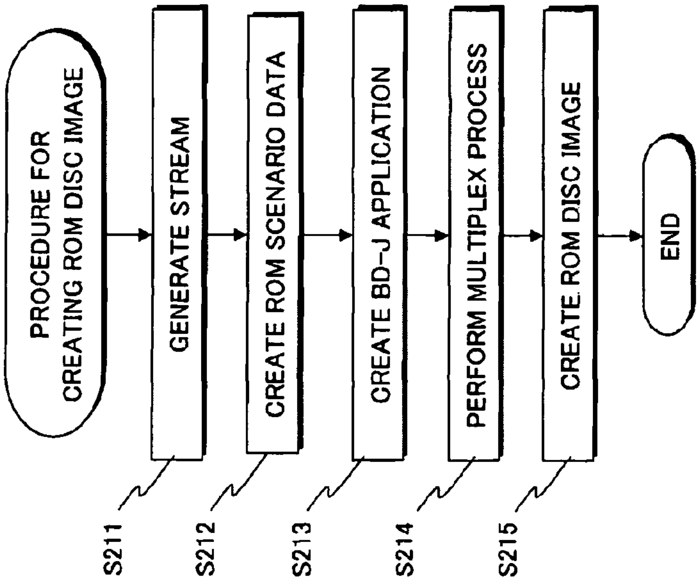

Referring now to FIGS. 56A and 56B, a description is given of the method used to create the ROM disc image and the update kit image.

At step S211, the material producing unit 301 generates a video stream, an audio stream, an IG stream, and a PG stream.

At step S212, the scenario generating unit 302 creates ROM scenario data defining playback scenarios such as an index file, a movie object file, and a playlist file.

At step S213, the BD-J producing unit 303 creates a program of a BD-J application.

At step S214, the multiplex processing unit 304 creates an AV clip and a clip information file based on the ROM scenario data.

At step S215, the update kit producing unit 307 generates a ROM disc image by rearranging the ROM scenario data, modified AV clip, clip information file, and restoration byte code data, into the file-directory structure having been described in the embodiments.

At step S221, the differential extracting unit 306 compares the two disc images and extracts differential data.

At step S222, the update kit producing unit 307 creates the ROM scenario data defining an index file, a movie object file, a playlist file, and so on.

At step S223, the BD-J producing unit 303 creates a BD-J application program.

At step S224, the multiplex processing unit 304 creates an AV clip and a clip information file based on the ROM scenario data.

At step S225, the update kit producing unit 307 converts the differential data to be in compliance with the update kit format. At step S226, the merge management information and signature information file are created, and arranged in the update kit.

<Supplementary Notes>

Up to now, the present invention has been described through the best modes or embodiments for carrying the invention that the Applicant recognize as of now. However, further improvements or changes can be added regarding the following technical topics. Whether to select any of the embodiments or the improvements and changes to implement the invention is optional and may be determined by the subjectivity of the implementer.

<Programming Language Application Range>

It is described in the embodiments that Java™ is used as the programming language for the virtual machine. However, not limited to Java™, other programming languages, such as B-Shell, Perl Script, and ECMA Script, which are used in UNIX™ OS or the like, are available.

<Real-Time Recording>

The playback device 101 may record clip files into the local storage by the real-time recording. In this case, the AV streams may be transport streams that have been obtained as the recording device has self-encoded analog input signals, or may be transport streams that have been obtained as the recording device has partialized digitally input transport streams.

In the real-time recording, the recording device performs the process of generating the Clip information and PlayList information on the memory, as well as performing the process of recording an AV stream. More specifically, the recording device generates the Clip information and PlayList information, that are described in the embodiments, on the memory. After recording the AV stream, the recording device writes the generated Clip information and PlayList information onto the recording medium. With this structure, it is possible to generate the Clip information and PlayList information that are described in the embodiments, by using a home recording device or a personal computer that is provided with the functions of the recording device. Further, the AV stream, Clip information and PlayList information generated in this way may be written onto a write-once type recording medium.

<Target of AV Playback>

The target of AV playback is not limited to the one defined for the BD-ROM, but may be any content that is composed of a digital stream, map information, and PlayList information. The digital stream is a multiplexed stream obtained by multiplexing the encoded video stream and encoded audio stream that have been encoded by the encoding method such as MPEG2 or MPEG4-AVC. The digital stream is called "VOB" in the DVD Video-Recording standard.

The map information is information that indicates relationships between the address information of the access unit (referring to a playback unit that can be decoded independently) in the above-described video stream, and the playback time on the playback time axis of the video stream. The map information is called "Time Map" in the DVD Video-Recording standard.

The PlayList information is information that defines one or more playback sections by a pair of time information as a start point and time information as an end point.

<Realization of Control Procedure>

Both the control procedures explained in the above-described embodiments using the flowcharts and the control procedures of the functional components explained in the above-described embodiments satisfy the requirements for the "program invention" since the above-mentioned control procedures are realized concretely using the hardware resources and are the creation of a technical idea utilizing natural laws. ■ Production of application program for downloading clip file or outputting DataStarved event An application program for downloading a clip file or outputting the DataStarved event can be produced as follows. First, the software developer writes, using a programming language, a source program that achieves each flowchart and functional component. In this writing, the software developer uses the class structure, variables, array variables, calls to external functions, and so on, which conform to the syntax of the programming language he/she uses. In doing this, various API calls for programming in the Java language are used.

The written source program is sent to the compiler as files. The compiler translates the source program and generates an object program.

The translation performed by the compiler includes processes such as the syntax analysis, optimization, resource allocation, and code generation. In the syntax analysis, the characters and phrases, syntax, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

The generated object program is composed of one or more program codes that cause the computer to execute each step in the flowchart or each procedure of the functional components. There are various types of program codes such as the native code of the processor, and JAVA™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The application program for downloading a clip file or outputting the DataStarved event can be produced in this way. The program produced in this way may be recorded onto a computer-readable recording medium, and the program may be supplied to a user in the state where it is recorded on the computer-readable recording medium.

<System LSI>

It is desirable that parts of the hardware of the playback device 101 that are mainly composed of logical elements, excluding mechanical structural elements (the BD drive) and the structural elements (video plane, graphics plane) that are implemented on a high-capacity memory, are realized as one system LSI. This is because the parts mainly composed of logical elements can be integrated with high density.

The system LSI is obtained by implementing a bear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback device 101.

Such a system LSI can be embedded into various types of devices that can play back images, such as a television, game machine, personal computer, one-segment mobile phone, as well as into the playback device 101. The system LSI thus greatly broadens the use of the present invention.

When an elementary buffer, video decoder, audio decoder, and graphics decoder are integrated into a system LSI, it is desirable that the system LSI conforms to the Uniphier architecture.

A system LSI conforming to the Uniphier architecture includes the following circuit blocks.

Data Parallel Processor (DPP)

The DPP is an SIMD-type processor where a plurality of elemental processors perform a same operation. The DPP achieves a parallel decoding of a plurality of pixels constituting a picture by causing operating units, respectively embedded in the elemental processors, to operate simultaneously by one instruction.

Instruction Parallel Processor (IPP)

The IPP includes: a local memory controller that is composed of instruction RAM, instruction cache, data RAM, and data cache; processing unit that is composed of instruction fetch unit, decoder, execution unit, and register file; and virtual multi processing unit that causes the processing unit to execute a parallel execution of a plurality of applications.

MPU Block

The MPU block is composed of: peripheral circuits such as ARM core, external bus interface (Bus Control Unit: BCU), DMA controller, timer, vector interrupt controller; and peripheral interfaces such as UART, GPIO (General Purpose Input Output), and sync serial interface.

Stream I/O Block

The stream I/O block performs data input/output with the drive device, hard disk drive device, and SD memory card drive device which are connected onto the external busses via the USB interface and the ATA packet interface.

AV I/O Block

The AV I/O block, which is composed of audio input/output, video input/output, and OSD controller, performs data input/output with the television and the AV amplifier.

Memory Control Block

The memory control block performs reading and writing from/to the SD-RAM connected therewith via the external buses. The memory control block is composed of internal bus connection unit for controlling internal connection between blocks, access control unit for transferring data with the SD-RAM connected to outside of the system LSI, and access schedule unit for adjusting requests from the blocks to access the SD-RAM.

The following describes a detailed production procedure. First, a circuit diagram of a part to be the system LSI is drawn, based on the drawings that show structures of the embodiments. And then the constituent elements of the target structure are realized using circuit elements, ICs, or LSIs.

As the constituent elements are realized, buses connecting between the circuit elements, ICs, or LSIs, peripheral circuits, interfaces with external entities and the like are defined. Further, the connection lines, power lines, ground lines, clock signals and the like are defined. For these definitions, the operation timings of the constituent elements are adjusted by taking into consideration the LSI specifications, and bandwidths necessary for the constituent elements are secured. With other necessary adjustments, the circuit diagram is completed.

After the circuit diagram is completed, the implementation design is performed. The implementation design is a work for creating a board layout by determining how to arrange the parts (circuit elements, ICs, LSIs) of the circuit and the connection lines onto the board.

After the implementation design is performed and the board layout is created, the results of the implementation design are converted into CAM data, and the CAM data is output to equipment such as an NC (Numerical Control) machine tool. The NC machine tool performs the SoC implementation or the SiP implementation. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the playback device 101 described in each embodiment above.

It should be noted here that the integrated circuit generated as described above may be called IC, LSI; ultra LSI, super LSI or the like, depending on the level of the integration.

It is also possible to achieve the system LSI by using the FPGA (Field Programmable Gate Array). In this case, a lot of logic elements are to be arranged lattice-like, and vertical and horizontal wires are connected based on the input/output combinations described in LUT (Look-Up Table), so that the hardware structure described in each embodiment can be realized. The LUT is stored in the SRAM. Since the contents of the SRAM are erased when the power is off, when the FPGA is used, it is necessary to define the Config information so as to write, onto the SRAM, the LUT for realizing the hardware structure described in each embodiment.

INDUSTRIAL APPLICABILITY

The playback device of the present invention enables a streaming-like playback function to be performed efficiently, and reduces the time taken by the user to download. The present invention enables more attractive video contents such as movie titles to be supplied into the markets, and thus would activate the movie market and commercial device market. The playback device of the present invention, therefore, has high usability in the movie market and commercial device market.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A playback device for playing back a playlist via a virtual package constructed using a read-only optical disc and an accessible recording medium, wherein the playlist includes a plurality of playitems and a plurality of sub-playitems, wherein each playitem of the plurality of playitems is information defining a playback section in a clip file that includes a main stream, wherein each sub-playitem of the plurality of sub-playitems is information defining a playback section in a clip file that includes a sub-stream, wherein each of the clip files defined and referred to by the plurality of sub-playitems is transferred, wherein the playback device comprises:

a playback unit operable to play back the plurality of playitems;

a specifying unit operable to specify a current playitem of the plurality of playitems;

a determining unit operable to determine a current sub-playitem, of the plurality of sub-playitems, each time the current playitem is specified by the specifying unit; and a sub-stream register operable to indicate a current sub-stream included in the clip file including the playback section defined by the current sub-playitem, such that the current sub-stream is to be played back in synchronization with the current playitem, the current sub-playitem defining the playback section that includes the current sub-stream indicated by the sub-stream register, wherein merge management information, which defines a construction of the virtual package, indicates whether or not each respective clip file of the clip files has a progressive attribute indicating that the respective clip file does not need to exist in the accessible recording medium when the current sub-playitem referring to the respective clip file exists in the accessible recording medium, wherein the playback unit stops the playback of the current playitem of the plurality of playitems when the clip file, which is referred to by the current sub-playitem and has the progressive attribute, is in a missing state or an unrecognizable state in the accessible recording medium, wherein the playback unit continues the playback of the current playitem of the plurality of playitems when the clip file, which is referred to by the current sub-playitem and has the progressive attribute, exists in the accessible recording medium even if a next clip file of the plurali-tyof dip files, which is referred to by a next sub-playitem of the plurality of sub-playitems and has the progressive attribute, is in the missing state or the unrecognizable state in the accessible recording medium, and wherein the accessible recording medium includes a plurality of layered directories one of which is a disc ID directory corresponding to a disc ID recorded on the read-only optical disc, and the clip file referred to by the current sub-playitem is stored in a sub-directory under the disc ID directory.

2. The playback device of claim 1, wherein the sub-stream is any of the following types including an audio stream, a video stream, and a subtitle stream, wherein the sub-stream register includes number registers storing stream numbers corresponding one-to-one to the types including the audio stream, the video stream and the subtitle stream, so as to indicate the current sub-stream for each type of sub-stream, and wherein the current sub-playitem is a sub-playitem, of the plurality of sub-playitems, referring to a clip file that includes the current sub-stream indicated by a number register of the number registers storing the stream numbers.

3. The playback device of claim 1 further comprising a management unit operable to manage a state of a clip file stored in the accessible recording medium, wherein the clip file, for which the state is managed by the management unit, is transmitted to the playback device after an application sends a download request to a server device, wherein the playback unit starts the playback after the application generates a player instance for playlist information, and wherein the stop of the playback by the playback unit is performed when the management unit outputs an event instructing the stop of the playback, to the playback unit and to the player instance when the clip file, which is referred to by the current sub-playitem and has the progressive attribute, is in the missing state or the unrecognizable state in the accessible recording medium.

4. The playback device of claim 1, wherein the clip files referred to by the plurality of sub-playitems include video streams, wherein the sub-stream is a secondary video stream which, when played back in synchronization with the video streams, provides a stereoscopic view to a user, wherein the playlist includes stereoscopic view setting information which indicates whether the stereoscopic view is set to on or off, wherein, when the stereoscopic view setting information indicates that the stereoscopic view is set to on, the playback unit does not stop the playback even if the clip file, which is referred to by the current sub-playitem has the progressive attribute and includes the sub-stream, is in the missing state or the unrecognizable state in the accessible recording medium, and wherein the playback unit stops the playback when the stereoscopic view setting information in the playlist indicates that the stereoscopic view is set to on and the clip file, which is referred to by the current sub-playitem and has the progressive attribute, is in the missing state or the unrecognizable state in the accessible recording medium.

5. The playback device of claim 1, wherein the sub-stream register further indicates whether a subtitle is set to on or off, wherein the playback unit does not stop the playback when the sub-stream register indicates that the subtitle is set to on, even if a clip file including a subtitle stream is in the missing state in the accessible recording medium or is in the unrecognizable state, and wherein the playback unit stops the playback, when the sub-stream register indicates that the subtitle is set to on, and the clip file, which is referred to by the current sub-playitem and has the progressive attribute, is in the missing state or the unrecognizable state in the accessible recording medium.

6. The playback device of claim 1, wherein playitem information includes a stream number table indicating sub-streams, of the plurality of sub-streams, that are playable, wherein the stream number table includes a plurality of sub-stream entries, wherein the plurality of sub-stream entries indicates sub-streams, of the plurality of sub-streams, that can be played back in synchronization with the plurality of playitems, wherein each sub-stream entry of the plurality of sub-stream entries indicates, in association with a piece of sub-playitem information, a sub-stream, of the plurality of sub-streams, that can be played back in synchronization, and an order of the sub-stream entries, of the plurality of sub-stream entries, in the stream number table indicates priority ranks of the sub-streams of the plurality of sub-streams, and wherein the current sub-stream is, among the plurality of sub-streams that can be played back in synchronization with the playitems, a sub-stream that corresponds to a sub-stream entry, of the plurality of sub-stream entries, having a highest priority rank from among the plurality of sub-stream entries included in the stream number table.

7. The playback device of claim 1 further comprising a setting register storing deck information which indicates a language setting in the playback device, wherein the determining unit determines, as the current sub-stream, a sub-stream which, from among sub-streams, of the plurality of sub-streams, that are permitted to be played back, has a language attribute that matches the language setting indicated by the deck information.

8. A recording device for writing, onto a recording medium, clip files that are to be referred to when a playlist is played back via a virtual package constructed using a read-only optical disc and an accessible recording medium, wherein the playlist includes a plurality of playitems and a plurality of sub-playitems, wherein each playitem of the plurality of playitems is information that defines (i) a clip file including a main stream and (ii) a playback section in the clip file including the main stream, wherein each sub-playitem of the plurality of sub-playitems is information that (iii) defines a clip file including a sub-stream and (iv) defines a playback section in the clip file including the sub-stream, as a playback section to be synchronized with a playitem of the plurality of playitems, wherein each of the clip files defined and referred to by the plurality of sub-playitems is transferred via a transmission path, wherein sub-streams are not multiplexed with the clip files defined and referred to by the plurality of playitems, wherein the recording device comprises:

a writing unit operable to receive one of the clip files transmitted via the transmission path and operable to write the received clip file onto the recording medium;

a management unit operable to manage a state of the clip file written onto the recording medium;

a playback unit operable to play back the plurality of playitems included in the playlist;

a specifying unit operable to specify one playitem, of the plurality of playitems, that is a current target of playback, as a current playitem of the plurality of playitems;

a determining unit operable to, each time the current playitem is specified by the specifying unit, determine, as a current sub-playitem, of the plurality of sub-playitems, a sub-playitem that is optimum for the current playitem; and a sub-stream register operable to indicate a current sub-stream included in the clip file including the playback section defined by the current sub-playitem, such that the current sub-stream is to be played back in synchronization with the current playitem, wherein the current sub-playitem defines a playback section to be synchronized with the current playitem and defines a playback section of the current sub-stream indicated by the sub-stream register wherein merge management information, which defines a construction of the virtual package, indicates whether or not each respective clip file of the clip files has a progressive attribute indicating that the respective clip file does not need to exist in the accessible recording medium when the current sub-play item referring to the respective clip file exists in the accessible recording medium, wherein the playback unit stops the playback of the current playitem of the plurality of playitems when the clip file, which is referred to by the current sub-playitem and has the progressive attribute, is in a missing state or an unrecognizable state in the accessible recording medium, wherein the playback unit continues the playback of the current playitem of the plurality of playitems when the clip file, which is referred to by the current sub-playitem and has the progressive attribute, exists in the accessible recording medium even if a next clip file of the pluralityof dip files, which is referred to by a next sub-playitem of the plurality of sub-playitems and has the progressive attribute, is in the missing state or the unrecognizable state in the accessible recording medium, and wherein the accessible recording medium includes a plurality of layered directories one of which is a disc ID directory corresponding to a disc ID recorded on the read-only optical disc, and the clip file referred to by the current sub-playitem is stored in a sub-directory under the disc ID directory.

9. The recording device of claim 8, wherein, while the current playitem is played back, an application identifies, as a next sub-playitem of the plurality of sub-playitems, a piece of sub-playitem information among a plurality of pieces of sub-playitem information included in playlist information, and requests, from a server device, a download of a clip file which is referred to by the next sub-play item and has the progressive attribute, and wherein the clip file written by the writing unit onto the recording medium is the clip file which is referred to by the next sub-play item and has the progressive attribute.

10. A playback method for playing back a playlist via a virtual package constructed using a read-only optical disc and an accessible recording medium, wherein the playlist includes a plurality of playitems and a plurality of sub-playitems, wherein each playitem of the plurality of playitems is information defining a playback section in a clip file that includes a main stream, wherein each sub-playitem of the plurality of sub-playitems is information defining a playback section in a clip file that includes a sub-stream, wherein each of the clip files defined and referred to by the plurality of sub-playitems is transferred, wherein the playback method comprises:

a playing back step of playing back the plurality of playitems;

a specifying step of specifying a current playitem of the plurality of playitems;

a determining step of determining a current sub-playitem, of the plurality of sub-playitems, each time the current playitem is specified by the specifying of the current playitem; and an indicating step of indicating a current sub-stream included in the clip file including the playback section defined by the current sub-playitem, such that the current sub-stream is to be played back in synchronization with the current playitem, the current sub-playitem defining the playback section that includes the current sub-stream indicated by the indicating of the current sub-stream, wherein merge management information, which defines a construction of the virtual package, indicates whether or not each respective clip file of the clip files has a progressive attribute indicating that the respective clip file does not need to exist in the accessible recording medium when the current sub-play item referring to the respective clip file exists in the accessible recording medium, wherein the playing back step stops the playback of the current playitem of the plurality of playitems when the clip file, which is referred to by the current sub-playitem and has the progressive attribute, is in a missing state or an unrecognizable state in the accessible recording medium, wherein the playing back step continues the playback of the current playitem of the plurality of playitems when the clip file, which is referred to by the current and has the progressive attribute, exists in the accessible recording medium even if a next clip file of the plurality of clip files, which is referred to by a next sub-playitem of the plurality of sub-playitems and has the progressive attribute, is in the missing state or the unrecognizable state in the accessible recording medium, and wherein the accessible recording medium includes a plurality of layered directories one of which is a disc ID directory corresponding to a disc ID recorded on the read-only optical disc, and the clip file referred to by the current sub-playitem is stored in a sub-directory under the disc ID directory.

11. A recording method for writing, onto a recording medium, clip files that are to be referred to when a playlist is played back via a virtual package constructed using a read-only optical disc and an accessible recording medium, wherein the playlist includes a plurality of playitems and a plurality of sub-playitems, wherein each playitem of the plurality of playitems is information that defines (i) a clip file including a main stream and (ii) a playback section in the clip file including the main stream, wherein each sub-playitem of the plurality of sub-playitems is information that (iii) defines a clip file including a sub-stream and (iv) defines a playback section in the clip file including the sub-stream, as a playback section to be synchronized with a playitem of the plurality of playitems, wherein each of the clip files defined and referred to by the plurality of sub-playitems is transferred via a transmission path, wherein sub-streams are not multiplexed with the clip files defined and referred to by the plurality of playitems, wherein the recording method comprises:

a receiving step of receiving one of the clip files transmitted via the transmission path and writing the received clip file onto the recording medium;

a managing step of managing a state of the clip file written onto the recording medium;

a playing back step of playing back the plurality of playitems included in the playlist;

a specifying step of specifying one playitem, of the plurality of playitems, that is a current target of playback, as a current playitem of the plurality of playitems;

a determining step of determining, as a current sub-playitem, of the plurality of sub-playitems, a sub-playitem that is optimum for the current playitem, each time the current playitem is specified by the specifying of the one playitem; and an indicating step of indicating a current sub-stream included in the clip file including the playback section defined by the current sub-playitem, such that the current sub-stream is to be played back in synchronization with the current playitem, wherein the current sub-playitem defines a playback section to be synchronized with the current playitem and defines a playback section of the current sub-stream indicated by the indicating of the current sub-stream, wherein merge management information, which defines a construction of the virtual package, indicates whether or not each respective clip file of the clip files has a progressive attribute indicating that the respective clip file does not need to exist in the accessible recording medium when the current sub-play item referring to the respective clip file exists in the accessible recording medium, wherein the playing back step stops the playback of the current playitem of the plurality of playitems when the clip file, which is referred to by the current sub-playitem and has the progressive attribute, is in a missing state or an unrecognizable state in the accessible recording medium, wherein the playing back step continues the playback of the current playitem of the plurality of playitems when the clip file, which is referred to by the current sub-playitem and has the progressive attribute, exists in the accessible recording medium even if a next clip file of the plurality of clip files, which is referred to by a next sub-playitem of the plurality of sub-playitems and has the progressive attribute, is in the missing state or the unrecognizable state in the accessible recording medium, and wherein the accessible recording medium includes a plurality of layered directories one of which is a disc ID directory corresponding to a disc ID recorded on the read-only optical disc, and the clip file referred to by the current sub-playitem is stored in a sub-directory under the disc ID directory.

* * * * *